(12) United States Patent
Kedia et al.

(10) Patent No.: US 12,287,957 B2
(45) Date of Patent: Apr. 29, 2025

(54) USER INTERFACES FOR MANAGING APPLICATION WIDGETS

(71) Applicant: Apple Inc., Cupertino, CA (US)

(72) Inventors: Shubham Kedia, San Francisco, CA (US); Christian X. Dalonzo, San Francisco, CA (US); William M. Tyler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/496,772

(22) Filed: Oct. 27, 2023

(65) Prior Publication Data

US 2024/0053871 A1    Feb. 15, 2024

Related U.S. Application Data

(63) Continuation of application No. 17/505,252, filed on Oct. 19, 2021, now Pat. No. 11,893,212.

(Continued)

(51) Int. Cl.
| | |
|---|---|
| *G06F 3/048* | (2013.01) |
| *G06F 3/04817* | (2022.01) |
| *G06F 3/0482* | (2013.01) |
| *G06F 3/0483* | (2013.01) |
| *G06F 3/0484* | (2022.01) |

(Continued)

(52) U.S. Cl.
CPC ........ *G06F 3/0484* (2013.01); *G06F 3/04817* (2013.01); *G06F 3/0482* (2013.01); *G06F 3/0483* (2013.01); *G06F 9/451* (2018.02); *G06T 13/00* (2013.01)

(58) Field of Classification Search
None
See application file for complete search history.

(56) References Cited

U.S. PATENT DOCUMENTS

| | | | |
|---|---|---|---|
| 5,960,366 | A | 9/1999 | Duwaer |
| 6,005,579 | A | 12/1999 | Sugiyama et al. |

(Continued)

FOREIGN PATENT DOCUMENTS

| | | | |
|---|---|---|---|
| CN | 1811899 | A | 8/2006 |
| CN | 101202866 | A | 6/2008 |

(Continued)

OTHER PUBLICATIONS

Office Action received for Australian Patent Application No. 2022235585, mailed on Feb. 27, 2024, 5 pages.

(Continued)

*Primary Examiner* — Thanh T Vu
(74) *Attorney, Agent, or Firm* — DLA Piper LLP (US)

(57) ABSTRACT

The present disclosure generally relates to user interfaces that include application widgets. In some embodiments, a computer system displays a home screen, where displaying the home screen includes displaying a set of user interface elements based on whether an account that was used to set up the computer system is associated with a first type of content. In some embodiments, a computer system displays a user interface in response to detecting a request to change the orientation of the user interface. Displaying the user interface includes displaying an arrangement of application widgets and application icons, where a set of application widgets has a same spatial organization as in a previous arrangement.

27 Claims, 26 Drawing Sheets

Related U.S. Application Data

(60) Provisional application No. 63/197,433, filed on Jun. 6, 2021.

(51) Int. Cl.
  *G06F 9/451* (2018.01)
  *G06T 13/00* (2011.01)

(56) References Cited

U.S. PATENT DOCUMENTS

| | | |
|---|---|---|
| 6,008,807 A | 12/1999 | Bretschneider et al. |
| 6,232,972 B1 | 5/2001 | Arcuri et al. |
| 6,336,126 B1 | 1/2002 | Bjorklund et al. |
| 6,369,794 B1 | 4/2002 | Sakurai et al. |
| 6,556,222 B1 | 4/2003 | Narayanaswami |
| 6,570,583 B1 | 5/2003 | Kung et al. |
| 6,636,246 B1 | 10/2003 | Gallo et al. |
| 6,661,438 B1 | 12/2003 | Shiraishi et al. |
| 6,809,724 B1 | 10/2004 | Shiraishi et al. |
| 6,857,105 B1 | 2/2005 | Fox et al. |
| 6,900,793 B2 | 5/2005 | Goh et al. |
| 6,937,228 B2 | 8/2005 | Yu |
| 6,977,868 B2 | 12/2005 | Brewer et al. |
| 7,036,090 B1 | 4/2006 | Nguyen |
| 7,081,905 B1 | 7/2006 | Raghunath |
| 7,545,367 B2 | 6/2009 | Sunda et al. |
| 7,596,761 B2 | 9/2009 | Lemay et al. |
| 7,600,192 B1 | 10/2009 | Hashimoto et al. |
| 7,710,393 B2 | 5/2010 | Tsuk et al. |
| 7,716,603 B2 | 5/2010 | Boyden |
| 7,956,847 B2 | 6/2011 | Christie |
| 7,965,276 B1 | 6/2011 | Martin et al. |
| 8,040,331 B2 | 10/2011 | Hill et al. |
| 8,046,705 B2 | 10/2011 | Hunleth et al. |
| 8,191,011 B2 | 5/2012 | Abanami et al. |
| 8,266,550 B1 | 9/2012 | Cleron et al. |
| 8,272,262 B2 | 9/2012 | Cabrera et al. |
| 8,375,326 B2 | 2/2013 | Bucher et al. |
| 8,427,432 B2 | 4/2013 | Kim et al. |
| 8,487,882 B2 | 7/2013 | Inaba et al. |
| 8,533,623 B2 | 9/2013 | St |
| 8,549,429 B2 | 10/2013 | Tsuruta et al. |
| 8,860,674 B2 | 10/2014 | Lee et al. |
| 8,868,338 B1 | 10/2014 | Chau et al. |
| 8,952,886 B2 | 2/2015 | Tsuk et al. |
| 9,176,652 B1 | 11/2015 | Patel et al. |
| 9,182,876 B2 | 11/2015 | Kim et al. |
| 9,189,089 B2 | 11/2015 | Sutton et al. |
| 9,229,624 B2 | 1/2016 | Wei et al. |
| 9,268,400 B2 | 2/2016 | Gomez Sainz-Garcia |
| 9,448,691 B2 | 9/2016 | Suda |
| D778,912 S | 2/2017 | Akana et al. |
| 9,582,187 B2 | 2/2017 | Gil et al. |
| 9,620,312 B2 | 4/2017 | Ely et al. |
| 9,721,375 B1 * | 8/2017 | Rivard .................. G09G 5/37 |
| 9,870,114 B1 | 1/2018 | Jones et al. |
| D813,239 S | 3/2018 | Akana et al. |
| 9,921,711 B2 | 3/2018 | Oh et al. |
| 9,927,957 B1 | 3/2018 | Sagar et al. |
| 9,965,144 B2 | 5/2018 | Nakamura et al. |
| 10,019,097 B2 | 7/2018 | Ely et al. |
| 10,025,458 B2 | 7/2018 | Chaudhri et al. |
| 10,048,802 B2 | 8/2018 | Shedletsky et al. |
| 10,057,470 B2 | 8/2018 | Kim et al. |
| 10,133,439 B1 | 11/2018 | Brichter et al. |
| 10,175,652 B2 | 1/2019 | Ely et al. |
| 10,216,147 B2 | 2/2019 | Ely et al. |
| 10,222,909 B2 | 3/2019 | Shedletsky et al. |
| 10,275,117 B2 | 4/2019 | Zambetti et al. |
| D849,749 S | 5/2019 | Akana et al. |
| 10,296,125 B2 | 5/2019 | Ely et al. |
| 10,324,620 B2 | 6/2019 | Balaram |
| 10,331,081 B2 | 6/2019 | Ely et al. |
| 10,331,082 B2 | 6/2019 | Ely et al. |
| 10,373,479 B2 | 8/2019 | Banfi |
| 10,664,074 B2 | 5/2020 | Moussette et al. |
| 10,664,120 B1 | 5/2020 | Jones et al. |
| 10,852,700 B2 | 12/2020 | Abramov |
| 10,969,941 B2 | 4/2021 | Bylenok et al. |
| 11,068,128 B2 | 7/2021 | Zambetti et al. |
| 11,726,194 B2 | 8/2023 | Nangou |
| 2002/0101457 A1 | 8/2002 | Lang |
| 2002/0122072 A1 | 9/2002 | Selker |
| 2002/0140633 A1 | 10/2002 | Rafii et al. |
| 2003/0020671 A1 | 1/2003 | Santoro et al. |
| 2003/0076301 A1 | 4/2003 | Tsuk et al. |
| 2003/0098891 A1 | 5/2003 | Molander et al. |
| 2003/0103044 A1 | 6/2003 | Sunda et al. |
| 2003/0142288 A1 | 7/2003 | Kinrot et al. |
| 2004/0061678 A1 | 4/2004 | Goh et al. |
| 2004/0130581 A1 | 7/2004 | Howard et al. |
| 2004/0230599 A1 | 11/2004 | Moore et al. |
| 2004/0239692 A1 | 12/2004 | Balle et al. |
| 2004/0252119 A1 | 12/2004 | Hunleth et al. |
| 2004/0264301 A1 | 12/2004 | Howard et al. |
| 2005/0116941 A1 | 6/2005 | Wallington et al. |
| 2005/0119031 A1 | 6/2005 | Spalink et al. |
| 2005/0209051 A1 | 9/2005 | Santomassimo et al. |
| 2005/0246642 A1 | 11/2005 | Valderas et al. |
| 2006/0028446 A1 | 2/2006 | Liberty et al. |
| 2006/0069604 A1 | 3/2006 | Leukart et al. |
| 2006/0143574 A1 | 6/2006 | Ito et al. |
| 2006/0197753 A1 | 9/2006 | Hotelling |
| 2007/0030256 A1 | 2/2007 | Akaike et al. |
| 2007/0035513 A1 | 2/2007 | Sherrard et al. |
| 2007/0106949 A1 | 5/2007 | Narita et al. |
| 2007/0157089 A1 | 7/2007 | Van Os et al. |
| 2007/0180379 A1 | 8/2007 | Osato et al. |
| 2007/0180392 A1 | 8/2007 | Russo |
| 2007/0211042 A1 | 9/2007 | Kim et al. |
| 2007/0229458 A1 | 10/2007 | Moon |
| 2007/0236475 A1 | 10/2007 | Wherry |
| 2007/0237493 A1 | 10/2007 | Hall et al. |
| 2007/0265929 A1 | 11/2007 | Danninger |
| 2008/0033779 A1 | 2/2008 | Coffman et al. |
| 2008/0052643 A1 | 2/2008 | Ike et al. |
| 2008/0062141 A1 | 3/2008 | Chaudhri |
| 2008/0098313 A1 | 4/2008 | Pollack |
| 2008/0136790 A1 | 6/2008 | Hio |
| 2008/0163119 A1 | 7/2008 | Kim et al. |
| 2008/0168404 A1 | 7/2008 | Ording |
| 2008/0172634 A1 | 7/2008 | Choi et al. |
| 2008/0186808 A1 | 8/2008 | Lee |
| 2008/0201649 A1 | 8/2008 | Mattila et al. |
| 2008/0207281 A1 | 8/2008 | Tsuchiya et al. |
| 2008/0279475 A1 | 11/2008 | Lee et al. |
| 2009/0058821 A1 | 3/2009 | Chaudhri et al. |
| 2009/0098912 A1 | 4/2009 | Kim et al. |
| 2009/0138827 A1 | 5/2009 | Van Os et al. |
| 2009/0141046 A1 | 6/2009 | Rathnam et al. |
| 2009/0177538 A1 | 7/2009 | Brewer et al. |
| 2009/0178008 A1 | 7/2009 | Herz et al. |
| 2009/0183100 A1 | 7/2009 | Eom et al. |
| 2009/0189915 A1 | 7/2009 | Mercer et al. |
| 2009/0199130 A1 | 8/2009 | Tsern et al. |
| 2009/0241150 A1 | 9/2009 | White et al. |
| 2009/0293014 A1 | 11/2009 | Meuninck et al. |
| 2009/0313299 A1 | 12/2009 | Bonev et al. |
| 2009/0315867 A1 | 12/2009 | Sakamoto et al. |
| 2009/0327955 A1 | 12/2009 | Mouilleseaux et al. |
| 2010/0017748 A1 | 1/2010 | Taylor et al. |
| 2010/0026640 A1 | 2/2010 | Kim et al. |
| 2010/0029327 A1 | 2/2010 | Jee |
| 2010/0070926 A1 | 3/2010 | Abanami et al. |
| 2010/0070931 A1 | 3/2010 | Nichols |
| 2010/0088634 A1 | 4/2010 | Tsuruta et al. |
| 2010/0099462 A1 | 4/2010 | Baek et al. |
| 2010/0100849 A1 | 4/2010 | Fram |
| 2010/0110044 A1 | 5/2010 | Englund |
| 2010/0146387 A1 | 6/2010 | Hoover |
| 2010/0164908 A1 | 7/2010 | Hill et al. |
| 2010/0169790 A1 | 7/2010 | Vaughan et al. |
| 2010/0175006 A1 | 7/2010 | Li |
| 2010/0199232 A1 | 8/2010 | Mistry et al. |

(56) References Cited

U.S. PATENT DOCUMENTS

| | | |
|---|---|---|
| 2010/0211908 A1 | 8/2010 | Luk et al. |
| 2010/0211919 A1 | 8/2010 | Brown et al. |
| 2010/0214243 A1 | 8/2010 | Birnbaum et al. |
| 2010/0235742 A1 | 9/2010 | Hsu et al. |
| 2010/0267424 A1 | 10/2010 | Kim et al. |
| 2010/0269108 A1 | 10/2010 | Boudreau et al. |
| 2010/0271312 A1 | 10/2010 | Alameh et al. |
| 2010/0271343 A1 | 10/2010 | Nagashima et al. |
| 2010/0289217 A1 | 11/2010 | Lavie et al. |
| 2011/0014956 A1 | 1/2011 | Lee et al. |
| 2011/0016425 A1 | 1/2011 | Homburg et al. |
| 2011/0047491 A1 | 2/2011 | Hwang et al. |
| 2011/0055760 A1 | 3/2011 | Drayton et al. |
| 2011/0078622 A1 | 3/2011 | Missig et al. |
| 2011/0141031 A1 | 6/2011 | Mccullough et al. |
| 2011/0157046 A1 | 6/2011 | Lee et al. |
| 2011/0164042 A1 | 7/2011 | Chaudhri |
| 2011/0167369 A1 | 7/2011 | Van |
| 2011/0167382 A1 | 7/2011 | Van Os |
| 2011/0181520 A1 | 7/2011 | Boda et al. |
| 2011/0202834 A1 | 8/2011 | Mandryk et al. |
| 2011/0202859 A1 | 8/2011 | Fong |
| 2011/0202861 A1 | 8/2011 | Fritzley et al. |
| 2011/0202866 A1 | 8/2011 | Huang et al. |
| 2011/0214500 A1 | 9/2011 | Cabrera et al. |
| 2011/0225492 A1 | 9/2011 | Boettcher et al. |
| 2011/0234633 A1 | 9/2011 | Ogura et al. |
| 2011/0248916 A1 | 10/2011 | Griffin et al. |
| 2011/0252318 A1 | 10/2011 | Helms |
| 2011/0252372 A1 | 10/2011 | Chaudhri |
| 2011/0252373 A1 | 10/2011 | Chaudhri |
| 2011/0252375 A1 | 10/2011 | Chaudhri |
| 2011/0307842 A1 | 12/2011 | Chiang et al. |
| 2011/0316888 A1 | 12/2011 | Sachs et al. |
| 2012/0005622 A1 | 1/2012 | Park et al. |
| 2012/0019513 A1 | 1/2012 | Fong et al. |
| 2012/0023450 A1 | 1/2012 | Noto et al. |
| 2012/0030569 A1 | 2/2012 | Migos et al. |
| 2012/0052921 A1 | 3/2012 | Lim et al. |
| 2012/0062398 A1 | 3/2012 | Durand |
| 2012/0066629 A1 | 3/2012 | Lee et al. |
| 2012/0092383 A1 | 4/2012 | Hysek et al. |
| 2012/0133677 A1 | 5/2012 | Suzuki et al. |
| 2012/0155223 A1 | 6/2012 | Hoover |
| 2012/0159380 A1 | 6/2012 | Kocienda et al. |
| 2012/0162261 A1 | 6/2012 | Kim et al. |
| 2012/0179998 A1 | 7/2012 | Nesladek et al. |
| 2012/0192110 A1 | 7/2012 | Wu et al. |
| 2012/0204123 A1 | 8/2012 | Bauer et al. |
| 2012/0210260 A1* | 8/2012 | Bederson ............... G06F 3/0488 715/765 |
| 2012/0236173 A1 | 9/2012 | Telek et al. |
| 2012/0274508 A1 | 11/2012 | Brown et al. |
| 2012/0278745 A1 | 11/2012 | Kim et al. |
| 2012/0280908 A1 | 11/2012 | Rhoads et al. |
| 2012/0284012 A1 | 11/2012 | Rodriguez et al. |
| 2012/0284674 A1 | 11/2012 | Geng et al. |
| 2012/0297342 A1 | 11/2012 | Jang et al. |
| 2012/0304084 A1 | 11/2012 | Kim et al. |
| 2012/0324357 A1 | 12/2012 | Viegers et al. |
| 2012/0324384 A1 | 12/2012 | Cohen et al. |
| 2012/0327006 A1 | 12/2012 | Israr et al. |
| 2013/0016048 A1 | 1/2013 | So et al. |
| 2013/0019182 A1 | 1/2013 | Gil et al. |
| 2013/0038636 A1 | 2/2013 | Fujiwaka |
| 2013/0046397 A1 | 2/2013 | Fadell et al. |
| 2013/0050109 A1 | 2/2013 | Ban |
| 2013/0055160 A1 | 2/2013 | Yamada et al. |
| 2013/0063383 A1 | 3/2013 | Anderssonreimer et al. |
| 2013/0069990 A1 | 3/2013 | Geise et al. |
| 2013/0076774 A1 | 3/2013 | Yu et al. |
| 2013/0097566 A1 | 4/2013 | Berglund |
| 2013/0111342 A1 | 5/2013 | Alameh et al. |
| 2013/0111384 A1 | 5/2013 | Kim et al. |
| 2013/0117689 A1 | 5/2013 | Lessing et al. |
| 2013/0117698 A1 | 5/2013 | Park et al. |
| 2013/0127850 A1 | 5/2013 | Bindon |
| 2013/0135228 A1 | 5/2013 | Won et al. |
| 2013/0135234 A1 | 5/2013 | Hisano et al. |
| 2013/0135236 A1 | 5/2013 | Yano |
| 2013/0139102 A1 | 5/2013 | Miura et al. |
| 2013/0142016 A1 | 6/2013 | Pozzo Di Borgo et al. |
| 2013/0145316 A1 | 6/2013 | Heo |
| 2013/0152017 A1 | 6/2013 | Song et al. |
| 2013/0185648 A1 | 7/2013 | Kim |
| 2013/0205210 A1 | 8/2013 | Jeon et al. |
| 2013/0208013 A1 | 8/2013 | Yuu et al. |
| 2013/0227412 A1 | 8/2013 | Ornstein et al. |
| 2013/0275918 A1 | 10/2013 | Antonini et al. |
| 2013/0305187 A1 | 11/2013 | Phillips et al. |
| 2013/0311954 A1 | 11/2013 | Minkkinen et al. |
| 2014/0002348 A1 | 1/2014 | Ogawa |
| 2014/0036639 A1 | 2/2014 | Boni et al. |
| 2014/0040826 A1 | 2/2014 | Wei et al. |
| 2014/0098102 A1 | 4/2014 | Raffle et al. |
| 2014/0139422 A1 | 5/2014 | Mistry et al. |
| 2014/0139637 A1 | 5/2014 | Mistry et al. |
| 2014/0143678 A1 | 5/2014 | Mistry et al. |
| 2014/0160078 A1 | 6/2014 | Seo et al. |
| 2014/0164930 A1 | 6/2014 | Lieb et al. |
| 2014/0164945 A1 | 6/2014 | Junqua et al. |
| 2014/0165006 A1 | 6/2014 | Chaudhri et al. |
| 2014/0173517 A1 | 6/2014 | Chaudhri et al. |
| 2014/0195943 A1 | 7/2014 | Zheng et al. |
| 2014/0237402 A1 | 8/2014 | Pang et al. |
| 2014/0248590 A1 | 9/2014 | Mccormick |
| 2014/0282214 A1 | 9/2014 | Shirzadi et al. |
| 2014/0328147 A1 | 11/2014 | Yang et al. |
| 2014/0333602 A1 | 11/2014 | Yang et al. |
| 2014/0344700 A1 | 11/2014 | Jenkins et al. |
| 2014/0344951 A1 | 11/2014 | Brewer |
| 2014/0359602 A1 | 12/2014 | Sawaya et al. |
| 2014/0368547 A1* | 12/2014 | Elings ................... G06F 3/0346 345/659 |
| 2015/0022438 A1 | 1/2015 | Hong |
| 2015/0022481 A1 | 1/2015 | Andersson et al. |
| 2015/0046871 A1 | 2/2015 | Lewis |
| 2015/0062069 A1 | 3/2015 | Shin et al. |
| 2015/0121231 A1 | 4/2015 | Edwardson et al. |
| 2015/0261412 A1 | 9/2015 | Guillama et al. |
| 2015/0268811 A1 | 9/2015 | Min et al. |
| 2015/0277720 A1 | 10/2015 | Thorson et al. |
| 2015/0350029 A1 | 12/2015 | Skrobotov |
| 2015/0378555 A1 | 12/2015 | Ramanathan et al. |
| 2015/0378569 A1 | 12/2015 | Sato et al. |
| 2015/0379476 A1 | 12/2015 | Chaudhri et al. |
| 2016/0026425 A1 | 1/2016 | Lee et al. |
| 2016/0034153 A1 | 2/2016 | Lejeune et al. |
| 2016/0054710 A1 | 2/2016 | Jo et al. |
| 2016/0062598 A1 | 3/2016 | Kocienda et al. |
| 2016/0092053 A1 | 3/2016 | Loganathan et al. |
| 2016/0092063 A1 | 3/2016 | Lee |
| 2016/0117141 A1 | 4/2016 | Ro et al. |
| 2016/0146935 A1 | 5/2016 | Lee et al. |
| 2016/0162164 A1 | 6/2016 | Phillips et al. |
| 2016/0170436 A1 | 6/2016 | Farrar et al. |
| 2016/0170598 A1 | 6/2016 | Zambetti et al. |
| 2016/0170608 A1 | 6/2016 | Zambetti et al. |
| 2016/0202866 A1 | 7/2016 | Zambetti |
| 2016/0209939 A1 | 7/2016 | Zambetti et al. |
| 2016/0231883 A1 | 8/2016 | Zambetti |
| 2016/0313875 A1 | 10/2016 | Williams et al. |
| 2016/0327911 A1 | 11/2016 | Eim et al. |
| 2016/0334935 A1 | 11/2016 | Jeon |
| 2017/0003879 A1 | 1/2017 | Tamai et al. |
| 2017/0010751 A1 | 1/2017 | Shedletsky et al. |
| 2017/0024587 A1 | 1/2017 | Nonogaki et al. |
| 2017/0089735 A1 | 3/2017 | Ruh |
| 2017/0104902 A1 | 4/2017 | Kim et al. |
| 2017/0109011 A1 | 4/2017 | Jiang |
| 2017/0201618 A1 | 7/2017 | Schmidt |
| 2017/0243471 A1 | 8/2017 | Banfi |
| 2017/0269692 A1 | 9/2017 | Eck et al. |
| 2018/0024683 A1 | 1/2018 | Ely et al. |

(56) References Cited

U.S. PATENT DOCUMENTS

| | | |
|---|---|---|
| 2018/0059872 A1 | 3/2018 | Tida |
| 2018/0081453 A1 | 3/2018 | Ely |
| 2018/0157368 A1 | 6/2018 | Park et al. |
| 2018/0192117 A1 | 7/2018 | Liston et al. |
| 2018/0260070 A1 | 9/2018 | Mun et al. |
| 2018/0307363 A1 | 10/2018 | Ely et al. |
| 2018/0335891 A1 | 11/2018 | Shedletsky et al. |
| 2018/0349583 A1 | 12/2018 | Turgeman et al. |
| 2018/0364815 A1 | 12/2018 | Moussette et al. |
| 2019/0012063 A1 | 1/2019 | Kocienda et al. |
| 2019/0042066 A1* | 2/2019 | Kim .............. H04M 1/725 |
| 2019/0056700 A1 | 2/2019 | Matsuno et al. |
| 2019/0064998 A1 | 2/2019 | Chowdhury et al. |
| 2019/0072912 A1 | 3/2019 | Pandya et al. |
| 2019/0080072 A1 | 3/2019 | Van Os et al. |
| 2019/0101870 A1 | 4/2019 | Pandya et al. |
| 2019/0163324 A1 | 5/2019 | Shedletsky et al. |
| 2019/0172016 A1 | 6/2019 | Chaudhri et al. |
| 2019/0212885 A1 | 7/2019 | Zambetti et al. |
| 2019/0246060 A1 | 8/2019 | Tanabe et al. |
| 2019/0324640 A1 | 10/2019 | Park et al. |
| 2020/0042145 A1 | 2/2020 | Williams et al. |
| 2020/0104021 A1 | 4/2020 | Bylenok et al. |
| 2020/0233568 A1 | 7/2020 | Wang |
| 2020/0272293 A1 | 8/2020 | Zambetti et al. |
| 2020/0393957 A1 | 12/2020 | Wilson et al. |
| 2021/0055697 A1 | 2/2021 | Abramov |
| 2021/0073741 A1 | 3/2021 | Chaudhri et al. |
| 2021/0110014 A1 | 4/2021 | Turgeman et al. |
| 2021/0223925 A1 | 7/2021 | Bylenok et al. |
| 2021/0318799 A1 | 10/2021 | Oh et al. |
| 2022/0043560 A1 | 2/2022 | Kocienda et al. |
| 2022/0129858 A1 | 4/2022 | Chaudhri et al. |
| 2022/0391056 A1 | 12/2022 | Dalonzo et al. |
| 2022/0413553 A1 | 12/2022 | Zhang |
| 2023/0024225 A1 | 1/2023 | Zambetti et al. |
| 2023/0334432 A1 | 10/2023 | Chaudhri et al. |
| 2023/0409166 A1 | 12/2023 | Kocienda et al. |
| 2024/0143141 A1 | 5/2024 | Bylenok et al. |

FOREIGN PATENT DOCUMENTS

| | | |
|---|---|---|
| CN | 101203821 A | 6/2008 |
| CN | 101232528 A | 7/2008 |
| CN | 101390038 A | 3/2009 |
| CN | 101611374 A | 12/2009 |
| CN | 101627349 A | 1/2010 |
| CN | 101770331 A | 7/2010 |
| CN | 101776968 A | 7/2010 |
| CN | 101796478 A | 8/2010 |
| CN | 101872240 A | 10/2010 |
| CN | 101876877 A | 11/2010 |
| CN | 102033710 A | 4/2011 |
| CN | 102037436 A | 4/2011 |
| CN | 102112946 A | 6/2011 |
| CN | 102138120 A | 7/2011 |
| CN | 102479027 A | 5/2012 |
| CN | 102479053 A | 5/2012 |
| CN | 102763066 A | 10/2012 |
| CN | 102812426 A | 12/2012 |
| CN | 102929424 A | 2/2013 |
| CN | 102946470 A | 2/2013 |
| CN | 102981727 A | 3/2013 |
| CN | 103076942 A | 5/2013 |
| CN | 103528545 A | 1/2014 |
| CN | 103547987 A | 1/2014 |
| CN | 103713848 A | 4/2014 |
| CN | 103777842 A | 5/2014 |
| CN | 103870282 A | 6/2014 |
| CN | 103995647 A | 8/2014 |
| CN | 103995724 A | 8/2014 |
| EP | 1406158 A2 | 4/2004 |
| EP | 1571538 A1 | 9/2005 |
| EP | 1679879 A2 | 7/2006 |
| EP | 1944677 A2 | 7/2008 |
| EP | 1959337 A2 | 8/2008 |
| EP | 2194452 A1 | 6/2010 |
| EP | 2284646 A1 | 2/2011 |
| EP | 2302493 A2 | 3/2011 |
| EP | 2525282 A2 | 11/2012 |
| EP | 2547117 A1 | 1/2013 |
| EP | 2551784 A1 | 1/2013 |
| EP | 2565767 A1 | 3/2013 |
| EP | 2565769 A2 | 3/2013 |
| EP | 2610738 A2 | 7/2013 |
| EP | 2693382 A2 | 2/2014 |
| EP | 2733598 A2 | 5/2014 |
| JP | 2-114318 A | 4/1990 |
| JP | 11-39133 A | 2/1999 |
| JP | 2001-202170 A | 7/2001 |
| JP | 2001-202178 A | 7/2001 |
| JP | 2004-21522 A | 1/2004 |
| JP | 2006-140990 A | 6/2006 |
| JP | 2006-185273 A | 7/2006 |
| JP | 2007-512635 A | 5/2007 |
| JP | 2007-170995 A | 7/2007 |
| JP | 2007-179544 A | 7/2007 |
| JP | 2009-246553 A | 10/2009 |
| JP | 2009-265793 A | 11/2009 |
| JP | 2011-53790 A | 3/2011 |
| JP | 2012-58979 A | 3/2012 |
| JP | 2012-90111 A | 5/2012 |
| JP | 2012-155698 A | 8/2012 |
| JP | 2012-252384 A | 12/2012 |
| JP | 2013-47919 A | 3/2013 |
| JP | 2013-73513 A | 4/2013 |
| JP | 2013-73528 A | 4/2013 |
| JP | 2013-137750 A | 7/2013 |
| JP | 2013-530433 A | 7/2013 |
| JP | 2013-164700 A | 8/2013 |
| JP | 2018-42137 A | 3/2018 |
| KR | 10-2010-0003589 A | 1/2010 |
| KR | 10-2011-0093090 A | 8/2011 |
| KR | 10-2012-0071468 A | 7/2012 |
| KR | 10-2012-0079707 A | 7/2012 |
| KR | 10-2013-0052751 A | 5/2013 |
| TW | 201027419 A | 7/2010 |
| TW | I405106 B | 8/2013 |
| TW | 201403406 A | 1/2014 |
| TW | 201426492 A | 7/2014 |
| TW | 201432552 A | 8/2014 |
| WO | 2005/055034 A1 | 6/2005 |
| WO | 2005/103863 A2 | 11/2005 |
| WO | 2006/037545 A2 | 4/2006 |
| WO | 2006/094308 A2 | 9/2006 |
| WO | 2006/094308 A3 | 12/2006 |
| WO | 2008/099251 A1 | 8/2008 |
| WO | 2009/084368 A1 | 7/2009 |
| WO | 2009/089222 A2 | 7/2009 |
| WO | 2011/084859 A1 | 7/2011 |
| WO | 2011/126502 A1 | 10/2011 |
| WO | 2012/129359 A1 | 9/2012 |
| WO | 2014/058816 A1 | 4/2014 |
| WO | 2014/105276 A1 | 7/2014 |

OTHER PUBLICATIONS

Applicant-Initiated Interview Summary received for U.S. Appl. No. 16/222,619, mailed on Oct. 9, 2020, 2 pages.
Applicant-Initiated Interview Summary received for U.S. Appl. No. 16/222,619, mailed on Oct. 22, 2020, 3 pages.
Applicant-Initiated Interview Summary received for U.S. Appl. No. 17/222,803, mailed on Mar. 17, 2023, 4 pages.
Final Office Action received for U.S. Appl. No. 16/222,619, mailed on Jul. 27, 2020, 11 pages.
Non-Final Office Action received for U.S. Appl. No. 16/222,619, mailed on Mar. 19, 2020, 16 pages.
Non-Final Office Action received for U.S. Appl. No. 17/222,803, mailed on Dec. 8, 2022, 14 pages.
Notice of Allowance received for Chinese Patent Application No. 201910875660.7, mailed on Jan. 4, 2024, 2 pages (1 page of English Translation and 1 page of Official Copy).

(56) References Cited

OTHER PUBLICATIONS

Notice of Allowance received for U.S. Appl. No. 16/222,619, mailed on Nov. 20, 2020, 9 pages.
Notice of Allowance received for U.S. Appl. No. 17/222,803, mailed on Aug. 22, 2023, 9 pages.
Notice of Hearing received for Indian Patent Application No. 202018015998, mailed on Dec. 15, 2023, 3 pages.
Notice of Hearing received for Indian Patent Application No. 202018016000, mailed on Dec. 15, 2023, 3 pages.
Supplemental Notice of Allowance received for U.S. Appl. No. 16/222,619, mailed on Mar. 8, 2021, 3 pages.
Applicant-Initiated Interview Summary received for U.S. Appl. No. 17/950,823. mailed on Feb. 9, 2024, 4 pages.
Non-Final Office Action received for U.S. Appl. No. 18/211,150, mailed on Feb. 14, 2024, 11 pages.
Office Action received for Chinese Patent Application No. 202010940700.4, mailed on Dec. 8, 2023, 11 pages (5 pages of English Translation and 6 pages of Official Copy).
Office Action received for Chinese Patent Application No. 202010941320.2, mailed on Dec. 12, 2023, 18 pages (7 pages of English Translation and 11 pages of Official Copy).
Office Action received for European Patent Application No. 20217518.8, mailed on Feb. 22, 2024, 7 pages.
Final Office Action received for U.S. Appl. No. 17/950,823, mailed on May 7, 2024, 18 pages.
Notice of Allowance received for Chinese Patent Application No. 202010940700.4, mailed on Apr. 23, 2024, 4 pages (1 page of English Translation and 3 pages of Official Copy).
Applicant-Initiated Interview Summary received for U.S. Appl. No. 18/211,150, mailed on Apr. 3, 2024, 3 pages.
Notice of Acceptance received for Australian Patent Application No. 2023202432, mailed on Nov. 6, 2023, 3 pages.
Notice of Allowance received for U.S. Appl. No. 17/505,252, mailed on Nov. 20, 2023, 7 pages.
Office Action received for Chinese Patent Application No. 201910875660.7, mailed on Oct. 18, 2023, 6 pages (3 pages of English Translation and 3 pages of Official Copy).
Non-Final Office Action received for U.S. Appl. No. 17/950,823, mailed on Dec. 18, 2023, 13 pages.
Office Action received for European Patent Application No. 22157106.0, mailed on Dec. 21, 2023, 6 pages.
Accepted Outlook Meetings Move to Deleted Folder, Available online at:—https://social.technet.microsoft.com/Forums/office/en-US/f3301c9a-a93f-49f7-be13-c642e285f150/accepted-outlook-meetings-move-to-deleted-folder?forum=outlook, Jan. 12, 2011, 4 pages.
Advisory Action received for U.S. Appl. No. 14/752,776, mailed on Aug. 31, 2018, 3 pages.
Advisory Action received for U.S. Appl. No. 14/913,349, mailed on Oct. 29, 2019, 4 pages.
Advisory Action received for U.S. Appl. No. 15/049,052, mailed on Sep. 11, 2017, 2 pages.
Android 2.3.4 User's Guide, online available at: https://static.googleusercontent.com/media/www.google.com/en//help/hc/pdfs/mobile/Andr oidUsersGuide-2.3.4.pdf, May 20, 2011, 384 pages.
Appleltouchreviews, "The Best Cydia Tweak for Your iPhone, iPod Touch & iPad—Iconoclasm", Available online at:—https://www.youtube.com/watch?v=EhriZRINufQ, Apr. 23, 2011, 2 pages.
Applicant Initiated Interview Summary received for U.S. Appl. No. 14/913,349, mailed on Oct. 7, 2019, 4 pages.
Applicant Initiated Interview Summary received for U.S. Appl. No. 16/265,938, mailed on Mar. 11, 2020, 5 pages.
Applicant Initiated Interview Summary received for U.S. Appl. No. 17/508,894, mailed on Mar. 10, 2023, 4 pages.
Applicant-Initiated Interview Summary received for U.S. Appl. No. 14/913,349, mailed on Oct. 12, 2022, 2 pages.
Applicant-Initiated Interview Summary received for U.S. Appl. No. 15/930,300, mailed on Oct. 27, 2020, 3 pages.
Applicant-Initiated Interview Summary received for U.S. Appl. No. 16/130,838, mailed on Apr. 19, 2021, 5 pages.
Applicant-Initiated Interview Summary received for U.S. Appl. No. 16/130,838, mailed on Jul. 20, 2020, 6 pages.
Applicant-Initiated Interview Summary received for U.S. Appl. No. 16/130,838, mailed on Mar. 26, 2020, 8 pages.
Applicant-Initiated Interview Summary received for U.S. Appl. No. 16/265,938, mailed on May 28, 2020, 5 pages.
Applicant-Initiated Interview Summary received for U.S. Appl. No. 16/653,857, mailed on Dec. 14, 2020, 3 pages.
Applicant-Initiated Interview Summary received for U.S. Appl. No. 16/653,857, mailed on May 3, 2021, 4 pages.
Applicant-Initiated Interview Summary received for U.S. Appl. No. 17/103,436, mailed on Sep. 22, 2021, 2 pages.
Applicant-Initiated Interview Summary received for U.S. Appl. No. 17/505,252, mailed on May 26, 2023, 2 pages.
Applicant-Initiated Interview Summary received for U.S. Appl. No. 17/572,117, mailed on Feb. 1, 2023, 4 pages.
Applicant-Initiated Interview Summary received for U.S. Appl. No. 17/572,117, mailed on Nov. 17, 2022, 4 pages.
Baidu Experience, "iPhone how to move icon", Online available at: https://jingyan.baidu.com/article/eb9f7b6da4eacb869264e84f.html, Apr. 28, 2014, 4 pages.
Certificate of Examination received for Australian Patent Application No. 2017101561, mailed on Jun. 25, 2018, 2 Pages.
Certificate of Examination received for Australian Patent Application No. 2018101076, mailed on Apr. 11, 2019, 2 pages.
Clock & Calendar for SmartWatch 2, https://www.youtube.com/watch?v=Uj-K2vMnrj8, Nov. 20, 2013, 2 pages.
Corrected Notice of Allowance received for U.S. Appl. No. 14/641,287, mailed on Aug. 9, 2018, 2 pages.
Corrected Notice of Allowance received for U.S. Appl. No. 14/641,287, mailed on Sep. 12, 2018, 2 pages.
Corrected Notice of Allowance received for U.S. Appl. No. 14/913,349, mailed on Nov. 3, 2022, 2 pages.
Corrected Notice of Allowance received for U.S. Appl. No. 14/913,349, mailed on Oct. 3, 2022, 3 pages.
Corrected Notice of Allowance received for U.S. Appl. No. 14/913,349, mailed on Sep. 1, 2022, 2 pages.
Corrected Notice of Allowance received for U.S. Appl. No. 15/930,300, mailed on Dec. 24, 2020, 3 pages.
Corrected Notice of Allowance received for U.S. Appl. No. 17/103,436, mailed on Dec. 22, 2021, 2 pages.
Decision of Appeal received for Korean Patent Application No. 10-2021-7017259, mailed on Jun. 29, 2022, 28 pages.
Decision on Appeal received for Korean Patent Application No. 10-2016-7008449, mailed on Jul. 30, 2019, 29 pages.
Decision on Received for Korean Patent Application No. 10-2018-7010872, mailed on Jan. 20, 2020, 20 pages.
Decision on Appeal received for U.S. Appl. No. 14/913,349, mailed on Apr. 20, 2022, 13 pages.
Decision to Grant received for Danish Patent Application No. PA201670117, mailed on Nov. 20, 2017, 2 pages.
Decision to Grant received for Danish Patent Application No. PA201770794, mailed on Nov. 11, 2019, 2 pages.
Decision to Grant received for European Patent Application No. 14772001.5, mailed on Dec. 5, 2019, 2 pages.
Decision to Grant received for European Patent Application No. 15739110.3, mailed on Sep. 19, 2019, 2 pages.
Decision to Grant received for European Patent Application No. 19185318.3, mailed on Mar. 31, 2022, 3 pages.
Decision to Grant received for European Patent Application No. 19199004.3, mailed on Jan. 21, 2021, 2 pages.
Ellis Benus, "Use a Phone Number in the Google Calendar Where Line for One Click Calling", Available online at: https://ellisbenus.com/ellis-benus/use-a-phone-No. in-the-google-calender-where-line-for-one-click-calling, Ellis Benus-Small Business Web Guru, Oct. 3, 2012, 2 pages.
European Search Report received for European Patent Application No. 19199004.3, mailed on Nov. 12, 2019, 6 pages.
European Search Report received for European Patent Application No. 20217518.8, mailed on Apr. 16, 2021, 4 pages.
Examiner-Initiated Interview Summary received for U.S. Appl. No. 14/913,349, mailed on Oct. 27, 2020, 3 pages.

(56) References Cited

OTHER PUBLICATIONS

Examiner-Initiated Interview Summary received for U.S. Appl. No. 14/913,349, mailed on Sep. 22, 2021, 2 pages.
Examiner's Answer to Appeal Brief received for U.S. Appl. No. 14/913,349, mailed on Sep. 30, 2021, 23 pages.
Extended European Search Report (includes Partial European Search Report and European Search Opinion) received for European Patent Application No. 16190252.3, mailed on Mar. 1, 2017, 10 pages.
Extended European Search Report for European Application No. 19185318.3, mailed on Nov. 20, 2019, 8 pages.
Extended European Search Report received for European Patent Application No. 22157106.0, mailed on Jun. 27, 2022, 8 pages.
Final Office Action received for U.S. Appl. No. 14/641,287, mailed on Jul. 20, 2017, 18 pages.
Final Office Action received for U.S. Appl. No. 14/752,776, mailed on May 29, 2018, 36 pages.
Final Office Action received for U.S. Appl. No. 14/913,349, mailed on Jul. 22, 2019, 20 pages.
Final Office Action received for U.S. Appl. No. 14/913,349, mailed on Jul. 30, 2018, 18 pages.
Final Office Action received for U.S. Appl. No. 14/913,349, mailed on Oct. 30, 2020, 33 pages.
Final Office Action received for U.S. Appl. No. 15/049,052, mailed on Mar. 1, 2018, 15 pages.
Final Office Action received for U.S. Appl. No. 15/049,052, mailed on May 17, 2017, 13 pages.
Final Office Action received for U.S. Appl. No. 15/049,052, mailed on Oct. 2, 2018, 16 pages.
Final Office Action received for U.S. Appl. No. 16/130,838, mailed on May 29, 2020, 25 pages.
Final Office Action received for U.S. Appl. No. 16/265,938, mailed on Apr. 7, 2020, 45 pages.
Final Office Action received for U.S. Appl. No. 16/653,857, mailed on Feb. 10, 2021, 43 pages.
Final Office Action received for U.S. Appl. No. 17/572,117, mailed on Dec. 22, 2022, 16 pages.
Final Office Action received for U.S. Appl. No. 15/135,328 mailed on Nov. 9, 2018, 55 pages.
"How to move and arrange icons on iPhone", Available online on:—https://www.youtube.com/watch?v=5XKAk4wSons, Retrieved on Sep. 10, 2015, Dec. 11, 2011, 1 page.
Intention to Grant received for Danish Patent Application No. PA201670117, mailed on Apr. 21, 2017, 2 pages.
Intention to Grant received for Danish Patent Application No. PA201770794, mailed on Aug. 15, 2019, 2 pages.
Intention to Grant received for European Patent Application No. 14772001.5, mailed on Jul. 18, 2019, 16 pages.
Intention to Grant received for European Patent Application No. 14772001.5, mailed on Mar. 22, 2019, 17 pages.
Intention to Grant received for European Patent Application No. 15739110.3, mailed on Mar. 7, 2019, 8 pages.
Intention to Grant received for European Patent Application No. 15739110.3, mailed on Sep. 11, 2019, 6 pages.
Intention to Grant received for European Patent Application No. 19185318.3, mailed on Dec. 10, 2021, 12 pages.
Intention to Grant received for European Patent Application No. 19199004.3, mailed on Sep. 14, 2020, 9 pages.
International Preliminary Report on Patentability received for PCT Patent Application No. PCT/US2014/053957, mailed on Mar. 17, 2016, 8 pages.
International Preliminary Report on Patentability received for PCT Patent Application No. PCT/US2015/038173, mailed on Jan. 5, 2017, 10 pages.
International Preliminary Report on Patentability received for PCT Patent Application No. PCT/US2015/038174, mailed on Jan. 5, 2017, 27 pages.
International Preliminary Report on Patentability received for PCT Patent Application No. PCT/US2015/019303, mailed on Mar. 16, 2017, 22 pages.
International Search Report and Written Opinion received for PCT Patent Application No. PCT/US2014/053957, mailed on Feb. 19, 2015, 11 pages.
International Search Report and Written Opinion received for PCT Patent Application No. PCT/US2015/019303, mailed on Sep. 28, 2015, 27 pages.
International Search Report and Written Opinion received for PCT Patent Application No. PCT/US2015/038173 mailed on Sep. 25, 2015, 13 pages.
International Search Report and Written Opinion received for PCT Patent Application No. PCT/US2015/038174, mailed on Jan. 18, 2016, 38 pages.
Invitation to Pay Additional Fees received for PCT Patent Application No. PCT/US2015/038174, mailed on Oct. 5, 2015, 5 pages.
Jepson Tom, "How to auto-forward specific emails in gmail?", Available online at <http://www.tomjepson.co.uk/how-to-auto-forward-specific-emails-in-gmail/>, May 19, 2013, 7 pages.
Ldinos, "Bejeweled Blitz—PC Game", Online available at: https://www.youtube.com/watch?v=8-p3FAxjKTs, Apr. 7, 2010, 1 page.
Lyons et al., "Facet: A Multi-Segment Wrist Worn System", Online available at: <http://fetlab.io/publications/2012-Facet-a%20multi-segment%20wrist%20worn%20system.pdf>, Oct. 7-10, 2012, pp. 123-129.
Microsoft Outlook 2010(TM) A Beginners Guide, Available online at:—http://www.reading.ac.uk/web/files/its/outlook2010.pdf, Apr. 1, 2012, 24 pages.
Netsapiens, "Click to Call in MS Outlook", Available online at <https://netsapiens.com/click-to-call-in-ms-outlook-windows-apps/>, May 4, 2012, 8 pages.
Non-Final Office Action received for U.S. Appl. No. 14/641,287, mailed on Feb. 27, 2017, 18 Pages.
Non-Final Office Action received for U.S. Appl. No. 14/752,776, mailed on Jan. 2, 2018, 30 pages.
Non-Final Office Action received for U.S. Appl. No. 14/752,776, mailed on Nov. 5, 2018, 48 pages.
Non-Final Office Action received for U.S. Appl. No. 14/913,349, mailed on Apr. 2, 2019, 15 pages.
Non-Final Office Action received for U.S. Appl. No. 14/913,349, mailed on Apr. 22, 2020, 20 pages.
Non-Final Office Action received for U.S. Appl. No. 14/913,349, mailed on Jan. 2, 2020, 25 pages.
Non-Final Office Action received for U.S. Appl. No. 14/913,349, mailed on Jan. 11, 2018, 6 pages.
Non-Final Office Action received for U.S. Appl. No. 15/049,052, mailed on May 31, 2018, 15 pages.
Non-Final Office Action received for U.S. Appl. No. 15/049,052, mailed on Nov. 29, 2016, 13 pages.
Non-Final Office Action received for U.S. Appl. No. 15/049,052, mailed on Sep. 21, 2017, 14 pages.
Non-Final Office Action received for U.S. Appl. No. 15/135,328 mailed on Apr. 11, 2018, 64 pages.
Non-Final Office Action received for U.S. Appl. No. 16/130,838, mailed on Dec. 31, 2020, 29 pages.
Non-Final Office Action received for U.S. Appl. No. 16/130,838, mailed on Jan. 7, 2020, 16 pages.
Non-Final Office Action received for U.S. Appl. No. 16/265,938, mailed on Nov. 4, 2019, 28 pages.
Non-Final Office Action received for U.S. Appl. No. 16/653,857, mailed on Jul. 9, 2020, 35 pages.
Non-Final Office Action received for U.S. Appl. No. 16/653,857, mailed on Jul. 22, 2021, 45 pages.
Non-Final Office Action received for U.S. Appl. No. 17/103,436, mailed on Aug. 18, 2021, 16 pages.
Non-Final Office Action received for U.S. Appl. No. 17/505,252, mailed on Apr. 17, 2023, 9 pages.
Non-Final Office Action received for U.S. Appl. No. 17/508,894, mailed on Dec. 15, 2022, 10 pages.
Non-Final Office Action received for U.S. Patent Application No. 17/572, 117, mailed on Oct. 6, 2022, 15 pages.
Notice of Acceptance received for Australian Patent Application No. 2014315324, mailed on Sep. 28, 2017, 3 pages.
Notice of Acceptance received for Australian Patent Application No. 2015279544, mailed on Mar. 1, 2018, 3 pages.

(56) References Cited

OTHER PUBLICATIONS

Notice of Acceptance received for Australian Patent Application No. 2016231598, mailed on Mar. 1, 2018, 3 pages.
Notice of received for Australian Patent Application No. 2017276285, mailed on Apr. 3, 2019, 3 pages.
Notice of Acceptance received for Australian Patent Application No. 2018204286, mailed on Feb. 27, 2020, 3 pages.
Notice of Acceptance received for Australian Patent Application No. 2019206101, mailed on Dec. 11, 2020, 3 pages.
Notice of Acceptance received for Australian Patent Application No. 2020203919, mailed on Sep. 3, 2021, 3 pages.
Notice of Acceptance received for Australian Patent Application No. 2021201748, mailed on Jun. 23, 2022, 3 pages.
Notice of Acceptance received for Australian Patent Application No. 2021277718, mailed on Mar. 3, 2023, 3 pages.
Notice of Acceptance received for Australian Patent Application No. 2015279545, mailed on Feb. 9, 2018, 3 pages.
Notice of Allowance received for Chinese Patent Application No. 201480060044.1, mailed on Mar. 29, 2019, 3 pages.
Notice of Allowance received for Chinese Patent Application No. 2015800290543, mailed on Jul. 19, 2019, 2 pages.
Notice of Allowance received for Chinese Patent Application No. 201580046331.1, mailed on Jun. 24, 2020, 4 pages.
Notice of Allowance received for Chinese Patent Application No. 201910446753.8, mailed on Jun. 29, 2022, 2 pages.
Notice of Allowance received for Chinese Patent Application No. 201910447678.7, mailed on Jun. 20, 2022, 2 pages.
Notice of Allowance received for Japanese Patent Application No. 2016-537946, mailed on Mar. 26, 2018, 4 pages.
Notice of Allowance received for Japanese Patent Application No. 2018-083313, mailed on Jul. 1, 2019, 4 pages.
Notice of Allowance received for Japanese Patent Application No. 2019-138053, mailed on Jul. 2, 2021, 4 pages.
Notice of Allowance received for Japanese Patent Application No. 2021-126843, mailed on Jan. 6, 2023, 4 pages.
Notice of Allowance received for Korean Patent Application No. 10-2016-7008449, mailed on Aug. 9, 2019, 6 pages.
Notice of Allowance received for Korean Patent Application No. 10-2018-7010872, mailed on Feb. 10, 2020, 6 pages.
Notice of Allowance received for Korean Patent Application No. 10-2019-7007748, mailed on May 6, 2020, 5 pages.
Notice of Allowance received for Korean Patent Application No. 10-2020-7022802, mailed on Mar. 4, 2021, 6 pages.
Notice of Allowance received for Taiwanese Patent Application No. 103130517, issued on May 14, 2018, 5 pages.
Notice of Allowance received for Taiwanese Patent Application No. 104107317, mailed on Oct. 18, 2017, 7 pages.
Notice of Allowance received for U.S. Appl. No. 14/641,287, mailed on Jun. 28, 2018, 8 pages.
Notice of Allowance received for U.S. Appl. No. 14/913,349, mailed on Jul. 15, 2022, 6 pages.
Notice of Allowance received for U.S. Appl. No. 15/049,052, mailed on Sep. 16, 2019, 5 pages.
Notice of Allowance received for U.S. Appl. No. 15/135,328, mailed on Jul. 1, 2019, 25 pages.
Notice of Allowance received for U.S. Appl. No. 15/930,300, mailed on Aug. 5, 2020, 14 pages.
Notice of Allowance received for U.S. Appl. No. 16/130,838, mailed on Jun. 16, 2021, 12 pages.
Notice of Allowance received for U.S. Appl. No. 16/265,938, mailed on Oct. 15, 2020, 8 pages.
Notice of Allowance received for U.S. Appl. No. 16/653,857, mailed on Feb. 16, 2022, 34 pages.
Notice of Allowance received for U.S. Appl. No. 17/103,436, mailed on Dec. 8, 2021, 12 pages.
Notice of Allowance received for U.S. Appl. No. 17/505,252, mailed on Aug. 11, 2023, 8 pages.
Notice of Allowance received for U.S. Appl. No. 17/508,894, mailed on Apr. 19, 2023, 19 pages.
Notice of Allowance received for U.S. Appl. No. 17/572,117, mailed on Apr. 4, 2023, 9 pages.
Notice of Hearing received for Indian Patent Application No. 201617008296, mailed on Sep. 11, 2022, 3 pages.
Office Action received for Danish Patent Application No. PA201770794, mailed on Dec. 19, 2017, 8 pages.
Office Action received for Korean Patent Application No. 10-2018-7010872, mailed on Dec. 21, 2018, 7 pages.
Office Action received for Australian Patent Application No. 2014315324, mailed on Aug. 8, 2017, 3 pages.
Office Action received for Australian Patent Application No. 2014315324, mailed on Oct. 21, 2016, 3 pages.
Office Action received for Australian Patent Application No. 2015279544, mailed on Apr. 18, 2017, 4 pages.
Office Action received for Australian Patent Application No. 2015279544, mailed on Feb. 13, 2018, 5 pages.
Office Action received for Australian Patent Application No. 2016231598, mailed on Apr. 7, 2017, 5 pages.
Office Action received for Australian Patent Application No. 2017100207, mailed on Apr. 6, 2017, 4 pages.
Office Action received for Australian Patent Application No. 2017100207, mailed on Jul. 10, 2017, 3 pages.
Office Action received for Australian Patent Application No. 2017101561, mailed on Dec. 22, 2017, 4 pages.
Office Action received for Australian Patent Application No. 2017276285, mailed on Nov. 26, 2018, 2 pages.
Office Action received for Australian Patent Application No. 2018101076, mailed on Oct. 16, 2018, 5 pages.
Office Action received for Australian Patent Application No. 2018204286, mailed on Apr. 17, 2019, 5 pages.
Office Action received for Australian Patent Application No. 2018204286, mailed on Nov. 12, 2019, 5 pages.
Office Action received for Australian Patent Application No. 2018204286, mailed on Sep. 5, 2019, 5 pages.
Office Action received for Australian Patent Application No. 2019206101, mailed on Jul. 14, 2020, 4 pages.
Office Action received for Australian Patent Application No. 2020203919, mailed on Dec. 23, 2020, 5 pages.
Office Action received for Australian Patent Application No. 2020203919, mailed on Jul. 19, 2021, 7 pages.
Office Action received for Australian Patent Application No. 2020203919, mailed on Mar. 30, 2021, 5 pages.
Office Action received for Australian Patent Application No. 2020203919, mailed on Oct. 19, 2020, 5 pages.
Office Action received for Australian Patent Application No. 2021201748, mailed on Mar. 18, 2022, 6 pages.
Office Action received for Australian Patent Application No. 2021277718, mailed on Dec. 5, 2022, 3 pages.
Office Action received for Australian Patent Application No. 2021277718, mailed on Jan. 23, 2023, 4 pages.
Office Action received for Australian Patent Application No. 2021277718, mailed on Oct. 17, 2022, 4 pages.
Office Action received for Australian Patent Application No. 2022235585, mailed on Jul. 27, 2023, 4 pages.
Office Action received for Australian Patent Application No. 2023202432, mailed on Sep. 18, 2023, 4 pages.
Office Action received for Australian Patent Application No. 2015279545, mailed on Apr. 13, 2017, 3 pages.
Office Action received for Chinese Patent Application No. 201480060044.1, mailed on Jan. 26, 2018, 15 pages.
Office Action received for Chinese Patent Application No. 201480060044.1, mailed on Sep. 25, 2018, 6 pages.
Office Action received for Chinese Patent Application No. 201580029054.3, mailed on Dec. 5, 2018, 12 pages.
Office Action received for Chinese Patent Application No. 201580046331.1, mailed on Apr. 23, 2020, 15 pages.
Office Action received for Chinese Patent Application No. 201580046331.1, mailed on Aug. 2, 2019, 18 pages.
Office Action received for Chinese Patent Application No. 201910446753.8, mailed on Mar. 2, 2022, 11 pages.
Office Action received for Chinese Patent Application No. 201910447678.7, mailed on Mar. 21, 2022, 14 pages.

(56) References Cited

OTHER PUBLICATIONS

Office Action received for Chinese Patent Application No. 201910447678.7, mailed on Nov. 29, 2021, 17 pages.
Office Action received for Chinese Patent Application No. 201910875660.7, mailed on Aug. 12, 2023, 15 pages.
Office Action received for Chinese Patent Application No. 201910875660.7, mailed on Dec. 26, 2022, 7 pages.
Office Action received for Danish Patent Application No. PA201670117, mailed on Jan. 12, 2017, 3 pages.
Office Action received for Danish Patent Application No. PA201670117, mailed on Jun. 13, 2016, 10 pages.
Office Action received for Danish Patent Application No. PA201770103, mailed on Dec. 11, 2018, 2 pages.
Office Action received for Danish Patent Application No. PA201770103, mailed on Jan. 16, 2018, 2 Pages.
Office Action received for Danish Patent Application No. PA201770794, mailed on Apr. 5, 2018, 4 pages.
Office Action received for Danish Patent Application No. PA201770794, mailed on Jun. 13, 2019, 2 pages.
Office Action received for Danish Patent Application No. PA201770794, mailed on Oct. 30, 2018, 3 pages.
Office Action received for European Patent Application No. 14772001.5, mailed on Feb. 14, 2018, 5 pages.
Office Action received for European Patent Application No. 14772001.5, mailed on May 30, 2017, 10 pages.
Office Action Received for European Patent Application No. 15739109.5, mailed on Jan. 31, 2018, 7 pages.
Office Action Received for European Patent Application No. 15739110.3, mailed on Jan. 31, 2018, 8 pages.
Office Action received for European Patent Application No. 16190252.3, mailed on Feb. 19, 2018, 7 pages.
Office Action received for European Patent Application No. 19199004.3, mailed on Nov. 22, 2019, 10 pages.
Office Action received for European Patent Application No. 20217518.8, mailed on Apr. 30, 2021, 8 pages.
Office Action received for European Patent Application No. 20217518.8, mailed on Jul. 6, 2022, 5 pages.
Office Action received for Indian Patent Application No. 201617008296, mailed on Jan. 14, 2020, 7 pages.
Office Action received for Indian Patent Application No. 202018015998, mailed on Nov. 17, 2021, 6 pages.
Office Action received for Indian Patent Application No. 202018016000, mailed on Nov. 16, 2021, 6 pages.
Office Action received for Japanese Patent Application No. 2016-537946, mailed on Aug. 7, 2017, 8 pages.
Office Action received for Japanese Patent Application No. 2016-537946, mailed on Jan. 30, 2017, 12 pages.
Office Action received for Japanese Patent Application No. 2018-083313, mailed on Feb. 12, 2019, 4 pages.
Office Action received for Japanese Patent Application No. 2019-138053, mailed on Oct. 2, 2020, 6 pages.
Office Action received for Japanese Patent Application No. 2021-126843, mailed on Aug. 29, 2022, 6 pages.
Office Action received for Korean Patent Application No. 10-2016-7008449, mailed on Jan. 12, 2017, 15 pages.
Office Action received for Korean Patent Application No. 10-2016-7008449, mailed on Jan. 16, 2018, 10 pages.
Office Action received for Korean Patent Application No. 10-2016-7008449, mailed on Nov. 27, 2017, 6 pages.
Office Action received for Korean Patent Application No. 10-2018-7010872, mailed on May 21, 2018, 10 pages.
Office Action received for Korean Patent Application No. 10-2019-7007748, mailed on Nov. 15, 2019, 9 pages.
Office Action received for Korean Patent Application No. 10-2020-7022802, mailed on Aug. 28, 2020, 7 pages.
Office Action received for Korean Patent Application No. 10-2021-7017259, mailed on Jan. 10, 2022, 6 pages.
Office Action received for Korean Patent Application No. 10-2021-7017259, mailed on Jul. 19, 2021, 10 pages.
Office Action received for Korean Patent Application No. 10-2021-7017259, mailed on Mar. 3, 2022, 8 pages.
Office Action received for Korean Patent Application No. 10-2018-7010872, mailed on Feb. 13, 2019, 7 pages.
Office Action received for Taiwanese Patent Application No. 103130517, issued on Feb. 6, 2018, 5 pages.
Office Action received for Taiwanese Patent Application No. 103130517, issued on Feb. 22, 2016, 7 pages.
Office Action received for Taiwanese Patent Application No. 103130517, issued on Jul. 29, 2016, 7 pages.
Office Action received for Taiwanese Patent Application No. 104107317, mailed on Mar. 28, 2017, 39 pages.
Office Action received for Taiwanese Patent Application No. 104120843, mailed on Jan. 30, 2016, 5 pages.
Patel Amit, "Hexagonal Grids", Available online at:—http://www.redblobgames.com/grids/hexagons/, 36 pages.
Patel Amit, "Amit's Thoughts on Grids", Available online at:—http://www-cs-students.stanford.edu/~amitp/game-programming/grids/, Jan. 9, 2006, 22 pages.
Record of Oral Hearing received for U.S. Appl. No. 14/913,349 mailed on Sep. 23, 2022, 12 pages.
Remote Phone Call, Available online at <https://web.archive.org/web/20140625104844/https://www.justremotephone.com/>, Jun. 25, 2014, 22 pages.
Responding to a meeting invitation, Available online at:—https://web.archive.org/web/20121128174157/https://www.zimbra.com/desktop7/help/en_US/Calendar/Responding_to_an_invitation.htm, Nov. 28, 2012, 1 page.
Restriction Requirement received for U.S. Appl. No. 17/505,252, mailed on Dec. 13, 2022, 5 pages.
Search Report received for Danish Patent Application No. PA201770103, mailed on Jun. 9, 2017, 9 Pages.
Shestopalyuk Ruslan, "Hexagonal grid math", Feb. 15, 2011, 7 Pages.
Summons to Attend Oral Proceedings received for European Patent Application No. 14772001.5, mailed on Nov. 14, 2018, 5 pages.
Summons to Attend Oral Proceedings received for European Patent Application No. 14772001.5, mailed on Oct. 4, 2018, 15 pages.
Summons to Attend Oral Proceedings received for European Patent Application No. 15739109.5, mailed on Aug. 23, 2018, 9 pages.
Summons to Attend Oral Proceedings received for European Patent Application No. 15739109.5, mailed on Oct. 4, 2018, 3 pages.
Summons to Attend Oral Proceedings received for European Patent Application No. 15739110.3, mailed on Aug. 23, 2018, 10 pages.
Summons to Attend Oral Proceedings received for European Patent Application No. 15739110.3, mailed on Oct. 2, 2018, 3 pages.
Summons to Attend Oral Proceedings received for European Patent Application No. 16190252.3, mailed on Jan. 8, 2019, 3 pages.
Summons to Attend Oral Proceedings received for European Patent Application No. 16190252.3, mailed on Oct. 30, 2018, 13 pages.
Supplemental Notice of Allowance received for U.S. Appl. No. 16/130,838, mailed on Jun. 28, 2021, 2 pages.
Tablet Talk, "Tablet Talk App: Frequently Asked Questions—Tablet Talk.", available at https://web.archive.org/web/20140625102903/http://1www.tablettal app.com/faq, Jun. 25, 2014, pp. 1-6.
Office Action received for Chinese Patent Application No. 202010941320.2, mailed on Apr. 19, 2024, 18 pages (7 pages of English Translation and 11 pages of Official Copy).
Office Action received for Japanese Patent Application No. 2023-015606, mailed on Mar. 8, 2024, 10 pages (5 pages of English Translation and 5 pages of Official Copy).
Applicant-Initiated Interview Summary received for U.S. Appl. No. 18/211,150, mailed on Jul. 24, 2024, 3 pages.
Mercedes-Benz Command Operating Instructions Manual, Online available at: https://www.mbusa.com/content/dam/mb-nafta/us/owners/manuals/2012/audio-and-comand/MY12_SLK_C_E_CLS_M_COMAND.pdf, 2012, 234 pages.
Notice of Allowance received for Japanese Patent Application No. 2023-015606, mailed on Jul. 12, 2024, 4 pages (1 page of English Translation and 3 pages of Official Copy).
Office Action received for Australian Patent Application No. 2022235585, mailed on Jul. 25, 2024, 5 pages.

(56) References Cited

OTHER PUBLICATIONS

Final Office Action received for U.S. Appl. No. 18/211,150, mailed on Jul. 2, 2024, 11 pages.
Office Action received for Australian Patent Application No. 2022235585, mailed on Jul. 8, 2024, 3 pages.
Office Action received for Japanese Patent Application No. 2023-015606, mailed on Jun. 21, 2024, 4 pages (2 pages of English Translation and 2 pages of Official Copy).
Office Action received for Chinese Patent Application No. 202010941320.2, mailed on Jun. 26, 2024, 15 pages (5 pages of English Translation and 10 pages of Official Copy).

* cited by examiner

908
In response to detecting the request to change the orientation of the user interface, display the user interface in a second orientation in which the height of the user interface is greater than the width of the user interface, including:

910
Displaying, in the user interface in the second orientation, a second arrangement of application widgets and application icons that includes the set of application widgets and the set of application icons, wherein:

912
The set of application widgets in the second arrangement have a same spatial organization as the set of application widgets in the first arrangement.

914
A position of a first application icon in the set of application icons relative to the spatial organization of the set of application widgets in the user interface in the second orientation is different from a position of the first application icon relative to the spatial organization of the set of application widgets in the user interface in the first orientation.

916
A position of a second application icon in the set of application icons relative to the spatial organization of the set of application widgets in the user interface in the second orientation is different from a position of the second application icon relative to the spatial organization of the set of application widgets in the user interface in the first orientation.

*FIG. 9B*

USER INTERFACES FOR MANAGING APPLICATION WIDGETS

CROSS-REFERENCE TO RELATED APPLICATIONS

This application is a continuation of U.S. patent application Ser. No. 17/505,252, filed Oct. 19, 2021, entitled "USER INTERFACES FOR MANAGING APPLICATION WIDGETS," which claims priority to U.S. Provisional Patent Application No. 63/197,433, entitled "USER INTERFACES FOR MANAGING APPLICATION WIDGETS," filed on Jun. 6, 2021, the content of which are hereby incorporated by reference in their entirety.

FIELD

The present disclosure relates generally to computer user interfaces, and more specifically to techniques for managing user interfaces with application widgets.

BACKGROUND

Electronic devices include applications and display user interfaces that include user interface elements, such as application icons for opening applications. User interfaces can be displayed in different orientations depending on the physical orientation of the electronic device.

BRIEF SUMMARY

Some techniques for managing user interfaces with application widgets using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing application widgets. Such methods and interfaces optionally complement or replace other methods for managing application widgets. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component and one or more input devices is described. The method comprises: receiving a request to display a home screen of the computer system, wherein the computer system was recently set up with an account; and in response to receiving the request to display the home screen of the computer system, displaying, via the display generation component, the home screen, wherein displaying the home screen includes: in accordance with a determination that a first set of criteria is met, the first set of criteria including a criterion that is met when the account that was used to set up the computer system is associated with a first type of content, displaying a first set of user interface elements on the home screen; and in accordance with a determination that a second set of criteria is met, the second set of criteria including a criterion that is met when the account that was used to set up the computer system is not associated with the first type of content, displaying a second set of user interface elements on the home screen, wherein the second set of user interface elements is different from the first set of user interface elements.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: receiving a request to display a home screen of the computer system, wherein the computer system was recently set up with an account; and in response to receiving the request to display the home screen of the computer system, displaying, via the display generation component, the home screen, wherein displaying the home screen includes: in accordance with a determination that a first set of criteria is met, the first set of criteria including a criterion that is met when the account that was used to set up the computer system is associated with a first type of content, displaying a first set of user interface elements on the home screen; and in accordance with a determination that a second set of criteria is met, the second set of criteria including a criterion that is met when the account that was used to set up the computer system is not associated with the first type of content, displaying a second set of user interface elements on the home screen, wherein the second set of user interface elements is different from the first set of user interface elements.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: receiving a request to display a home screen of the computer system, wherein the computer system was recently set up with an account; and in response to receiving the request to display the home screen of the computer system, displaying, via the display generation component, the home screen, wherein displaying the home screen includes: in accordance with a determination that a first set of criteria is met, the first set of criteria including a criterion that is met when the account that was used to set up the computer system is associated with a first type of content, displaying a first set of user interface elements on the home screen; and in accordance with a determination that a second set of criteria is met, the second set of criteria including a criterion that is met when the account that was used to set up the computer system is not associated with the first type of content, displaying a second set of user interface elements on the home screen, wherein the second set of user interface elements is different from the first set of user interface elements.

In accordance with some embodiments, a computer system configured to communicate with a display generation component and one or more input devices is described. The computer system comprises: one or more processors; and memory storing one or more programs configured to be executed by the one or more processors, the one or more programs including instructions for: receiving a request to display a home screen of the computer system, wherein the computer system was recently set up with an account; and in response to receiving the request to display the home screen of the computer system, displaying, via the display generation component, the home screen, wherein displaying the home screen includes: in accordance with a determination that a first set of criteria is met, the first set of criteria including a criterion that is met when the account that was used to set up the computer system is associated with a first type of content, displaying a first set of user interface elements on the home screen; and in accordance with a determination that a second set of criteria is met, the second set of criteria including a criterion that is met when the account that was used to set up the computer system is not associated with the first type of content, displaying a second set of user interface elements on the home screen, wherein the second set of user interface elements is different from the first set of user interface elements.

In accordance with some embodiments, a computer system configured to communicate with a display generation component and one or more input devices is described. The computer system comprises: means for receiving a request to display a home screen of the computer system, wherein the computer system was recently set up with an account; and means for, in response to receiving the request to display the home screen of the computer system, displaying, via the display generation component, the home screen, wherein displaying the home screen includes: in accordance with a determination that a first set of criteria is met, the first set of criteria including a criterion that is met when the account that was used to set up the computer system is associated with a first type of content, displaying a first set of user interface elements on the home screen; and in accordance with a determination that a second set of criteria is met, the second set of criteria including a criterion that is met when the account that was used to set up the computer system is not associated with the first type of content, displaying a second set of user interface elements on the home screen, wherein the second set of user interface elements is different from the first set of user interface elements.

In accordance with some embodiments, a computer program product is described. The computer program product comprises one or more programs configured to be executed by one or more processors of a computer system that is in communication with a display generation component and one or more input devices, the one or more programs including instructions for: receiving a request to display a home screen of the computer system, wherein the computer system was recently set up with an account; and in response to receiving the request to display the home screen of the computer system, displaying, via the display generation component, the home screen, wherein displaying the home screen includes: in accordance with a determination that a first set of criteria is met, the first set of criteria including a criterion that is met when the account that was used to set up the computer system is associated with a first type of content, displaying a first set of user interface elements on the home screen; and in accordance with a determination that a second set of criteria is met, the second set of criteria including a criterion that is met when the account that was used to set up the computer system is not associated with the first type of content, displaying a second set of user interface elements on the home screen, wherein the second set of user interface elements is different from the first set of user interface elements.

In accordance with some embodiments, a method performed at a computer system that is in communication with a display generation component and one or more input devices is described. The method comprises: displaying, via the display generation component, a user interface in a first orientation in which a height of the user interface in the first orientation is less than a width of the user interface, including: displaying, in the user interface in the first orientation, a first arrangement of application widgets and application icons that includes a set of application widgets that includes two or more application widgets and a set of application icons that includes two or more application icons, wherein: a respective application widget for a respective application is larger than a respective application icon for the respective application; and the respective application widget for the respective application includes more information from the respective application than the respective application icon for the respective application; and detecting a request to change an orientation of the user interface; and in response to detecting the request to change the orientation of the user interface, displaying the user interface in a second orientation in which the height of the user interface is greater than the width of the user interface, including: displaying, in the user interface in the second orientation, a second arrangement of application widgets and application icons that includes the set of application widgets and the set of application icons, wherein: the set of application widgets in the second arrangement has a same spatial organization as the set of application widgets in the first arrangement; a position of a first application icon in the set of application icons relative to the spatial organization of the set of application widgets in the user interface in the second orientation is different from a position of the first application icon relative to the spatial organization of the set of application widgets in the user interface in the first orientation; and a position of a second application icon in the set of application icons relative to the spatial organization of the set of application widgets in the user interface in the second orientation is different from a position of the second application icon relative to the spatial organization of the set of application widgets in the user interface in the first orientation.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a user interface in a first orientation in which a height of the user interface in the first orientation is less than a width of the user interface, including: displaying, in the user interface in the first orientation, a first arrangement of application widgets and application icons that includes a set of application widgets that includes two or more application widgets and a set of application icons that includes two or more application icons, wherein: a respective application widget for a respective application is larger than a respective application icon for the respective application; and the respective application widget for the respective application includes more information from the respective application than the respective application icon for the respective application; and detecting a request to change an orientation of the user interface; and in response to detecting the request to change the orientation of the user interface, displaying the user interface in a second orientation in which the height of the user interface is greater than the width of the user interface, including: displaying, in the user interface in the second orientation, a second arrangement of application widgets and application icons that includes the set of application widgets and the set of application icons, wherein: the set of application widgets in the second arrangement has a same spatial organization as the set of application widgets in the first arrangement; a position of a first application icon in the set of application icons relative to the spatial organization of the set of application widgets in the user interface in the second orientation is different from a position of the first application icon relative to the spatial organization of the set of application widgets in the user interface in the first orientation; and a position of a second application icon in the set of application icons relative to the spatial organization of the set of application widgets in the user interface in the second orientation is different from a position of the second application icon relative to the spatial organization of the set of application widgets in the user interface in the first orientation.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a user interface in a first orientation in which a height of the user interface in the first orientation is less than a width of the user interface, including: displaying, in the user interface in the first orientation, a first arrangement of application widgets and application icons that includes a set of application widgets that includes two or more application widgets and a set of application icons that includes two or more application icons, wherein: a respective application widget for a respective application is larger than a respective application icon for the respective application; and the respective application widget for the respective application includes more information from the respective application than the respective application icon for the respective application; and detecting a request to change an orientation of the user interface; and in response to detecting the request to change the orientation of the user interface, displaying the user interface in a second orientation in which the height of the user interface is greater than the width of the user interface, including: displaying, in the user interface in the second orientation, a second arrangement of application widgets and application icons that includes the set of application widgets and the set of application icons, wherein: the set of application widgets in the second arrangement has a same spatial organization as the set of application widgets in the first arrangement; a position of a first application icon in the set of application icons relative to the spatial organization of the set of application widgets in the user interface in the second orientation is different from a position of the first application icon relative to the spatial organization of the set of application widgets in the user interface in the first orientation; and a position of a second application icon in the set of application icons relative to the spatial organization of the set of application widgets in the user interface in the second orientation is different from a position of the second application icon relative to the spatial organization of the set of application widgets in the user interface in the first orientation.

In accordance with some embodiments, a computer system configured to communicate with a display generation component and one or more input devices is described. The computer system comprises: means for displaying, via the display generation component, a user interface in a first orientation in which a height of the user interface in the first orientation is less than a width of the user interface, including: means for displaying, in the user interface in the first orientation, a first arrangement of application widgets and application icons that includes a set of application widgets that includes two or more application widgets and a set of application icons that includes two or more application icons, wherein: a respective application widget for a respective application is larger than a respective application icon for the respective application; and the respective application widget for the respective application includes more information from the respective application than the respective application icon for the respective application; and means for detecting a request to change an orientation of the user interface; and means for, in response to detecting the request to change the orientation of the user interface, displaying the user interface in a second orientation in which the height of the user interface is greater than the width of the user interface, including: means for displaying, in the user interface in the second orientation, a second arrangement of application widgets and application icons that includes the set of application widgets and the set of application icons, wherein: the set of application widgets in the second arrangement has a same spatial organization as the set of application widgets in the first arrangement; a position of a first application icon in the set of application icons relative to the spatial organization of the set of application widgets in the user interface in the second orientation is different from a position of the first application icon relative to the spatial organization of the set of application widgets in the user interface in the first orientation; and a position of a second application icon in the set of application icons relative to the spatial organization of the set of application widgets in the user interface in the second orientation is different from a position of the second application icon relative to the spatial organization of the set of application widgets in the user interface in the first orientation.

In accordance with some embodiments, a computer program product is described. The computer program product comprises one or more programs configured to be executed by one or more processors of a computer system that is in communication with a display generation component and one or more input devices, the one or more programs including instructions for: displaying, via the display generation component, a user interface in a first orientation in which a height of the user interface in the first orientation is less than a width of the user interface, including: displaying, in the user interface in the first orientation, a first arrangement of application widgets and application icons that includes a set of application widgets that includes two or more application widgets and a set of application icons that includes two or more application icons, wherein: a respective application widget for a respective application is larger than a respective application icon for the respective application; and the respective application widget for the respective application includes more information from the respective application than the respective application icon for the respective application; and detecting a request to change an orientation of the user interface; and in response to detecting the request to change the orientation of the user interface, displaying the user interface in a second orientation in which the height of the user interface is greater than the width of the user interface, including: displaying, in the user interface in the second orientation, a second arrangement of application widgets and application icons that includes the set of application widgets and the set of application icons, wherein: the set of application widgets in the second arrangement has a same spatial organization as the set of application widgets in the first arrangement; a position of a first application icon in the set of application icons relative to the spatial organization of the set of application widgets in the user interface in the second orientation is different from a position of the first application icon relative to the spatial organization of the set of application widgets in the user interface in the first orientation; and a position of a second application icon in the set of application icons relative to the spatial organization of the set of application widgets in the user interface in the second orientation is different from a position of the second application icon relative to the spatial organization of the set of application widgets in the user interface in the first orientation.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing application widgets, thereby increasing the effectiveness, efficiency, and user satisfaction with such devices. Such methods and interfaces may complement or replace other methods for managing application widgets.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 9A-9B is a flow diagram illustrating methods of managing application widgets in accordance with some embodiments.

DESCRIPTION OF EMBODIMENTS

Figure 1A:
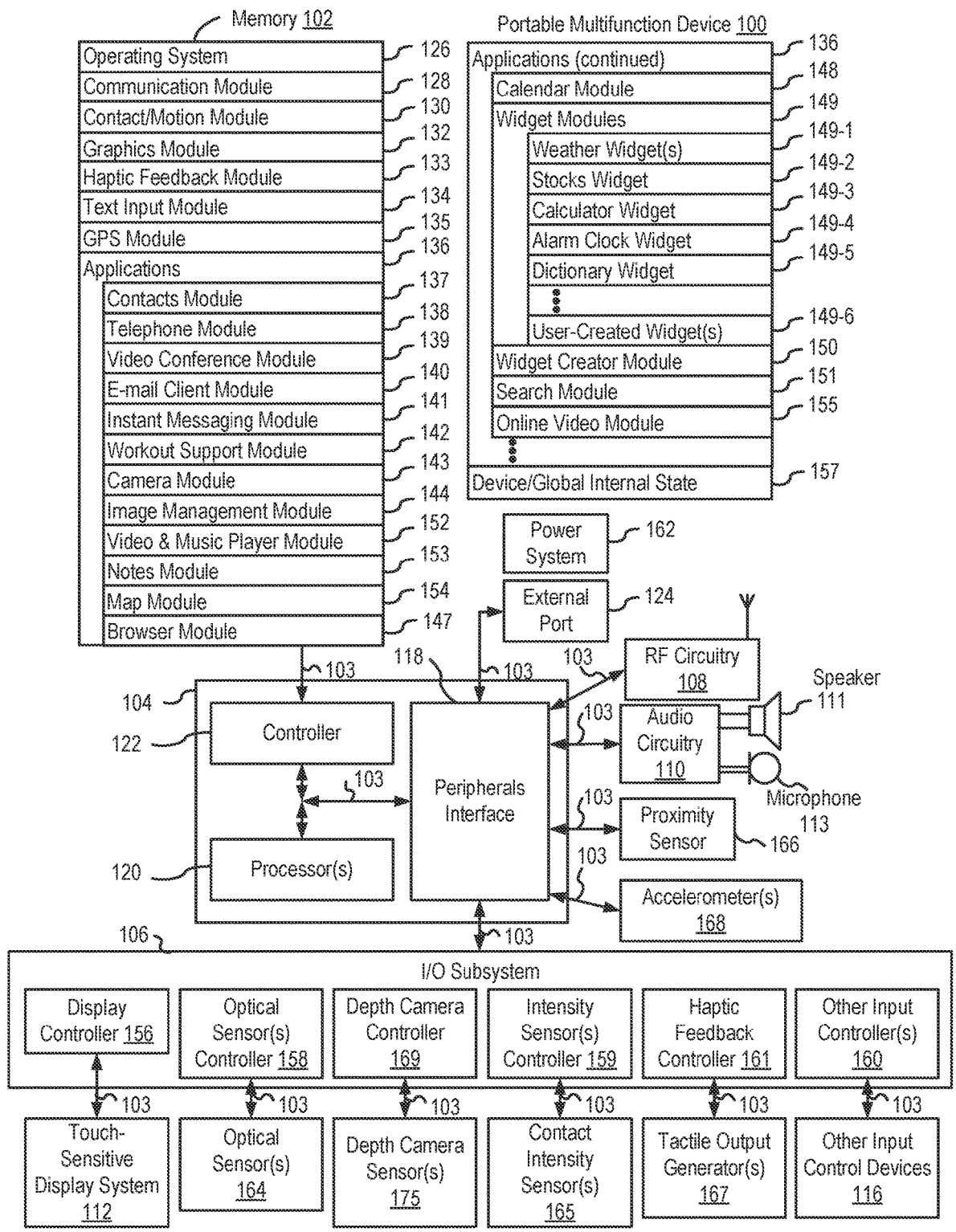
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing application widgets. In one example, in response to receiving a request to display a home screen of a computer system, the computer system displays a set of user interface elements, such as application widgets and/or application icons, based on an account that was used to set up the computer system, which enables the computer system to customize the home screen based on the account. In one example, in response to a request to change an orientation of a user interface that includes application icons and application widgets, a computer system displays the application widgets and application icons in an arrangement such that a set of application widgets has a same spatial organization as in a different orientation, which enables the computer system to maintain consistency in the relative positions of application widgets when changing the user interface from one orientation to another. Such techniques can reduce the cognitive burden on a user who uses application widgets, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing application widgets. FIGS. 6A-6M illustrate exemplary user interfaces for managing application widgets. FIG. 7 is a flow diagram illustrating methods of managing application widgets in accordance with some embodiments. The user interfaces in FIGS. 6A-6M are used to illustrate the processes described below, including the processes in FIG. 7. FIGS. 8A-8J illustrate exemplary user interfaces for accessing application widgets. FIGS. 9A-9B are a flow diagram illustrating methods of accessing application widgets in accordance with some embodiments. The user interfaces in FIGS. 8A-8J are used to illustrate the processes described below, including the processes in FIGS. 9A-9B.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
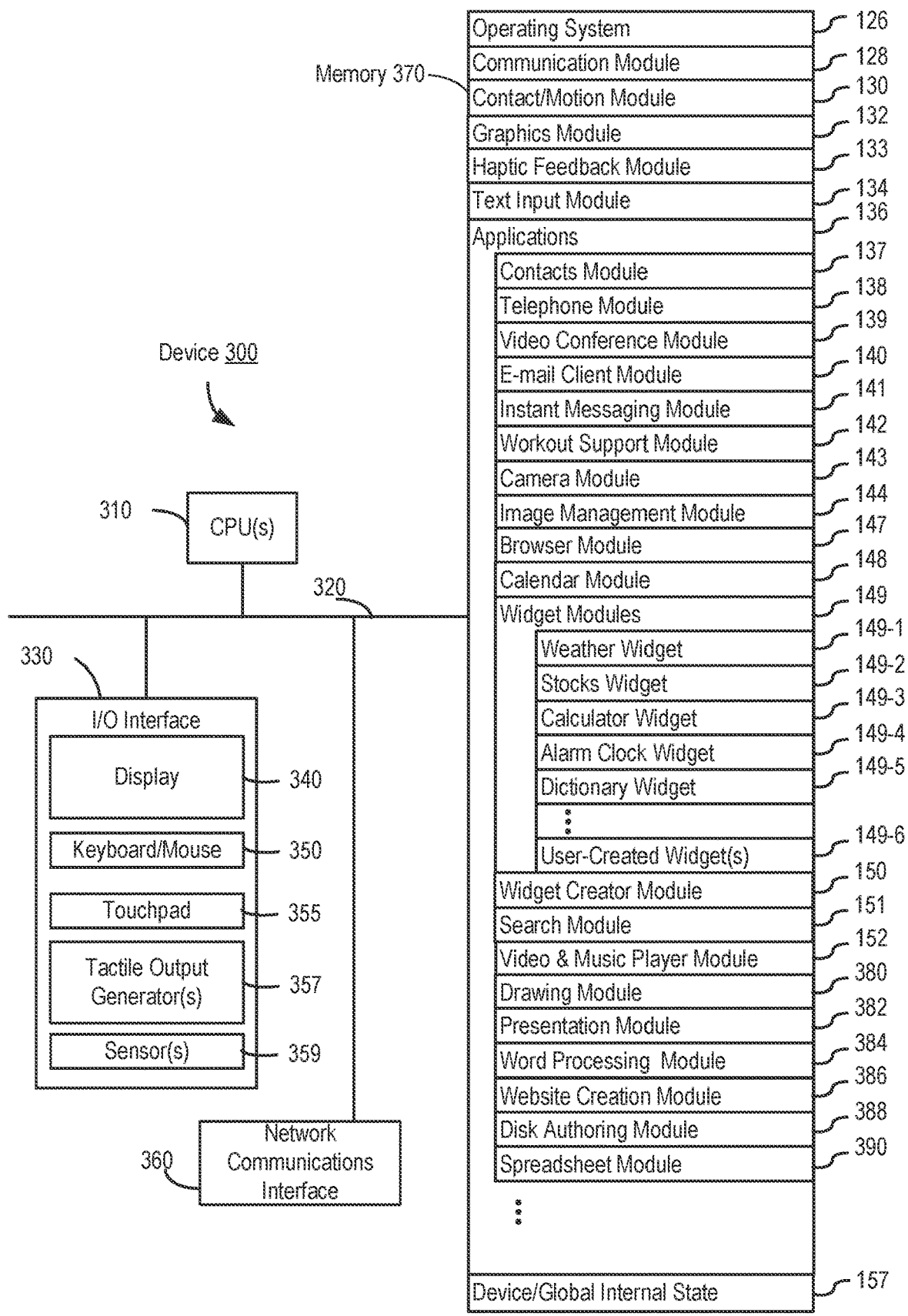
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
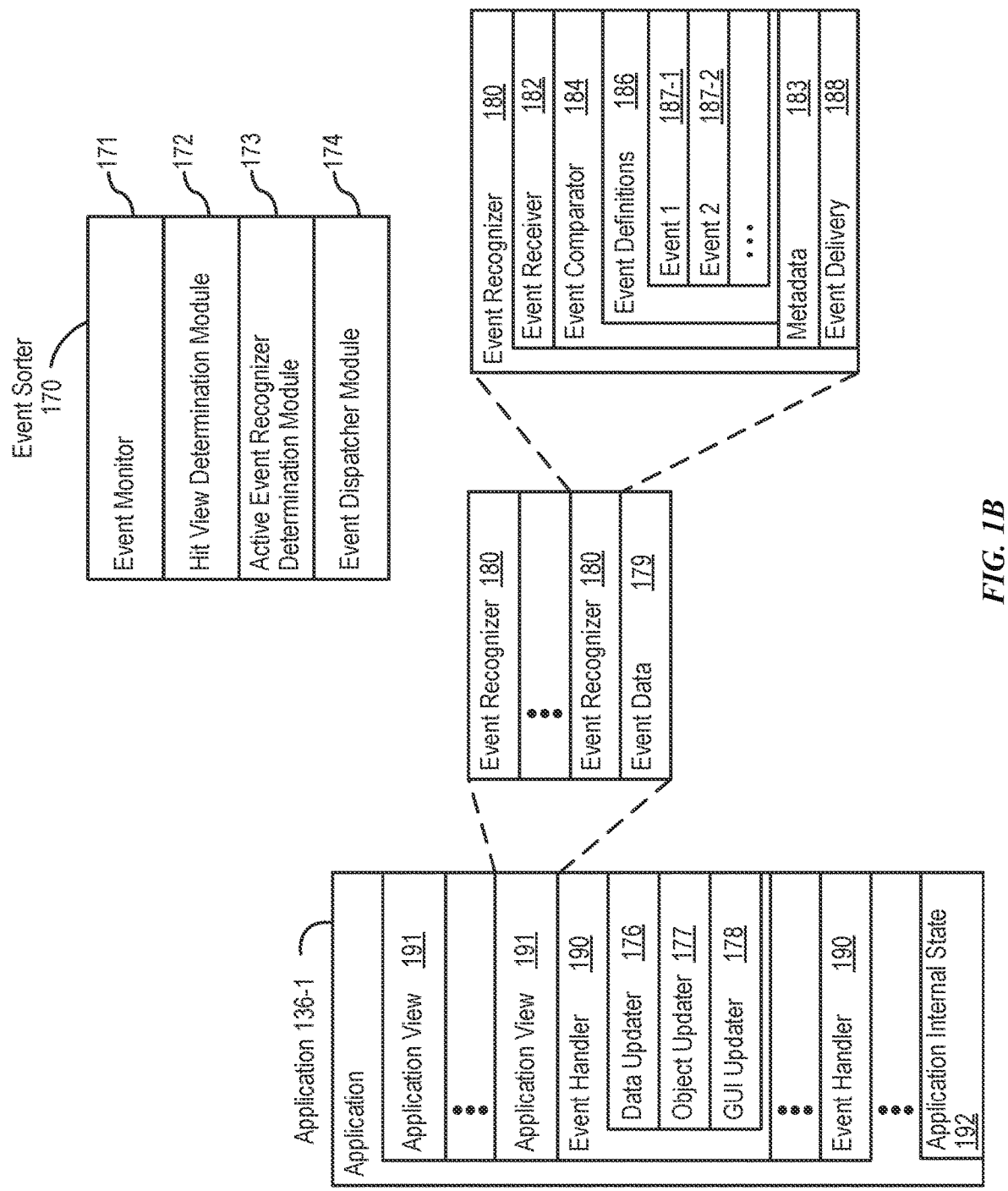
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
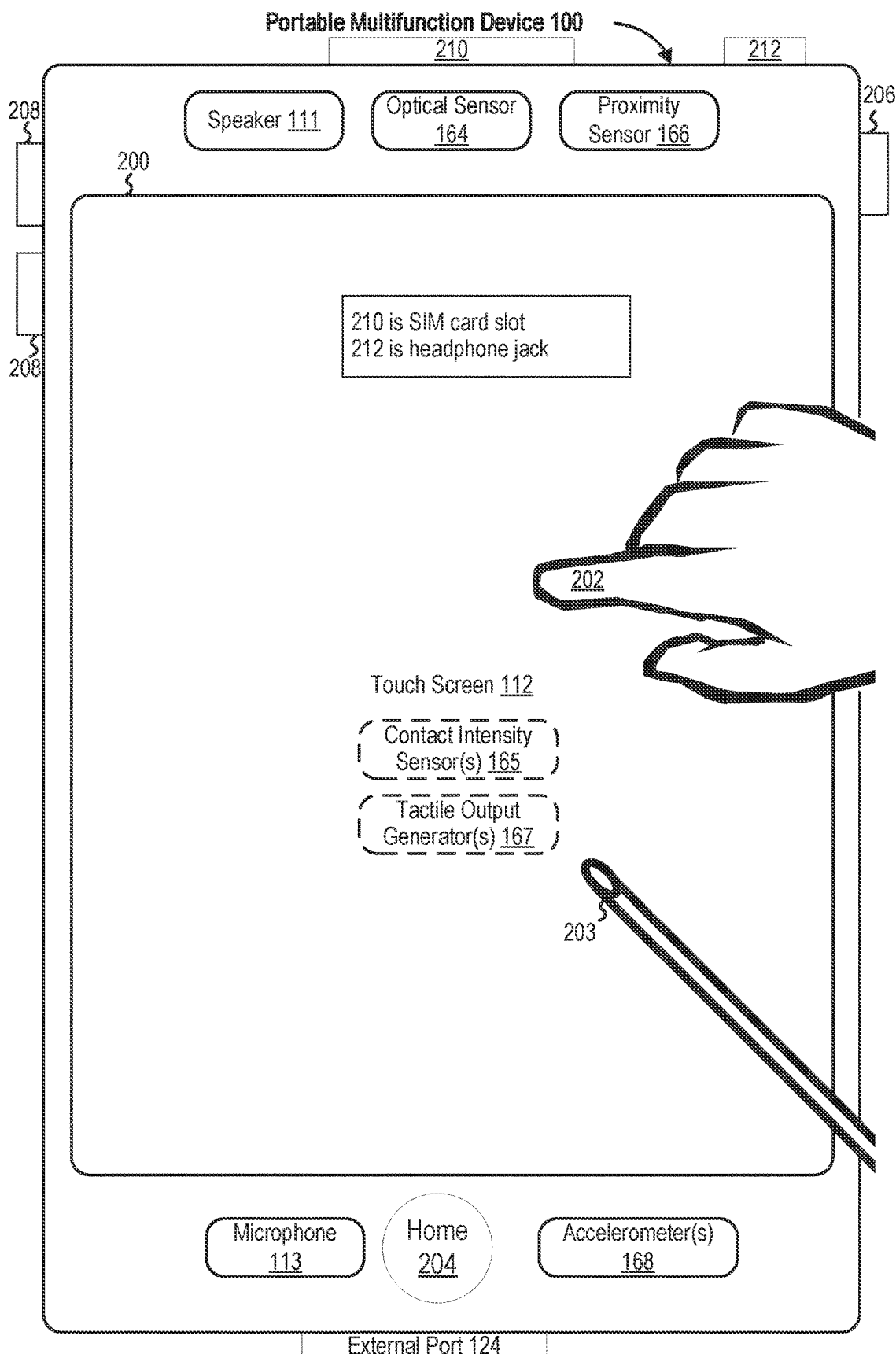
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
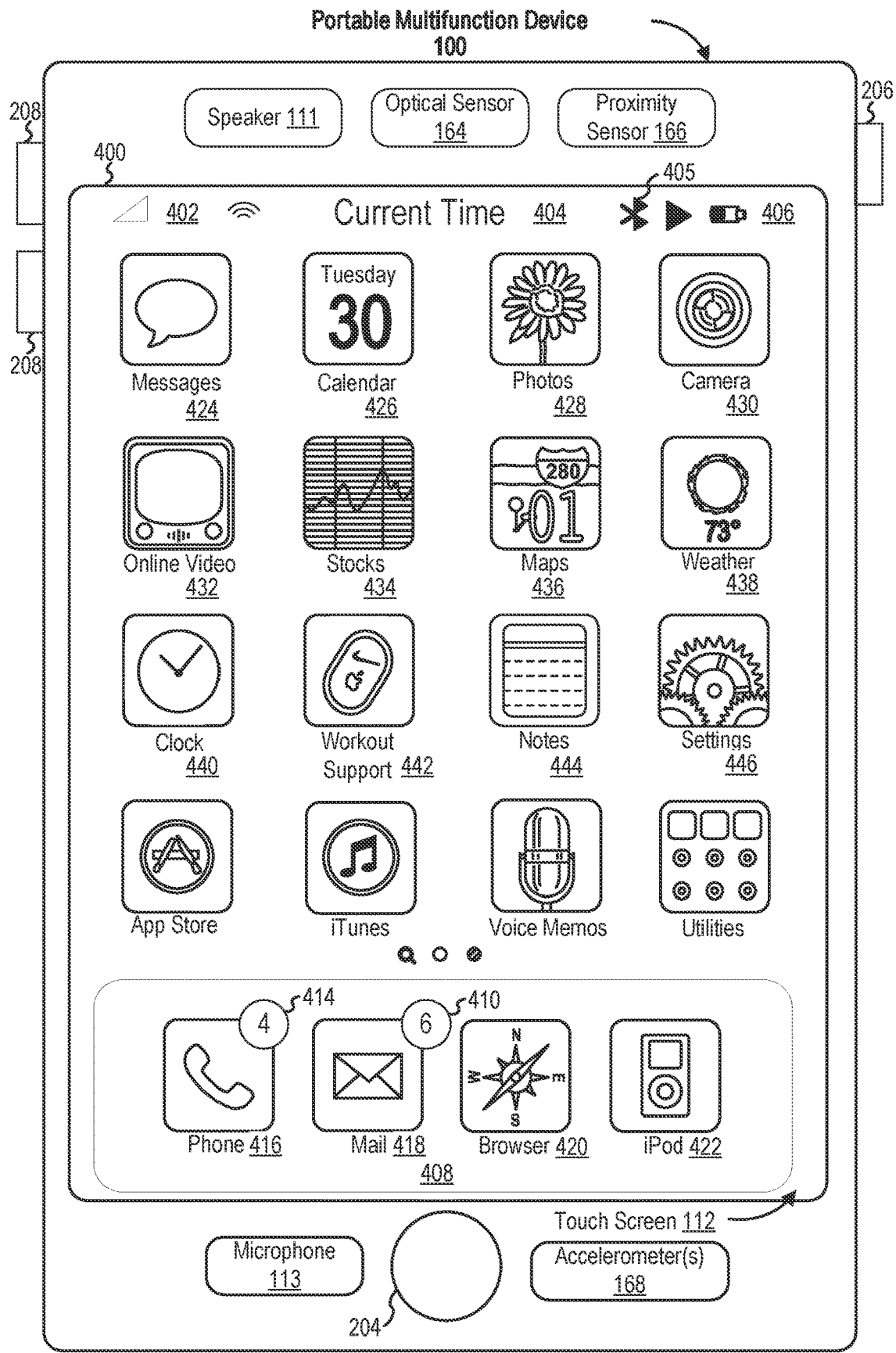
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
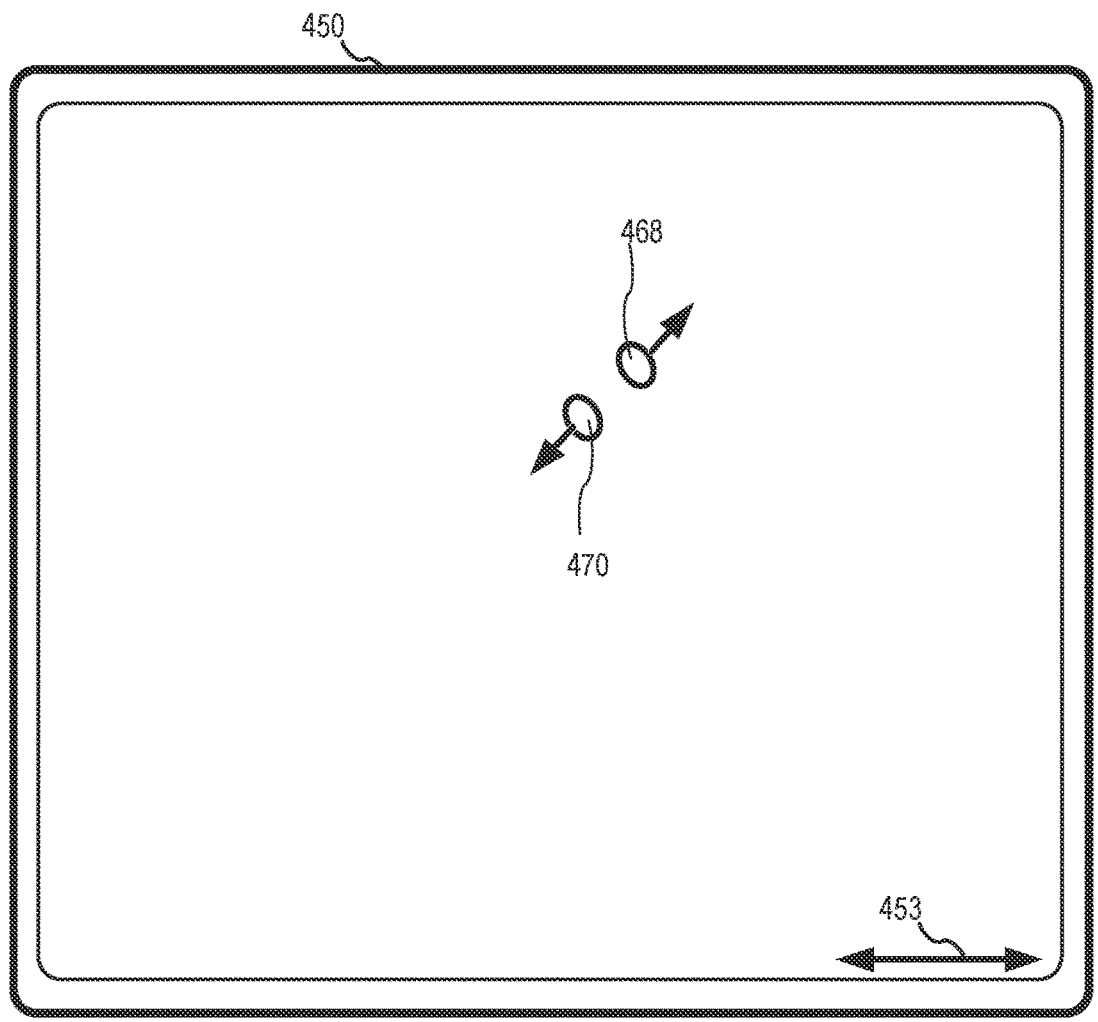
FIG. 4B illustrates an exemplary user interface for a multifunction device with a touch-sensitive surface that is separate from the display in accordance with some embodiments.
Figure 4B:
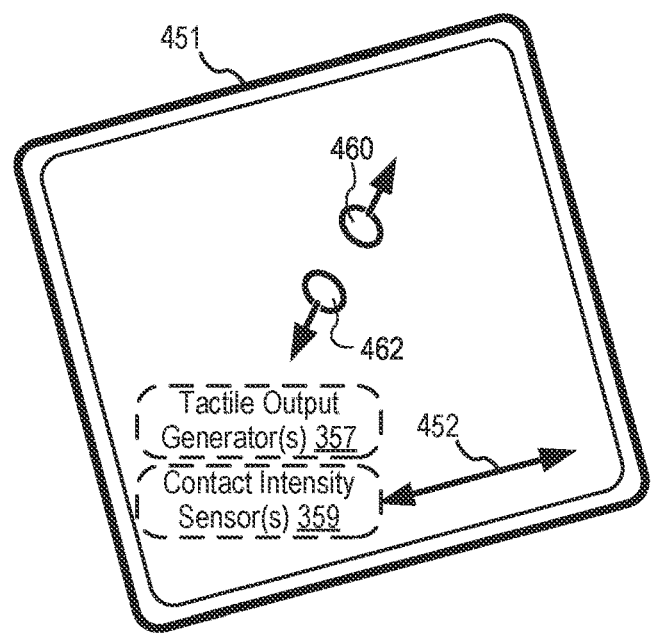

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
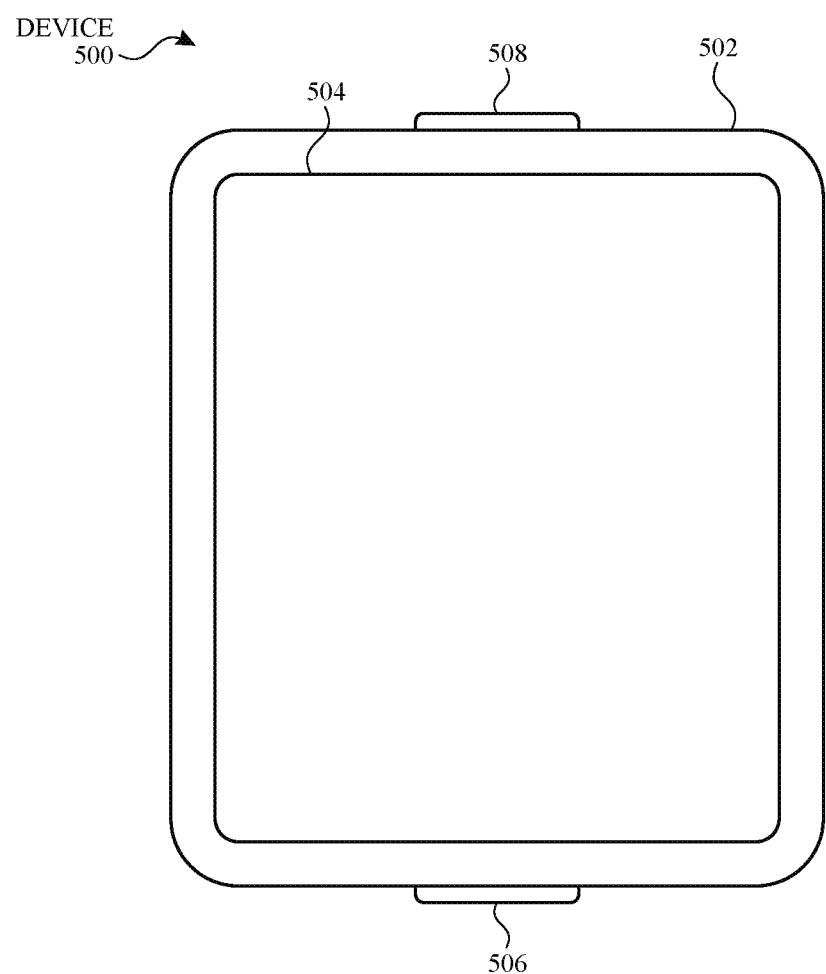
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
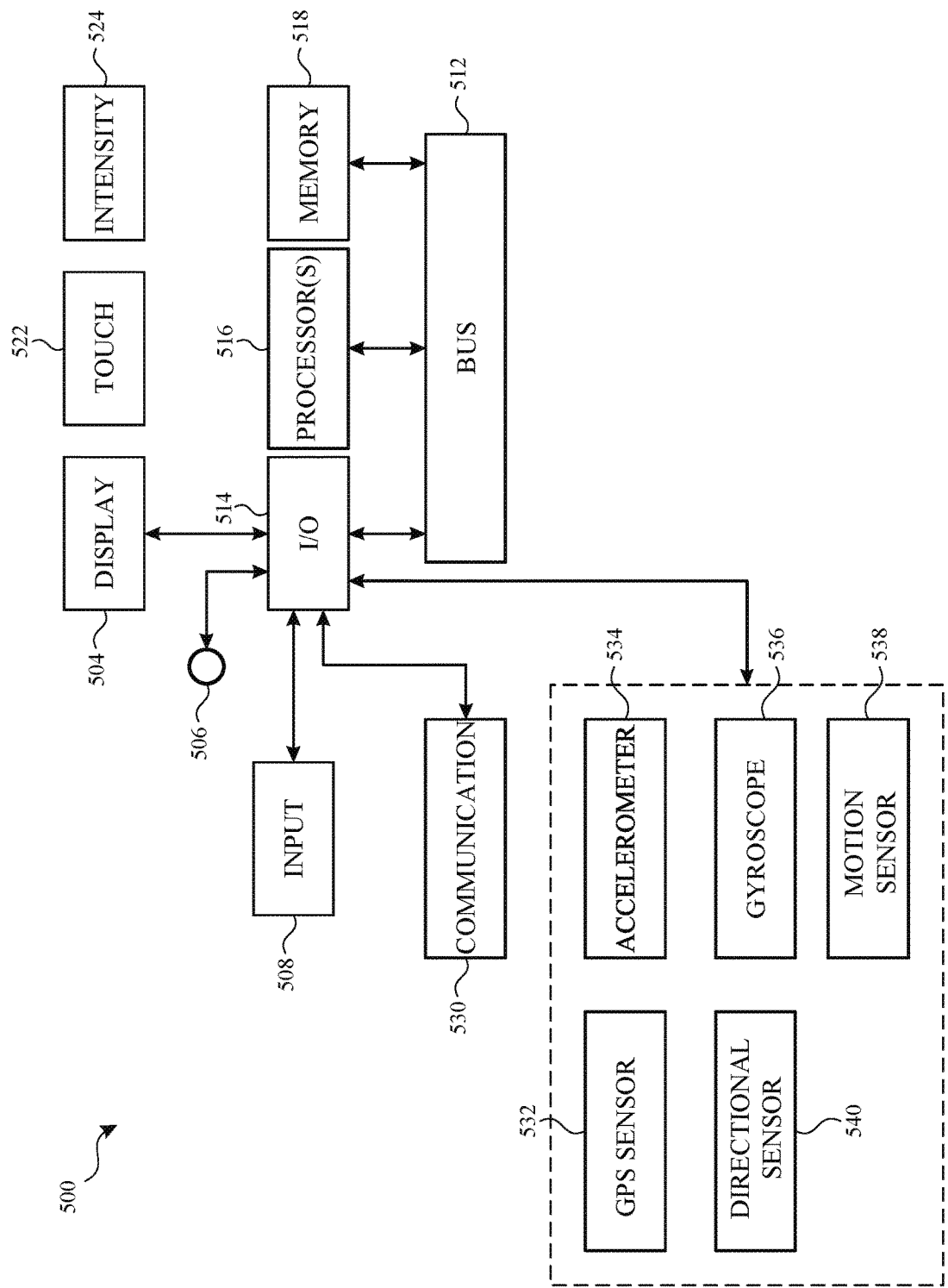
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9A-9B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6M illustrate exemplary techniques and user interfaces for configuring a home screen based on an account used to set up an electronic device, in accordance with some embodiments. The user interfaces in these figures are used to illustrate the processes described below, including the processes in FIG. 7.

Figure 6A:
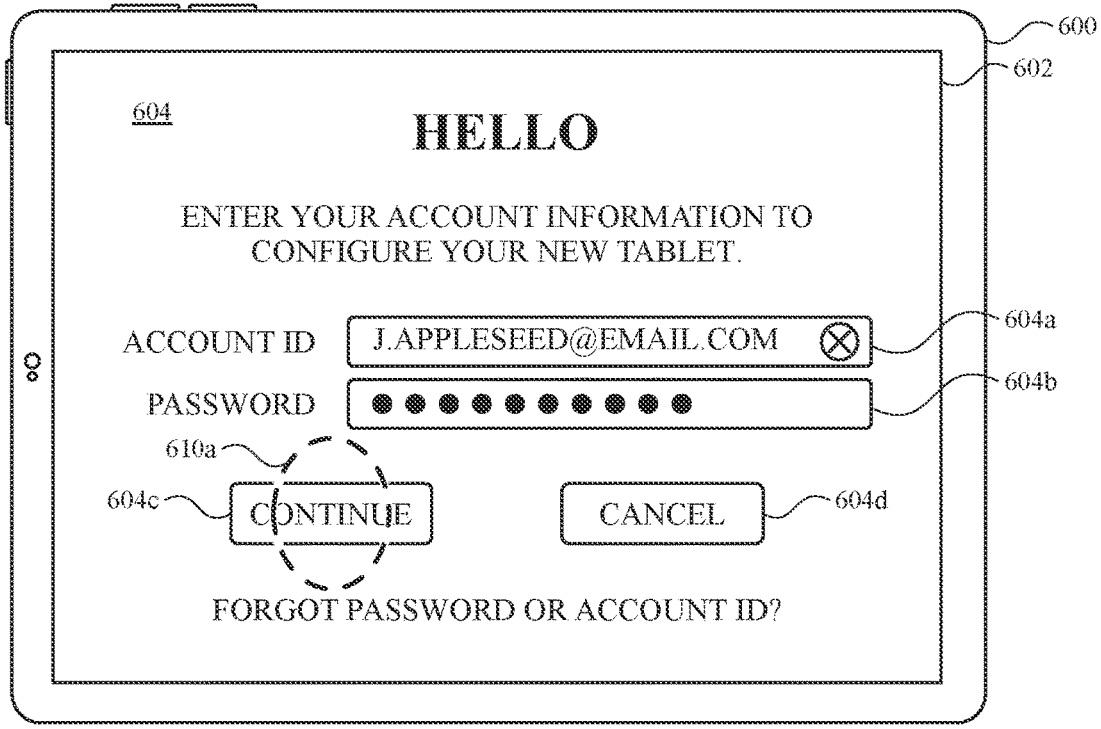
FIGS. 6A-6M illustrate techniques for managing application widgets in accordance with some embodiments.
Figure 7:
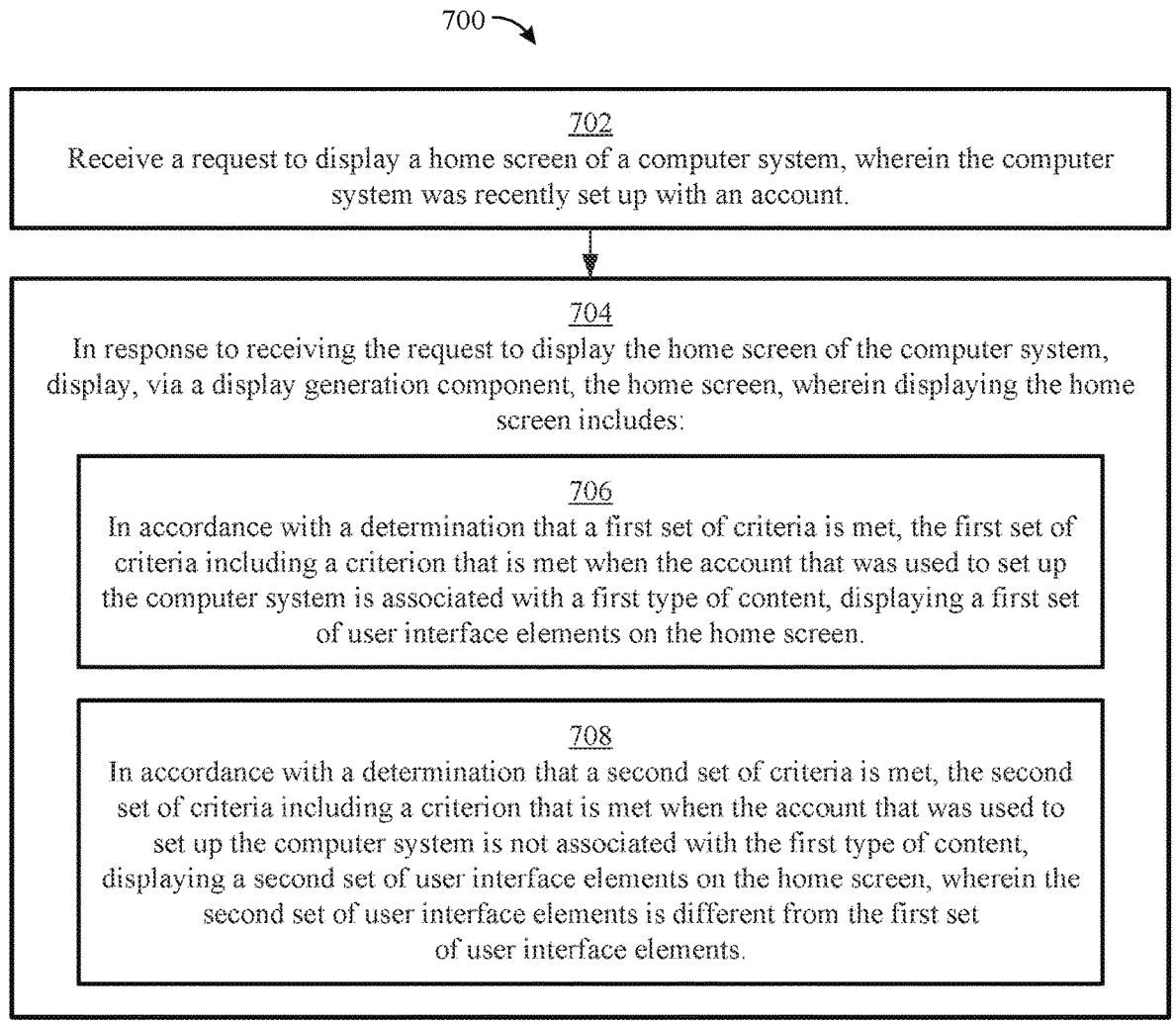
FIG. 7 is a flow diagram illustrating methods of managing application widgets in accordance with some embodiments.

FIG. 6A illustrates device 600 with display 602. In some embodiments, electronic device 600 includes one or more features of devices 100, 300, and/or 500. In FIG. 6A, device 600 displays login user interface 604, which includes account ID field 604a (populated with Account ID j.appleseed@email.com), password field 604b (populated with a password, as indicated by the privacy dots), continue option 604c, and cancel option 604d. In response to detecting input 610a on continue option 604c, device 600 is logged into with the account represented by account ID j.appleseed@email.com in account ID field 604a. In some embodiments, selecting continue option 604c in user interface 604 initiates (or continues) a process to set up or configure device 600 with account j.appleseed@email.com (e.g., to set up or configure a new device). In some embodiments, selecting continue option 604c in user interface 604 is a last step of a setup process in which device 600 is set up with the account j.appleseed@email.com (e.g., input 610a is a request to unlock device 600 after setup is completed).

Figure 6B:
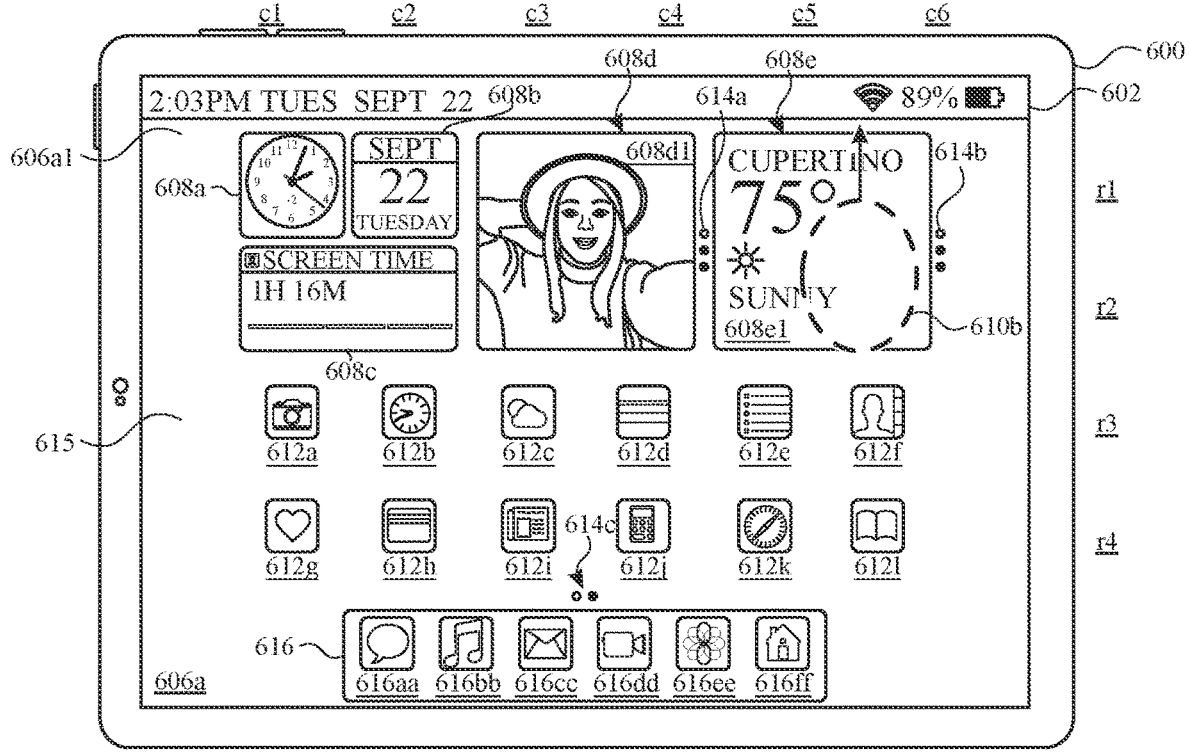

In response to detecting input 610a on continue option 604c (e.g., and after device 600 has been set up with account j.appleseed@email.com), device 600 displays a first page 606a1 of home screen 606a, as shown in FIG. 6B.

Home screen 606a includes a plurality of user interface elements that includes application icons 612a-612z and application widgets 608a-608f in a main region 615 of home screen 606a, and application icons 616a-616f that are pinned (e.g., have persistent positions) in dock 616. Application icons 612a-612l and application widgets 608a-608e are displayed on first page 606a1 of home screen 606a, and application icons 612m-612z and application widget 608f are displayed on second page 606a2 of home screen 606a (shown in FIG. 6D). For example, in response to detecting input 610c in FIG. 6C (discussed below), device displays second page 606a2 of home screen 606a and maintains display of dock 616 with application icons 616a-616f at the same position on display 602.

Application icons (e.g., 612a-612z) correspond to respective applications, such that when an application icon is activated (e.g., selected, tapped), device 600 launches, opens, and/or displays a user interface of the application corresponding to the selected application icon. In some embodiments, application icons 612a-612z include one or more of icons 416-446 on user interface 400.

An application widget (also referred to as a "widget") includes a user interface element that displays content and/or information from an application (e.g., on device 600) and updates the displayed information over time in response to receiving updated or additional information from the application. In some embodiments, in response to detecting selection of an application widget, device 600 launches, opens, and/or displays a user interface of an application associated with the application widget (e.g., an application from which the application widget displays information). In some embodiments, the size, position, appearance, and/or content displayed by an application widget can be configured, e.g., via user input.

In some embodiments, an application widget includes a set of two or more application widgets, referred to as a widget stack, a stack of widgets, or a stack of widget applications. In some embodiments, the stack of application widgets displays content from a subset (e.g., one) of the set of application widgets at a time. In some embodiments, the set of application widgets is arranged in a sequence. In response to an input (e.g., a swipe gesture), widget stacks can be scrolled to cycle through the individual widgets included in the widget stack. In response to selection of a widget in a stack of widgets, device 600 launches, opens, and/or displays a user interface of the application corresponding to the selected widget (e.g., just like for an individual application widget).

The user interface elements in main region 615 (e.g., application icons 612a-612l and application widgets 608a-608e) are arranged in a grid pattern (e.g., a rectangular grid pattern) with columns and rows, labeled c1-c6 and r1-r4, respectively. The columns of the grid pattern are labeled c1-c6 above the top edge of device 600 in FIG. 6B; and the rows of the grid pattern are labeled r1-r4 along the outside of the right edge of device 600 in FIG. 6B. A position in the grid is represented by a column/row pair according to the notation (c[column number],r[row number]). As shown in FIG. 6B (and also FIGS. 8A and 8B discussed below), the first column (column 1) is the far left column in the grid, labeled c1, with column numbers increasing from left to right. The first row (row 1) is the top row in the grid, labeled r1, with row numbers increasing from top to bottom. Elements aligned underneath a column label (e.g., c1, c2, c3, c4, c5, or c6) are considered to be in that respective column. Similarly, elements aligned horizontally across from a row label (e.g., r1, r2, r3, or r4) are considered to be in that respective row. For example, in home screen 606a, application widget 608a is in column 1 (underneath the label c1) and row 1 (across from the label r1), and thus, the position of application widget 608a is represented as (c1,r1). As another example, application icon 612l is displayed in column 6 (underneath the label c6) and row 4 (across from the label r4), and thus, the position of application widget 608l is represented as (c6,r4).

Two or more positions in the grid (e.g., a block of positions or a collection of positions) are represented by identifying the range of columns and/or rows of the positions using the notation (c[beginning column]:[ending column],r[beginning row]:[ending row]). For example, the block of positions that starts at (c2,r2) and extends to the right by one column and down by two rows (individually represented as positions (c2,r2), (c3, r2), (c2,r3), (c3,r3), (c2,r4), and (c3,r4)) is collectively represented as (c2:3,r2:4). The grid notation defined above is also used to describe positions in grids that have different numbers of columns and/or rows than the grid pattern in FIG. 6B. For example, user interface 806a as shown in FIG. 8B (discussed below) is displayed in a portrait orientation with elements in a grid pattern that has four columns and six rows, with the far left column being column 1, the far right column being column 4, the top row being row 1, and the bottom row being row 6.

An application icon occupies one position of the grid. In some embodiments, all application icons have the same size (e.g., as in home screen 606a). In some embodiments, home screen 606a includes folder icons and/or other types of graphical elements at corresponding positions in the grid pattern. Application widgets can be larger than application icons. For example, application widget 608a has a size that is roughly two times the width of an application icon and two times the height of an application icon. Due to the size of application widget 608a compared to the size of application icons in home screen 606a, application widget 608a is referred to as having a size of 2×2 and/or being a 2×2 application widget. Analogously, application widget 608c is referred to as a 4×2 application widget (because it has a size that is roughly four times the width of an application icon and two times the height of an application icon) and application widget 608d1 is referred to as a 4×4 application widget (because it has a size that is roughly four times the width of an application icon and four times the height of an application icon).

Application widgets can occupy one or more positions of the grid in home screen 606a (e.g., application widgets can span one or more rows and/or columns). The position of application widgets that occupy more than one position in the grid is represented by the block notation described above (e.g., (c[beginning column]:[ending column],r[beginning row]:[ending row])). For example, application widget 608a occupies one position in the grid, represented by (c1,r1); application widget 608c occupies two positions in the grid, corresponding to column 1, row 2 and column 2, row 2, represented by (c1:2,r2); and application widget 608d occupies four positions in the grid, corresponding to column 3, row 1; column 4, row 1; column 3, row 2, and column 4, row 2, represented by (c3:4,r1:2). This convention is also used to refer to grid positions with reference to FIGS. 8A-8J.

In some embodiments, one or more of application widgets 608a-608e corresponds to the same application as one or more of application icons 612a-612z. For example, 608b is a widget that displays information from a calendar application (e.g., calendar module 148), and one of application icons 612a-612z is icon 426 for calendar module 148. In some embodiments, application widgets include more information (e.g., current weather conditions, subject, time, and/or location of an upcoming event, a photo from a photo library, or a new headline) from a respective application than a respective application icon for the respective application (e.g., the application icon includes an image that is representative of the respective application, but includes limited or no information from the respective application).

In some embodiments, the user interface elements and/or the arrangement of user interface elements included in home screen 606a is based on the account used to set up device 600. For example, the elements and/or arrangement of home screen 606a can be based on, e.g., a type of account, information included in the account (e.g., application usage, activity data, application settings, a user profile, and/or account history), and/or a type of content associated with the account (e.g., photos, videos, music, contacts, calendar events, reminders, designated items (e.g., stocks, news sites, and/or geographic locations for maps or weather), documents stored in a cloud storage database, and/or notes).

In some embodiments, the configuration (e.g., size, position, and/or types of elements (icons or widgets)) of home screen 606a is a default or standard layout (e.g., does not depend on the account), but the particular application icon or application widget displayed at one or more positions is based on the account used to set up device 600.

In home screen 606a, application widgets 608a-608c are displayed when device 600 is set up, regardless of the account used to set up device 600. Application widget 608*a* corresponds to a clock application and displays, e.g., a current time. Application widget 608*b* corresponds to a calendar application and displays, e.g., the current date and/or information (e.g., subject, time, location, and/or participant(s)) associated with one or more upcoming calendar events. Application widget 608*c* corresponds to a screen time application and displays, e.g., information about the amount of time spent on applications, websites, and/or other displayed content associated with device 600, the account associated with device 600, and/or other associated accounts (e.g., a child's account). In some embodiments, device 600 can display widgets at the position of one or more of application widgets 608*a*-608*c* that correspond to different applications and/or application content than in home screen 606*a*. In some embodiments, device 600 displays widgets at the position(s) of application widgets 608*a*-608*c* based on the account (e.g., the type of content associated with the account) used to set up device 600. This enables device 600 to display widgets (e.g., suggested widgets) that may be relevant to a user based on information associated with the user, such as frequently used applications, recently used applications, and/or user interests.

For example, application widgets 608*d* and 608*e* are based on the account used to set up device 600. In some embodiments, application widgets 608*d* and 608*e* are based on content (e.g., a type of content) associated with the account used to set up device 600. More specifically, application widgets 608*d* and 608*e* are stacks of application widgets that provide information from different applications in response to input. Paging dots 614*a* indicate that widget stack 608*d* includes three application widgets and that the currently displayed application widget 608*d*1 is the first application widget in widget stack 608*d*. Paging dots 614*b* indicate that widget stack 608*e* includes three application widgets and that the currently displayed application widget 608*e*1 is the first application widget in widget stack 608*e*.

Widget stack 608*d* includes a first application widget (e.g., 608*d*1) corresponding to a photos application, a second application widget corresponding to a news application, and a third application widget that corresponds to a maps application. Widget stack 608*e* includes a first application widget (e.g., 608*e*1) corresponding to a weather application, a second application widget corresponding to a reminders application (e.g., that provides information about upcoming events and/or reminders set by a user), and a third application widget that corresponds to a files application (e.g., for browsing files stored on device 600 and/or an account associated with device 600).

In some embodiments, the applications and arrangement of the widgets in widget stack 608*e* are predetermined (e.g., not based on the account used to set up device 600). In some embodiments, the applications and/or arrangement of the widgets in widget stack 608*d* is based at least in part on the account used to set up device 600. For example, photos widget 608*d*1 is the first (top) widgets in widget stack 608*d* based on a determination that device 600 was set up with an existing account and/or an account that is associated with photos content. The applications and/or arrangement of the second (news) and/or third (maps) widgets in widget stack 608*d* are also based on the account that was used to set up device 600. For example, the news widget is positioned earlier/higher than the maps widget in widget stack 608*d* based on a determination that the news application has been used more frequently and/or more recently in the account used to set up device 600. In some embodiments, if the maps application has been used more frequently and/or more recently than the news application, then the maps widget is positioned earlier/higher than the news widget. In some embodiments, if another application, such as a music application, is determined to have been used more frequently and/or more recently than the news application or the maps application, then a widget corresponding to the music application is included in widget stack 608*d* instead of the news widget or the maps widget.

Figure 6C:
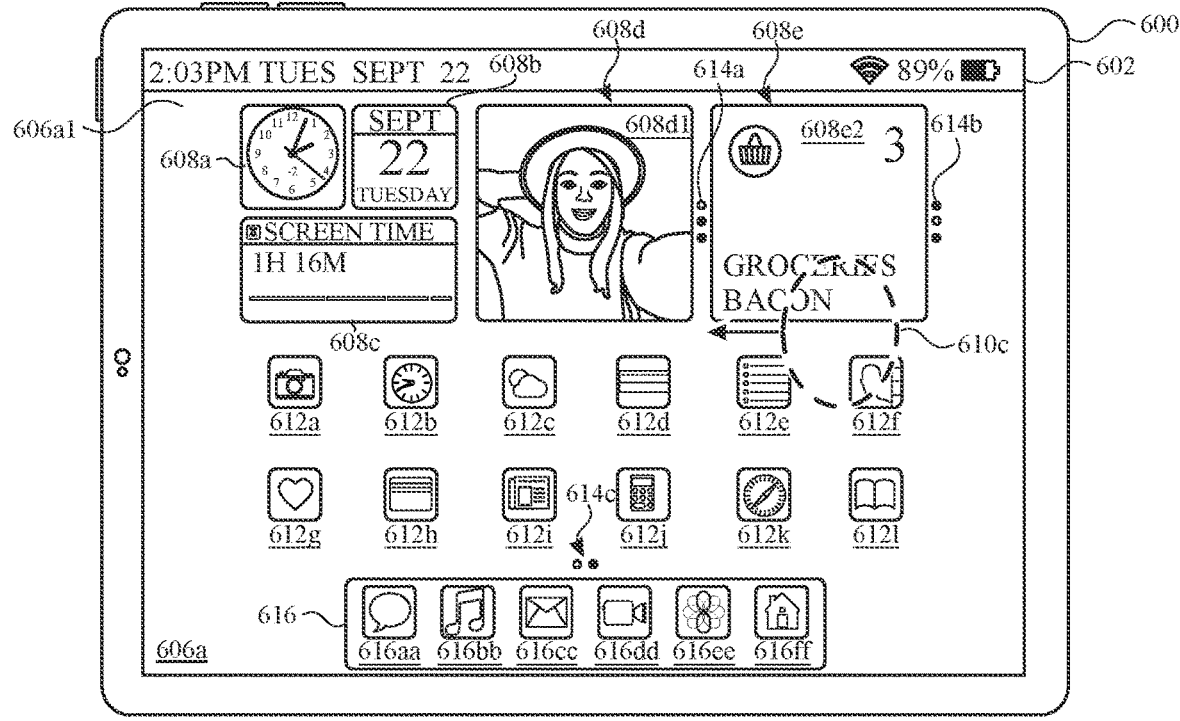

Turning to FIG. 6B, device 600 detects input 610*b* (e.g., a swipe up gesture) corresponding to selection of widget stack 608*e*. In response to detecting input 610*b*, device 600 displays the next application widget in widget stack 608*e*, as shown in FIG. 6C. In FIG. 6C, device 600 has replaced application widget 608*e*1 with application widget 608*e*2 corresponding to the second widget in widget stack 608*e* (the reminders widget) and updated paging dots 614*b* to indicate that the second widget in widget stack 608*e* is currently displayed.

In some embodiments, device 600 scrolls to an adjacent application widget in a widget stack in accordance with a determination that the selection of widget stack 608*e* is a first type of input (e.g., an upward vertical swipe gesture). In some embodiments, device 600 scrolls widget stack 608*e* in an opposite direction in accordance with a determination that the selection of widget stack 608*e* is a second type of input (e.g., a downward vertical swipe gesture). For example, in response to detecting a down swipe gesture on widget stack 608*e* (e.g., on application widget 608*e*1) in FIG. 6B, device 600 displays the third (e.g., last) application widget in widget stack 608*e* (the files widget). In some embodiments, device 600 opens the application corresponding to application widget that is currently displayed in the widget stack in accordance with a determination that the selection of widget stack 608*e* is a third type (e.g., a different type) of input (e.g., a tap gesture).

Figure 6D:
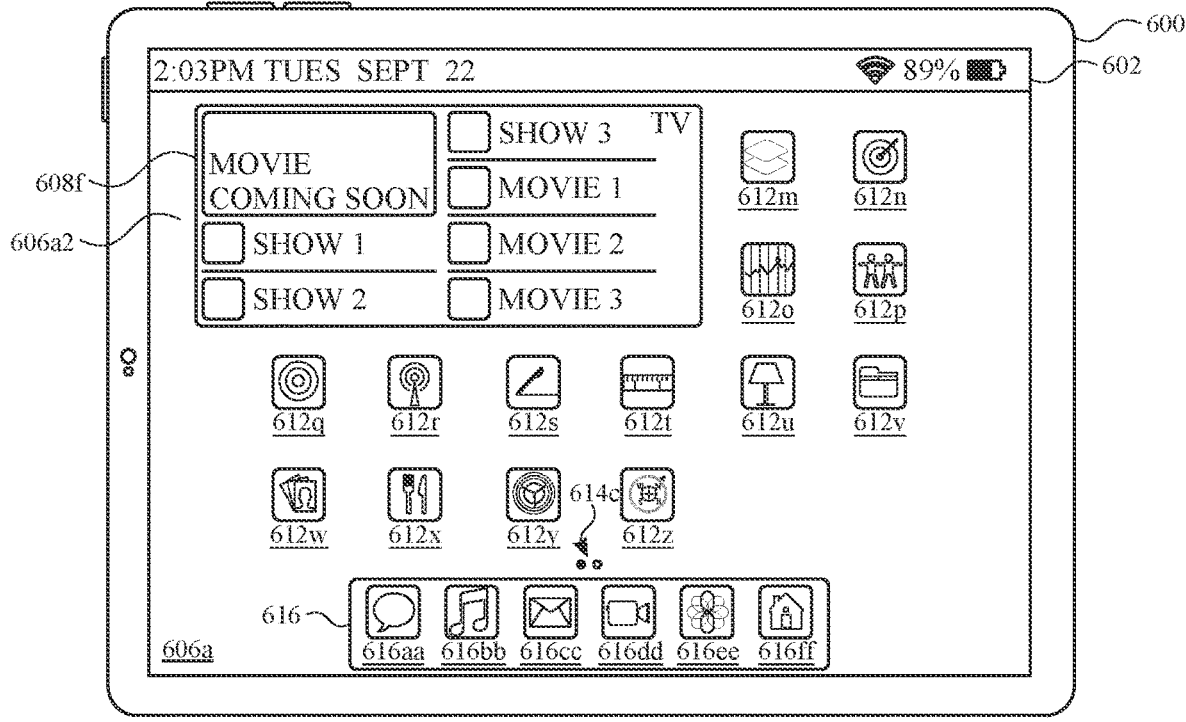

In FIG. 6C, device 600 detects input 610*c* (e.g., a left swipe gesture). In response to detecting input 610*c*, device 600 displays second page 606*a*2 of home screen 606*a*, as shown in FIG. 6D. The appearance of paging dots 614*c* is updated to indicate that second page 606*a*2 is the second page in a sequence of two pages of home screen 606*a*. As mentioned, second page 606*e*2 includes application widget 608*f*, which provides information from a multimedia application. In FIG. 6D, application widget 608*f* displays information from a video (e.g., TV or video streaming) application that shows a queue of upcoming videos (e.g., movies and/or episodes). In some embodiments, device 600 displays application widget 608*f* in accordance with a determination that the account used to set up device 600 includes one or more videos in a queue of the video application to be watched (e.g., an upcoming videos queue). For example, if the account used to set up device 600 does not have the video application or does not have any videos in a queue to be watched, then device 600 does not display application widget 608*f* on home screen 606*a*.

Figure 6E:
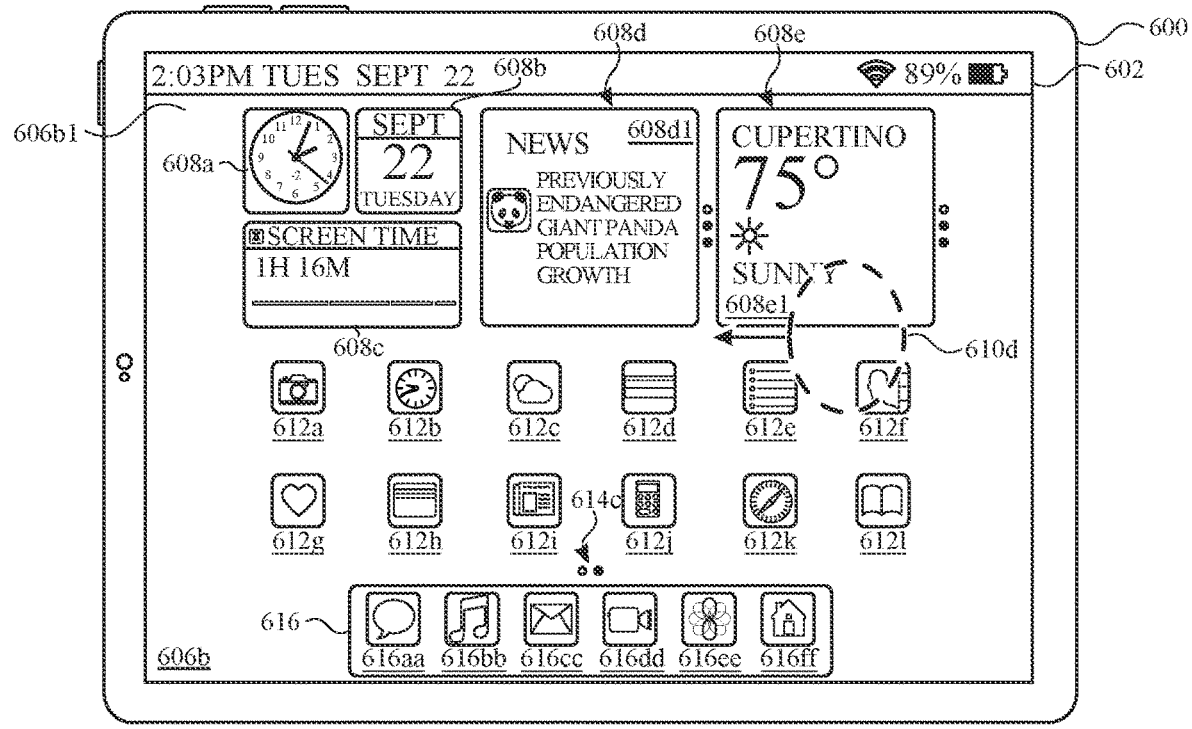

FIG. 6E illustrates an embodiment of a home screen 606*b* displayed by device 600 in accordance with a determination that the account used to set up device 600 is associated with different content (e.g., a different type of content) than the content that is associated with the account used to set up device 600 in FIGS. 6A-6D. Similar to home screen 606*a*, home screen 606*b* includes predetermined widgets, clock widget 608*a*, calendar widget 608*b*, and screen time widget 608*c*, and widget stack 608*e*. In contrast to home screen 606*a*, home screen 606*b* includes widget stacks 608*g* instead of widget stack 608*d*. Widget stack 608*g* in home screen 606*b* is displayed at the same position and with the same size as widget stack 608d in home screen 606a, but includes different application widgets and/or different orders of application widgets. In some embodiments, widget stack 608g includes the same application widgets as widget stack 608d (e.g., the same number of application widgets corresponding to the same photos, news, and maps applications), but the application widgets are in a different order (e.g., sequential order). In some embodiments, widget stack 608g includes one or more application widgets that are included in widget stack 608d, and one or more application widgets that are not included in widget stack 608d (e.g., widget stack 608g is only partially the same as widget stack 608d with respect to the number, order, and/or applications of the application widgets). In some embodiments, widget stack 608g does not include any application widgets that are included in widget stack 608d.

In home screen 606b, widget stack 608e is in the same position as in home screen 606a and includes the same widgets, in the same order. Widget stack 608g is in the same position as widget stack 608d in home screen 606a and includes widgets corresponding to the same applications as widget stack 608d, but in a different order. For example, news widget 608d2 is the first (top) widget in widget stack 608g, whereas news widget 608d2 was the second widget in widget stack 608d. In some embodiments, photos widget 608d1 is the third (last/bottom) widget in widget stack 608g (instead of the first widget, as in widget stack 608d) and the maps widget is the second (middle) widget in widget stack 608g (instead of the third (last/bottom) widget, as in widget stack 608d).

In some embodiments, the widgets (and/or the position and/or order of the widgets) included in home screen 606b (e.g., in widget stack 608g) are selected in accordance with a determination that the account used to set up device 600 is a new account (e.g., was created in order to set up device 600 or device 600 is the first device to access the account). Since a new account may not include content used by certain applications (e.g., photos to use/view in a photos application) widgets that correspond to applications that provide relevant information in the absence of such content (e.g., news and maps applications) are selected and/or prioritized (e.g., placed earlier in a widget stack) than widgets corresponding to applications that are more reliant on such content (e.g., photos or music applications).

In some embodiments, as content and/or information is associated with (e.g., added to and/or obtained by) the account, device 600 changes (e.g., updates) widget stack 608g and/or 608e. For example, in response to a determination that photos have been added to the account, device 600 moves photos widget 608d1 to a different position (e.g., the top) in widget stack 608g in home screen 606b. As another example, in response to a determination that a music application is used with the account, device 600 adds a widget that corresponds to the music application to widget stack 608e or 608g (e.g., as an additional widget or in place of an existing widget in the widget stack).

Figure 6F:
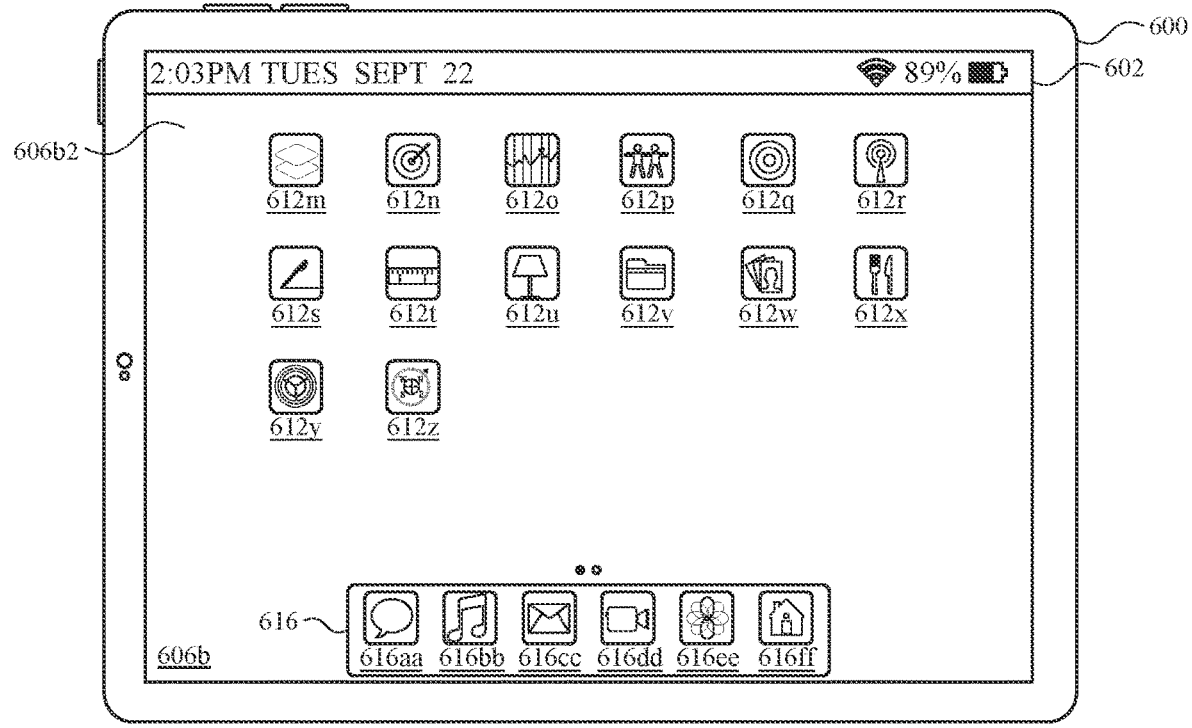

In FIG. 6E, device 600 detects input 610d (e.g., a left swipe gesture similar). In response to detecting input 610d, device 600 displays second page 606b2 of home screen 606b, as shown in FIG. 6F. In contrast to home screen 606a, home screen 606b (and in particular second page 606b2) does not include application widget 608f because, e.g., the account used to set up device 600 corresponding to FIGS. 6E-6F does not have the video application and/or does not have any videos in an upcoming videos queue of the video application associated with application widget 608f.

Figure 6G:
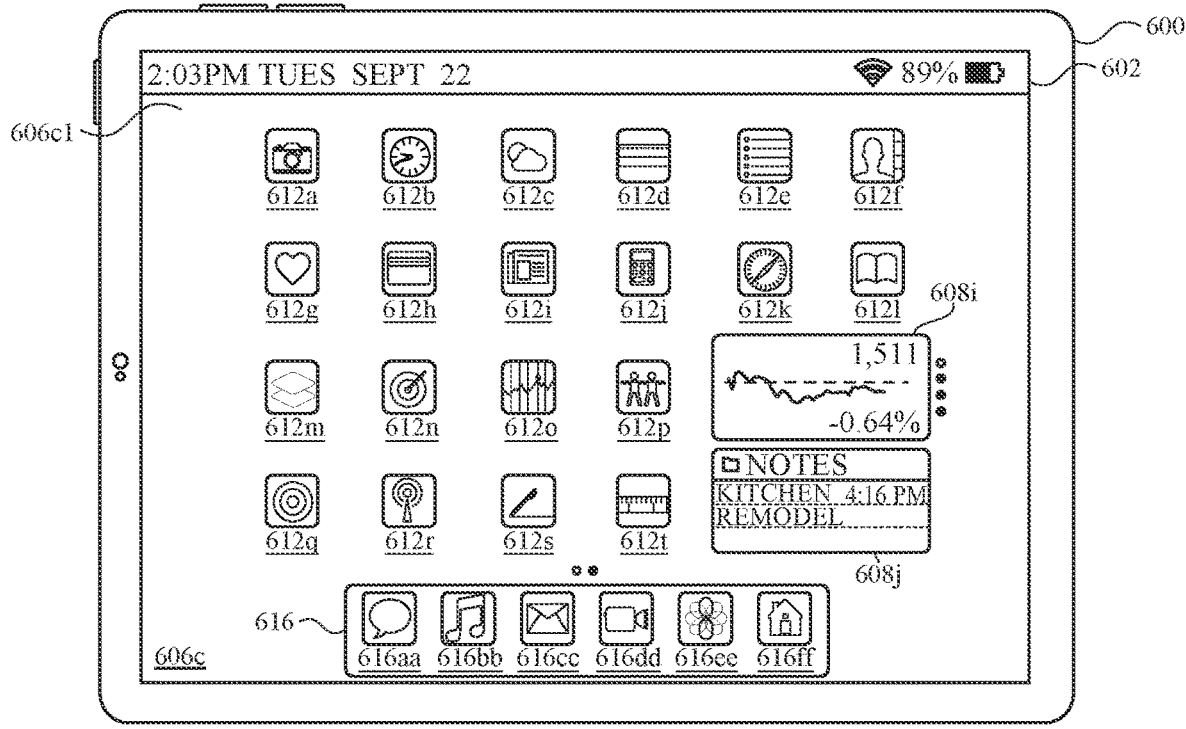

FIG. 6G illustrates an example of a stored (or restored) home screen 606c displayed by device 600 when device 600 is set up to use (e.g., restore) a home screen from another device. In some embodiments, a home screen of another device is stored (e.g., backed up) and then used to set up device 600. In some embodiments, in accordance with a determination that the account used to set up device 600 is associated with a stored home screen, device 600 displays the stored home screen instead of, e.g., home screen 606a or 606b. In some embodiments, home screen 606c is based on a home screen of another device associated with the account used to set up device 600 that has been configured (e.g., customized) by a user of the account. In some embodiments, device 600 displays a stored home screen in response to a request from a user during the setup process to restore the home screen from the account and/or another device.

Figure 6H:
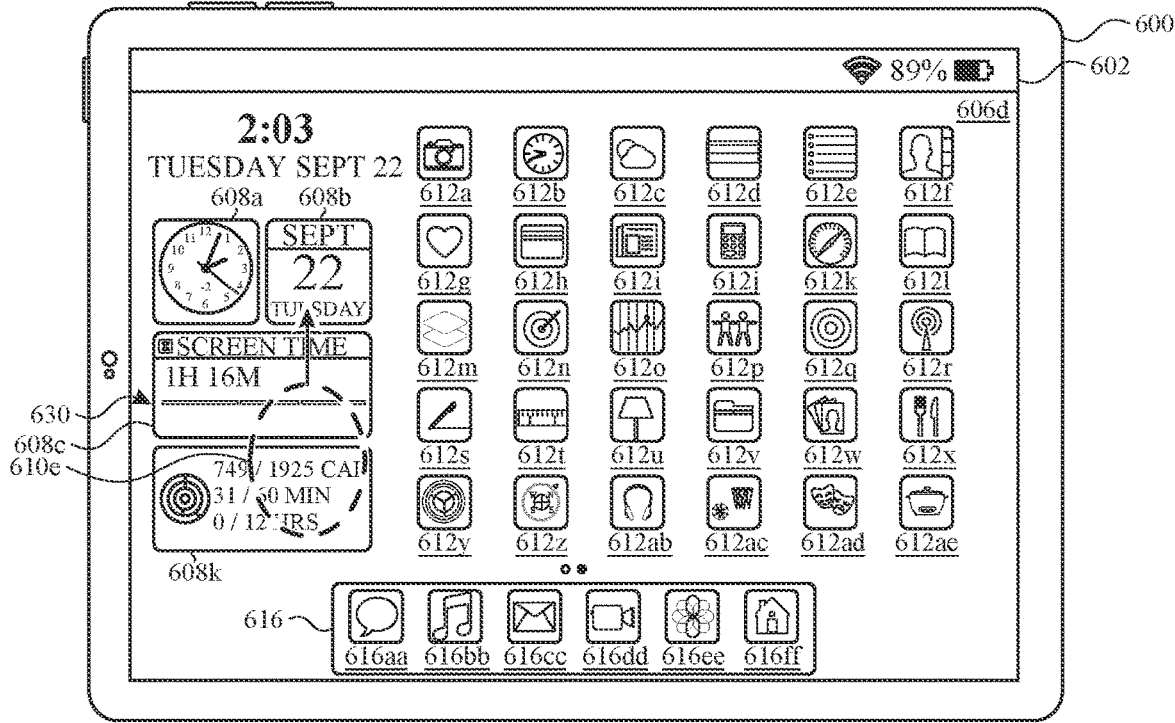
Figure 6I:
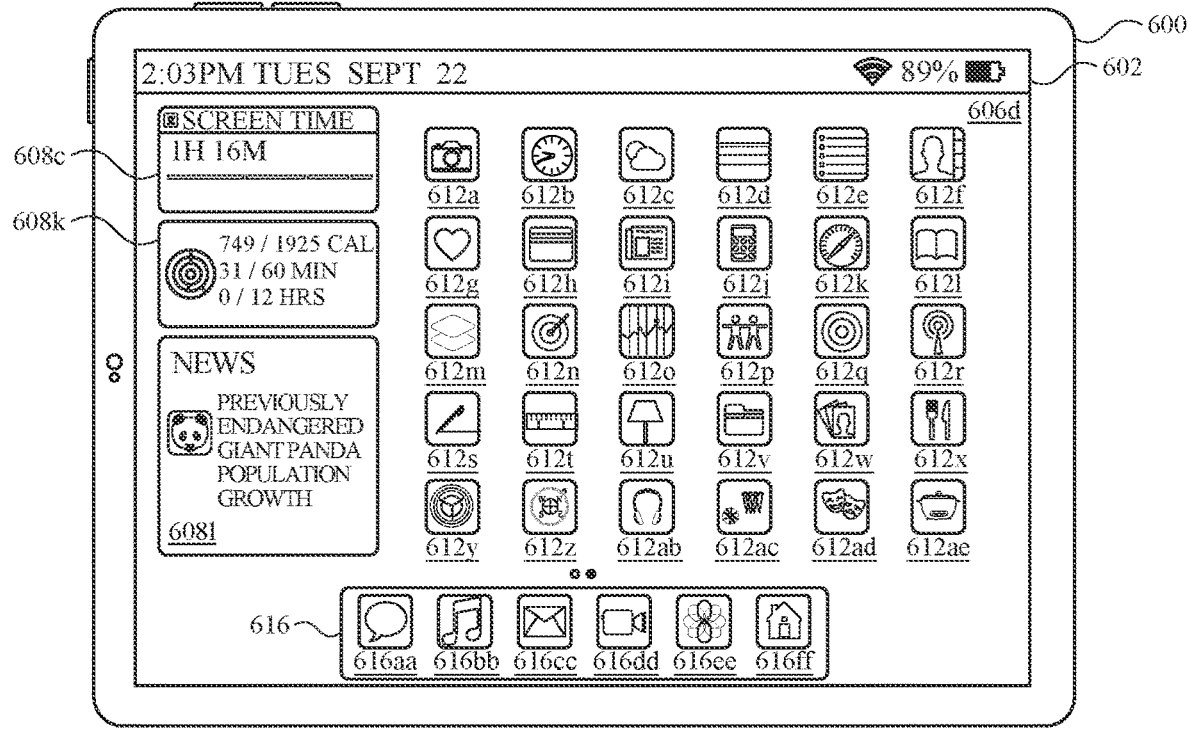

FIG. 6H illustrates an example of a home screen 606d displayed by device 600. Home screen 606d includes a widget dashboard 630 that includes a plurality of application widgets. In some embodiments, a widget dashboard is a region of a home screen that is dedicated for application widgets (e.g., does not include application icons). Widget dashboard 630 includes application widgets 608a, 608b, 608c, 608k, and 608l. Widget dashboard 630 is scrollable in some embodiments. In response to detecting input 610e (e.g., a swipe up gesture), device 600 scrolls widget dashboard 630 to display application widget 608l (which was not displayed prior to scrolling), as shown in FIG. 6I. In some embodiments, widget dashboard 630 is scrollable in a direction (e.g., vertically) that is different from a direction (e.g., horizontally) in which the pages of the home screen are arranged.

Figure 6J:
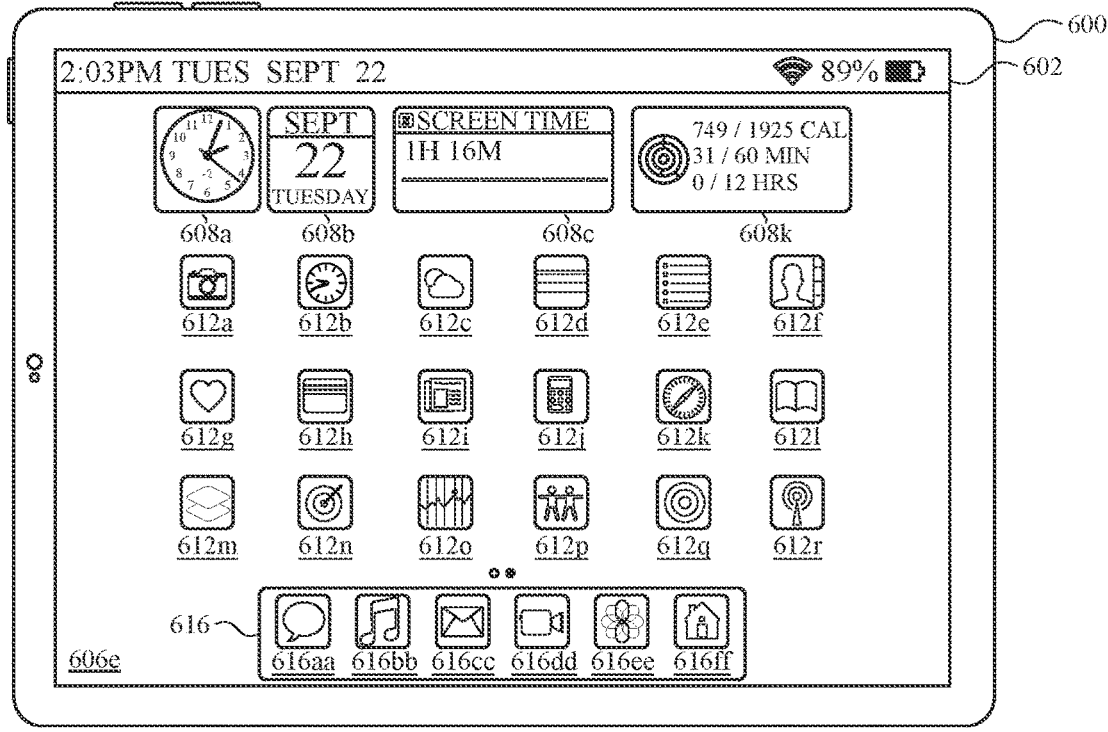

FIG. 6J illustrates a home screen 606e that is based on home screen 606d shown in FIGS. 6H-6I. In some embodiments, device 600 can be upgraded with new (or a newer version of) software, such as an operating system. When device 600 is upgraded, device 600 displays a home screen that is based on a home screen of device 600 prior to the upgrade. For example, home screen 606d is an example of a home screen of device 600 prior to device 600 being upgraded. Prior to the upgrade, home screen 606d includes widget dashboard 630 and a grid of application icons that includes six rows and six columns of application icons. In some embodiments, application widgets cannot be included in the grid of application icons.

After the upgrade, home screen 606e includes a grid that has four rows and six columns. The top row includes application widgets 608a, 608b, 608c, and 608k corresponding to application widgets 608a, 608b, 608c, and 608k in home screen 606d (e.g., a subset of the application widgets in widget dashboard 630). In some embodiments, after device 600 is upgraded (e.g., the first time that a user logs into or activates device 600 after device 600 is upgraded), device 600 displays widgets (or stacks of widgets) in home screen 606e (e.g., the top row of home screen 606e) based on widgets (and/or stacks of widgets) that were displayed in home screen 606d. In some embodiments, device 600 displays application widget 608c at the position shown in home screen 606e because application widget 608c was displayed in widget dashboard 630 in home screen 606d. In this way, device 600 "moves" or "migrates" one or more widgets or stacks of widgets from home screen 606d (e.g., a position on home screen 606d) to home screen 606e (e.g., a different position on home screen 606e).

In some embodiments, device 600 maintains an order of application widgets from home screen 606d (e.g., from widget dashboard 630) to home screen 606e. For example, application widget 608c is before (e.g., above or to the left of) application widget 608k in both home screen 606d and home screen 606e. In some embodiments, home screen 606e does not include a widget dashboard analogous to widget dashboard 630 (e.g., widget dashboard 630 is "replaced" with the top row of home screen 606e).

In some embodiments, device 600 changes the size of an application widget when the application widget is migrated from home screen 606d to home screen 606e. For example, in some embodiments, device 600 displays an application widget in the top row of home screen 606e corresponding to application widget 608l in home screen 606d. In home screen 606d, news widget 608l has a size of 4×4. In some embodiments, if application widget 606l (or an application widget corresponding to the same application as application widget 606l) is displayed in (e.g., moved to) home screen 606e, application widget 608l is displayed with a size of 4×2 (e.g., the size of application widget 608c in FIG. 6J) such that it fits in the top row of home screen 606e. Similarly, in some embodiments, application widget 608c has a size of 4×4 in home screen 606d (e.g., application widget 608c occupies the position of both application widget 608c and application widget 608k), and device 600 displays home screen 606e as shown in FIG. 6J, in which application widget 608c has a size of 4×2.

Figure 6K:
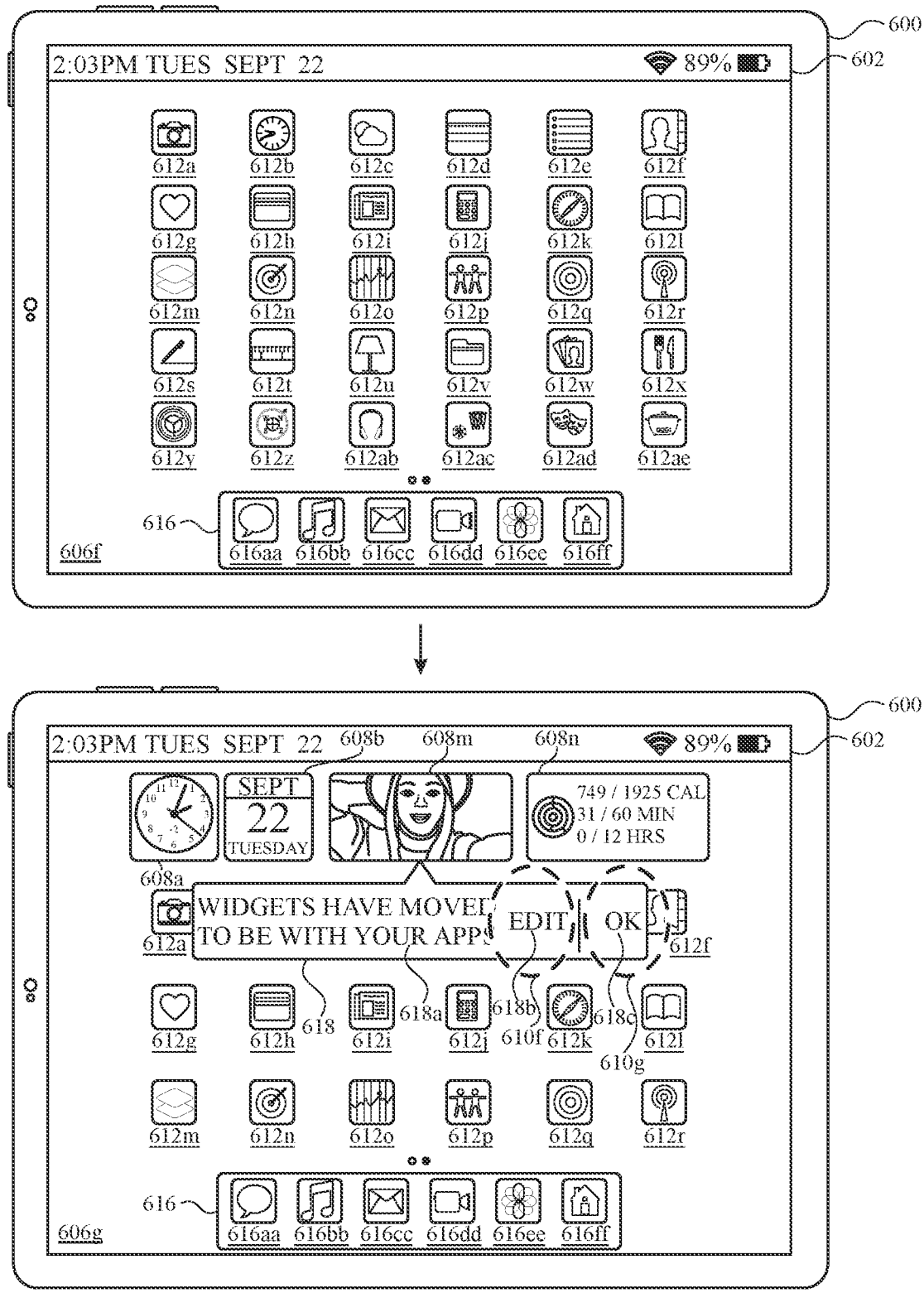

FIG. 6K illustrates an embodiment of home screens that are displayed before and after device 600 is upgraded (e.g., with a new version of an operating system). Before being upgraded, device 600 displays home screen 606f, which has six rows and six columns of application icons. Home screen 606f does not include any application widgets. After device 600 is upgraded (e.g., in response to being upgraded), device 600 displays home screen 606g, which includes a grid layout with four rows and six columns. The top row of home screen 606g includes application widgets 608a and 608b and widget stacks 608m and 608n. In some embodiments, device 600 selects (e.g., determines) which application widgets to display in home screen 606g based on the account (e.g., the type of content associated with the account) that was used to set up device 600 using some or all of the techniques described above with reference to home screens 606a, 606b, 606c, 606d, and/or 606e. In some embodiments, device 600 displays application widgets on home screen 606g in accordance with a determination that the account used to set up device 600 is not associated with any application widgets (e.g., there are no widgets on home screen 606f and/or there is no indication of past usage of application widgets with the account). This allows device 600 to present (e.g., suggest) widget availability and/or functionality to a user that, e.g., may not have been aware of or previously used widgets.

In FIG. 6K, device 600 displays notification 618, which indicates that application widgets 608a, 608b, 608m, and 608n have been added or moved to be with application icons (e.g., 612a-612r) on home screen 606g. In some embodiments, device 600 displays notification 618 the first time that device 600 is powered on, unlocked, and/or logged into after being upgraded from the state represented by home screen 606f. In some embodiments, device 600 displays an animation over time of application widgets 608a, 608b, 608m, and 608n (e.g., a pulsing animation in which the application widgets increase and then decrease in size repeatedly over time). Notification 618 includes indication 618a (e.g., text), selectable edit option 618b, and selectable accept option 618c ("OK"). In response to detecting input 610g (e.g., a tap) corresponding to selection of accept option 618c, device 600 removes notification 618 (and, optionally, ceases animation of application widgets 608a, 608b, 608m, and 608n).

In response to detecting input 610f (e.g., a tap) corresponding to selection of edit option 618b, device 600 enters a reconfiguration mode in which home screen 606g can be reconfigured (and, optionally, ceases display of notification 618). When device 600 is in reconfiguration mode, in some embodiments, application widgets and application icons (including application icons 616a-616f in dock 616) can be removed from home screen 606g and/or moved to different positions on home screen 606g (including to different pages of home screen 606g).

Figure 6L:
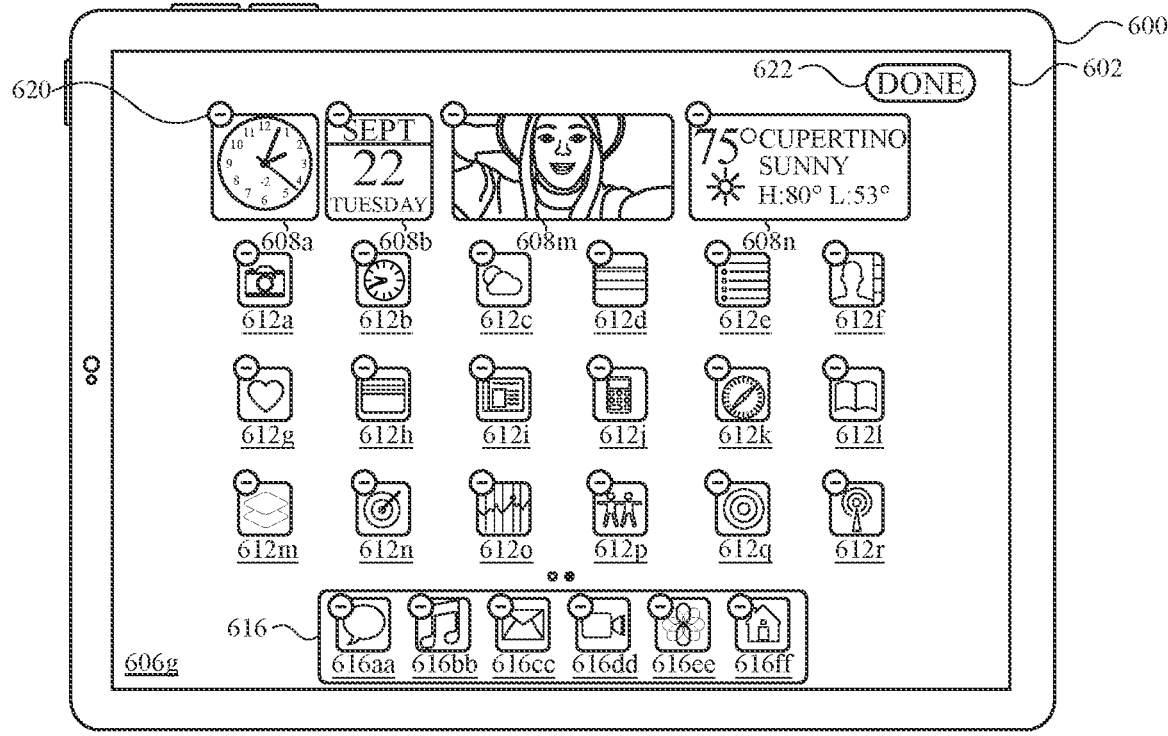

FIG. 6L illustrates an embodiment of home screen 606g when device 600 is in reconfiguration mode. In reconfiguration mode, home screen 606g includes selectable done option 622, and application widgets and application icons include a selectable remove option 620. In response to detecting selection of remove option 620, device 600 removes the corresponding application widget or application icon from home screen 606g. In some embodiments, device 600 displays an animation of the application widgets and/or application icons when device 600 is in reconfiguration mode to indicate that the application widgets and/or application icons can be removed and/or moved. The animation includes, in some embodiments, a pulsing, shaking, and/or jiggling animation in which the elements rotate (e.g., rapidly and/or slightly) back and forth. In response to detecting selection of done option 622, device 600 exits reconfiguration mode (e.g., ceases display of remove options 620, done option 622, and animation of application widgets and application icons) and displays home screen 606g, updated based on any changes that were made while in reconfiguration mode.

Figure 6M:
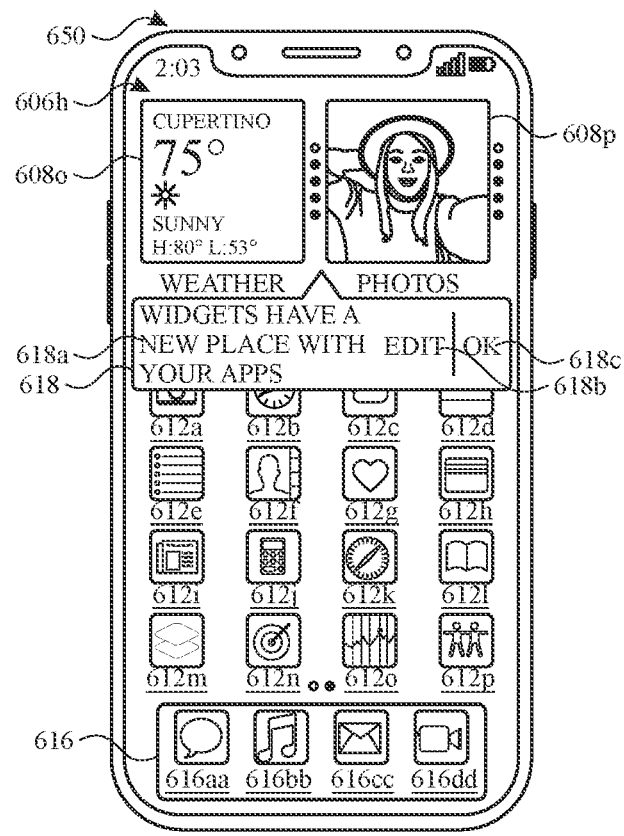

FIG. 6M illustrates an embodiment of a home screen 606h displayed on device 650 (e.g., a different device than device 600). Home screen 606h includes a grid of application widgets and application icons, with widget stacks 608o and 608p occupying a top row of the grid, and notification 618 (including indication 618a, edit option 618b, and accept option 618c). Edit option 618b and accept option 618c in FIG. 6M provide functionality on device 650 that is analogous to the functionality described for device 600 (e.g., the ability to accept application widgets 608o and 608p and/or enter a reconfiguration mode to reconfigure home screen 606h). In some embodiments, device 650 displays home screen 606h in response to device 650 being turned on, unlocked, and/or logged into after being upgraded (e.g., with a version of an operating system).

In some embodiments, device 650 displays home screen 606h based on an account that was used to set up device 650 by incorporating any of the techniques described above for displaying home screens 606a-606g on device 600. For example, the application widgets (and order thereof) included in widget stack 608o and/or 608p are determined based on the type of content associated with the account used to set up device 650.

In some embodiments, in accordance with a determination that device 650 was set up with an existing account (and is not restoring a home screen from another device), widget stack 608o includes a first (top) widget corresponding to a weather application, a second widget (immediately after the first widget) corresponding to a maps application, and a third widget (immediately after the second widget) corresponding to a notes application; and widget stack 608p includes a first (top) widget corresponding to a photos application, a second widget (immediately after the first widget) corresponding to a calendar application, and a third widget (immediately after the second widget) corresponding to a news application. In some embodiments, in accordance with a determination that device 650 was set up with a new account, widget stack 608o includes a first (top) widget corresponding to a weather application, a second widget (immediately after the first widget) corresponding to a maps application, and a third widget (immediately after the second widget) corresponding to a notes application (e.g., the same widgets and order as when device 650 is set up with an existing account); and widget stack 608p includes a first (top) widget corresponding to a calendar application, a second widget (immediately after the first widget) corresponding to a news application, and a third widget (immediately after the second widget) corresponding to a photos application.

In some embodiments, after device 650 is upgraded (e.g., to a new version of an operating system), device 650 displays (e.g., recommends) widget stacks 608o and/or 608p in accordance with a determination that (e.g., only if) the account used to set up device 650 has not used widgets on a device of the same type as device 650 (e.g., the account has never been associated with a phone that included a widget on a home screen).

FIG. 7 is a flow diagram illustrating a method for displaying application widgets using a computer system in accordance with some embodiments. Method 700 is performed at a computer system (e.g., 100, 300, 500, 600, 650, a smartphone, and/or a tablet) that is in communication with a display generation component (e.g., 602, a display controller or a touch-sensitive display system) and one or more input devices (e.g., 602, a touch-sensitive surface). Some operations in method 700 are, optionally, combined, the orders of some operations are, optionally, changed, and some operations are, optionally, omitted.

As described below, method 700 provides an intuitive way for displaying application widgets. The method reduces the cognitive burden on a user for using application widgets, thereby creating a more efficient human-machine interface. For battery-operated computing devices, enabling a user to use application widgets faster and more efficiently conserves power and increases the time between battery charges.

The computer system receives (702) a request (e.g., 610a) (e.g., detecting an input corresponding to a request) to display a home screen (606a, 606b, 606c, 606e, 606g, or 606h) of the computer system, wherein the computer system was recently set up (e.g., initialized, activated, and/or configured (e.g., with settings and/or parameters)) with an account (e.g., "j.appleseed@email.com"; a user account). In some embodiments, the request to display the home screen includes (e.g., is) a last step of a setup process. In some embodiments, the request to display the home screen includes (e.g., is) a request to unlock the computer system after setup of the computer system is completed. In some embodiments, the request incudes turning on a device for a first time, turning on a device for a first time after the device has been reset, or activating a device (e.g., a new or reset device) that has not completed an initial setup process. In some embodiments, the computer system is pre-configured and/or loaded with at least some account information (e.g., username, unique ID, but not password information). In some embodiments, the request includes account information (e.g., username and/or password). In some embodiments, the request includes entry of a username and/or password.

In response to receiving the request to display the home screen of the computer system, the computer system displays (704), via the display generation component, the home screen (606a, 606b, 606c, 606e, 606g, or 606h) (e.g., a temporary, default, or initial home screen; an application springboard; or a displayed user interface (e.g., user interface 400) that includes user interface elements corresponding to respective applications, such that when a user interface element is activated, the computer system displays the respective application corresponding to the activated user interface element). Displaying the home screen includes: in accordance with a determination that a first set of criteria is met, where the first set of criteria includes a criterion that is met when (e.g., in accordance with a determination that) the account that was used to set up the computer system is associated with a first type of content, displaying (706) a first set of user interface elements (e.g., 608a-608f and/or 612a-612z) (e.g., icons, affordances, selectable user interface elements, application icons (e.g., selectable icons that open or launch an application when selected), application widgets, and/or a stack of application widgets) on the home screen; and in accordance with a determination that a second set of criteria is met, where the second set of criteria includes a criterion that is met when (e.g., in accordance with a determination that) the account that was used to set up the computer system is not associated with the first type of content, displaying (708) a second set of user interface elements (e.g., 608a-608c, 608e, 608g, and/or 612a-612z)) on the home screen, wherein the second set of user interface elements is different from the first set of user interface elements (e.g., without displaying one or more of the user interface elements in the first set of user interface elements). In some embodiments, the first type of content includes one or more of photos, video, reminders, notes, documents stored in a cloud storage database, or music.

Displaying different sets of user interface elements on a home screen based on the type of content associated with the account that was used to set up the computer system provides a customized and more relevant home screen for a user and reduces the need for a user to manually reconfigure the home screen and/or provide additional inputs to navigate to desired applications. This feature thus configures the home screen when a set of conditions has been met without requiring further user input and reduces the number of inputs needed to configure the home screen and/or obtain desired content.

In some embodiments, an application widget includes a user interface element that displays content and/or information from an application. In some embodiments, an application widget updates the displayed information over time in response to the computer system receiving updated or additional information from the application. In some embodiments, in response to detecting selection of an application widget, the computer system opens or launches an application associated with the application widget (e.g., an application from which the application widget displays information). In some embodiments, the size, position, appearance, and/or content displayed by an application widget can be configured, e.g., via user input. In some embodiments, a stack of application widgets is a representation of a set of two or more application widgets through which a user can scroll or cycle. In some embodiments, the stack of application widgets displays content from a subset (e.g., one) of the set of application widgets at a time (e.g., the stack of application widgets displays content from a single application widget of the set of application widgets without displaying content from any other application widgets of the set of application widgets). In some embodiments, the set of application widgets is arranged in a sequence, and in response to input (e.g., user input and/or system input), the computer system changes the sequence in which the set of application widgets are arranged based on the input (e.g., changes which application widget is on top or first in the sequence).

In some embodiments, the first set of criteria is met in accordance with a determination that the account that was used to set up the computer system is associated with the first type of content (e.g., determining that the account that was used to set up the computer system is associated with the first type of content is sufficient to meet the first set of criteria). In some embodiments, a determination that the account that was used to set up the computer system is associated with the first type of content is required (but not sufficient) to meet the first set of criteria. In some embodiments, the second set of criteria is met in accordance with a determination that the account that was used to set up the computer system is not associated with the first type of content (e.g., determining that the account that was used to set up the computer system is not associated with the first type of content is sufficient to meet the second set of criteria). In some embodiments, a determination that the account that was used to set up the computer system is not associated with the first type of content is required (but not sufficient) to meet the second set of criteria.

In some embodiments, displaying the first set of user interface elements (e.g., 608a-608f) includes displaying the first set of user interface elements without displaying one or more of the second set of user interface elements (e.g., 608g). In some embodiments, the first set of user interface elements includes one or more user interface elements that are included in the second set of user interface elements (e.g., 608a-608c or 608e). In some embodiments, the first set of user interface elements includes one or more user interface elements (e.g., 608d) that are not included in the second set of user interface elements. In some embodiments, the second set of user interface elements includes one or more user interface elements (e.g., 608g) that are not included in the first set of user interface elements.

In some embodiments, the first set of user interface elements includes a first application widget (e.g., 608d or 608f) that is not included in the second set of user interface elements. In some embodiments, the first set of user interface elements includes two or more application widgets (e.g., 608d and 608f) that are not included in the second set of user interface elements. Providing an application widget when the account that was used to set up the computer system is associated with the first type of content that is not provided when the account is not associated with the first type of content enables the computer system to automatically provide an application widget that is relevant to the user based on the content associated with the account, to avoid displaying the application widget when the application widget may not be particularly relevant to the user when the account is not associated with the first type of content, and reduces the need for a user to reconfigure the home screen, which reduces the number of inputs needed to configure the computer system and/or access relevant content.

In some embodiments, the home screen includes a plurality of pages (e.g., 606a1 and 606a2; or 606b1 and 606b2) (e.g., discrete user interfaces (e.g., sub-user interfaces of the home screen) that include one or more application icons and/or application widgets, where the discrete user interfaces are arranged in a sequence through which a user can navigate), including a first page (e.g., 606a1 or 606b1) and a second page (e.g., 606a2 or 606b2), and wherein the first application widget (e.g., 608d) is displayed on the first page (e.g., 606a1) of the home screen. Including the application widget on the first page of a multi-page home screen places the application widget where it can be easily identified and accessed by the user and reduces the need for the user to navigate to a different page of the home screen to access the application widget, which reduces the number of input needed to perform an operation. In some embodiments, in response to detecting a first input (e.g., a horizontal swipe gesture) while displaying the first page of the home screen, the computer system displays (e.g., navigates to) the second page of the home screen; and in response to detecting a second input (e.g., a horizontal swipe gesture in a direction opposite of the first input) while displaying the second page of the home screen, the computer system displays (e.g., navigates to) the first page of the home screen.

In some embodiments, the home screen includes a plurality of pages (e.g., 606a1 and 606a2; or 606b1 and 606b2), including a first page (e.g., 606a1 or 606b1) and a second page (e.g., 606a2 or 606b2), and wherein the first application widget (e.g., 608f) is displayed on the second page (e.g., 606a2) of the home screen. Including the application widget on the second page of a multi-page home screen enables the computer system to place an application widget that the user has not explicitly selected on a secondary screen, allows more user interface elements to be displayed on the first page where they can be easily identified and accessed by the user, and reduces the need for the user to navigate to a different page of the home screen to access preferred user interface elements. This feature thus reduces the number of inputs needed to perform an operation and/or access relevant content.

In some embodiments, the first set of user interface elements includes a plurality of application widgets (e.g., 608a-608f), including the first application widget (e.g., 608d) that is not included in the second set of user interface elements (e.g., 608a-608c, 608e, and 608g) and a second application widget (e.g., 608f) that is not included in the second set of user interface elements (e.g., 608a-608c, 608e, and 608g). Providing multiple application widgets when the account that was used to set up the computer system is associated with the first type of content that are not provided when the account is not associated with the first type of content enables the computer system to automatically provide multiple application widgets that are relevant to the user based on the content associated with the device, to avoid displaying the application widgets when the application widgets may not be particularly relevant to the user when the account is not associated with the first type of content, and reduces the need for a user to reconfigure the home screen. This feature thus reduces the number of inputs needed to configure the computer system and/or access relevant content.

In some embodiments, the first set of user interface elements includes a plurality of application icons (e.g., 612a-612z), and the second set of user interface elements includes the plurality of application icons (e.g., the first set of user interface elements and the second set of user interface elements have a plurality of application icons in common). Including a plurality of application icons in both the first set of user interface elements and the second set of user interface elements enables the computer system to provide a common set of user interface elements that are relevant to a user regardless of whether or not the account is associated with the first type of content and reduces the need to manually configure the home screen, which reduces the number of inputs needed to configure the home screen and/or access relevant content.

In some embodiments, the plurality of application icons (e.g., 612a-612l) are arranged in a first order in the first set of user interface elements (e.g., 612*a*-6121 in FIG. 6C) and the plurality of application icons are arranged in the first order in the second set of user interface elements (e.g., 612*a*-6121 in FIG. 6E) (e.g., the plurality of application icons are arranged in the same order in the first set of user interface elements as in the second set of user interface elements). Arranging the plurality of application icons in the same order enables the computer system to provide a common arrangement of user interface elements that are relevant to a user regardless of whether or not the account is associated with the first type of content and reduces the need for a user to manually rearrange relevant user interface elements on the home screen, which reduces the number of inputs needed to configure the home screen and/or access relevant content.

In some embodiments, the first set of user interface elements includes a first stack of application widgets (e.g., 608*d*) that is not included in the second set of user interface elements (e.g., the second set of user interface elements does not include a stack of application widgets; the second set of user interface elements includes one or more stacks of application widgets, but none of the stacks of application widgets include the same set of application widgets as the first stack of application widgets; or the second set of user interface elements includes one or more stacks of application widgets, including a stack of application widgets that includes the same set of application widgets as the first stack of application widgets, but none of the stacks of application widgets include the same set of application widgets in the same order as the first stack of application widgets). Providing a stack of application widgets when the account that was used to set up the computer system is associated with the first type of content that is not provided when the account is not associated with the first type of content increases the amount of relevant content that the computer system provides to the user in a reduced amount of space, enables the computer system to avoid displaying the stack of application widgets when they may not be particularly relevant to the user when the account is not associated with the first type of content, and reduces the need for a user to reconfigure the home screen. This feature thus reduces the number of inputs needed to configure the home screen and/or access relevant content.

In some embodiments, the first stack of application widgets (e.g., 608*d* or 608*e*) displays content of a first application (e.g., 608*d*1 or 608*e*1) (e.g., a first application widget in the first stack of application widgets), and: while the stack of application widgets is displaying the content of the first application, the computer system detects an input (e.g., 610*b*) directed to the first stack of application widgets (e.g., a swipe in a predetermined direction such as a vertical swipe or a horizontal swipe on the stack of application widgets or a tap or double tap input); and in response to detecting the input directed to the first stack of application widgets, the computer system displays content of a second application (e.g., 608*d*2 or 608*e*2) in the first stack of application widgets (e.g., a second application widget in the first stack of application widgets), wherein the second application is different from the first application. Displaying content of a second application in the first stack of application widgets in response to detecting the input directed to the first stack of application widgets enables a user to quickly and easily access desired content from an application while reducing the amount of display space needed to provide the content and without requiring additional inputs to launch and navigate the second application, which provides improved visual feedback to the user without cluttering the user interface and reduces the number of inputs needed to obtain the content.

In some embodiments, the first stack of application widgets (e.g., 608*d*) includes a plurality of application widgets in a first order (e.g., photos, news, maps), and wherein the second set of user interface elements includes a second stack of application widgets (e.g., 608*g*) that includes the plurality of application widgets in a second order (e.g., news, maps, photos) that is different from the first order. Including the plurality of application widgets in a first order in the first stack of application widgets and a different order in the second stack of application widgets enables the computer system to prioritize (e.g., place earlier in the stack) application widgets that are more relevant to a user based on the type of content associated with the account. Placing a widget earlier in a stack reduces the number and/or length of inputs (e.g., swipes) required to access the widget and reduces the need for a user to scroll the stack of application widgets, which provides improved visual feedback and reduces the number of inputs required to obtain desired content.

In some embodiments, the computer system changes (e.g., automatically; and/or without user input) an application widget displayed in the first stack of application widgets from a first application widget (e.g., 608*e*1 (weather)) to a second application widget (e.g., 608*e*2 (reminders)), different from the first application widget, based on contextual information (e.g., application usage, location, time, application data (e.g., an upcoming event, current or forecasted weather)). Changing the application widget displayed in the first stack of application widgets based on contextual information enables the computer system to automatically display an application widget that is more relevant to a user than a currently-displayed application widget, which provides improved visual feedback and reduces the number of inputs required to obtain relevant content.

In some embodiments, the computer system changes the application widget displayed in the first stack of application widgets in accordance with (and/or in response to) a determination that stack-change criteria is met, where the stack-change criteria is based on the contextual information. In some embodiments, in accordance with a determination that the account includes first contextual information, the computer system displays (e.g., changes the application widget displayed in the first stack of application widgets to) a first application widget of the first stack of application widgets; and in accordance with a determination that the account includes second contextual information that is different from the first contextual information, the computer system displays (e.g., changes the application widget displayed in the first stack of application widgets to) a second application widget of the first stack of application widgets, different from the first application widget of the stack of application widgets (e.g., without displaying the first application widget of the first stack of application widgets). In some embodiments, the computer system displays an application widget of a stack of application widgets in the second set of user interface elements based on contextual information.

In some embodiments, the second set of user interface elements includes a second stack of application widgets (e.g., 608*g*) that is not included in the first set of user interface elements (e.g., the first set of user interface elements includes one or more stacks of application widgets, but none of the stacks of application widgets include the same set of application widgets as the second stack of application widgets; or the first set of user interface elements includes one or more stacks of application widgets, including a stack of application widgets that includes the same set of application widgets as the second stack of application widgets, but none of the stacks of application widgets include the same set of application widgets in the same order as the second stack of application widgets). Including a second stack of application widgets in the second set of user interface elements that is not included in the first set of user interface elements enables the computer system to provide application widgets that are more relevant to a user based on the type of content associated with the account and reduces the need for a user to navigate the home screen and/or applications to obtain desired content, which provides improved visual feedback and reduces the number of inputs required to obtain desired content.

In some embodiments, displaying the home screen includes: in accordance with a determination that the computer system was set up based on a user-configured home screen (e.g., 606*c* or 606*f*) (e.g., a pre-configured home screen; or a home screen that was restored from another device), displaying the home screen without any application widgets that were not included in the user-configured home screen (e.g., in FIG. 6G, application widgets 608*i* and 608*j* were included in the user-configured home screen). Displaying the home screen without any application widgets that were not included in a user-configured home screen in accordance with a determination that the computer system was set up based on the user-configured home screen enables the computer system to restore a previously configured home screen on the computer system with which the user is familiar. When the user is familiar with the home screen, the user can access content more efficiently and is less likely to make mistakes, which reduces the number of inputs needed for the user to locate desired content.

In some embodiments, displaying the home screen includes: in accordance with a determination that the computer system was set up based on a user-configured home screen (e.g., 606*f*) (e.g., a pre-configured home screen; or a home screen that was restored from another device), displaying the home screen (e.g., 606*g* or 606*h*) with one or more suggested application widgets (e.g., 608*a*-608*g* and/or 608*m*-608*p*) (e.g., recommended application widgets) that were not included in the user-configured home screen (e.g., based on the user interface elements included in the user-configured home screen). Displaying the home screen with one or more suggested application widgets that were not included in a user-configured home screen in accordance with a determination that the computer system was set up based on the user-configured home screen enables the computer system to provide relevant application widgets that the user did not previously have, was not previously aware of, or had placed in a less convenient position, which enables the user to access desired application content without additional inputs to locate and navigate the application and reduces the number of inputs needed for the user to access desired content.

In some embodiments, the one or more suggested application widgets are selected based on content (e.g., photos, notes, reminders, and/or TV shows (e.g., favorite shows, shows in a queue, and/or shows in an up-next queue)) associated with the account that was used to set up the computer system. Including suggested application widgets on the home screen based on content associated with the account provides the user with more relevant content from an application without the need for additional inputs to locate and navigate the application, which reduces the number of inputs needed for a user to access the application content. In some embodiments, in accordance with a determination that first content is associated with the account, the one or more suggested application widgets includes (e.g., is) a first set of application widgets; and in accordance with a determination that second content, that is different from the first content, is associated with the account, the one or more suggested application widgets includes (e.g., is) a second set of application widgets that is different from the first set of application widgets.

In some embodiments, the one or more suggested application widgets are selected based on application usage (e.g., a recency or frequency at which an application has been used) associated with the account that was used to set up the computer system. Including suggested application widgets on the home screen based on application usage associated with the account provides the user with more relevant application content, such as from frequently or recently used applications, and reduces the need for additional inputs to locate and navigate the application, which reduces the number of inputs needed for a user to access the application content. In some embodiments, in accordance with a determination that first application usage is associated with the account, the one or more suggested application widgets includes (e.g., is) a first set of application widgets; and in accordance with a determination that second application usage, that is different from the first content, is associated with the account, the one or more suggested application widgets includes (e.g., is) a second set of application widgets that is different from the first set of application widgets. For example, in some embodiments, the computer system will display a suggested application widget on the home screen corresponding to a most-recently used and/or most-frequently used application in the account.

In some embodiments, the account that was used to set up the computer system includes an application widget user interface (e.g., 630) (e.g., different from a home screen; a portion of a home screen; and/or a user interface (or portion thereof) for (e.g., dedicated for or primarily used for) hosting application widgets) that includes a plurality of application widgets (e.g., 608*a*, 608*b*, 608*c*, 608*k*, and/or 608*l*) (and, optionally, without any application icons), and the one or more suggested application widgets (e.g., 608*a*, 608*b*, 608*c*, and/or 608*k*) are selected based on (e.g., include one or more of) the plurality of application widgets that were in the application widget user interface (e.g., application widgets previously selected by the user for inclusion in the application widget user interface). Including suggested application widgets on the home screen based on application widgets in an application widget user interface of the account that was used to set up the computer system provides the user with more relevant application content and/or familiar application widgets and reduces the need for a user to locate and navigate the application, which reduces the number of inputs needed for a user to access the application content.

In some embodiments, in accordance with a determination that the application widget user interface includes a first plurality of application widgets, the one or more suggested application widgets includes (e.g., is) a first set of application widgets; and in accordance with a determination that the application widget user interface includes a second plurality of application widgets, that is different from the first plurality of application widgets, the one or more suggested application widgets includes (e.g., is) a second set of application widgets that is different from the first set of application widgets. For example, in some embodiments, the computer system will display a suggested application widget on the home screen because it was included in the application widget user interface.

In some embodiments, in response to receiving the request to display the home screen of the computer system, the computer system displays, via the display generation component (and concurrently with the one or more application widgets that were not included in the user-configured home screen), a first option (e.g., 618*c*) (e.g., a button, an affordance, and/or a selectable icon) that, when selected, causes the computer system to maintain on the home screen the one or more application widgets that were not included in the user-configured home screen and a second option (e.g., 618*b*) (e.g., a button, an affordance, and/or a selectable icon) that, when selected, causes the computer system to initiate a process for reconfiguring the home screen (e.g., to move or remove the one or more application widgets that were not included in the user-configured home screen). Displaying a first option to maintain on the home screen the one or more application widgets that were not included in the user-configured home screen and a second option to initiate a process for reconfiguring the home screen in response to receiving the request to display the home screen of the computer system enables the user to quickly and easily accept the home screen with the application widgets or reconfigure the home screen if the user wants to remove the application widgets or place them in a different position. In some embodiments, in response to detecting selection of the second option, the computer system enters an edit mode that allows a user to, e.g., remove user interface elements from the home screen and/or rearrange user interface elements on the home screen.

In some embodiments, the computer system detects, via the one or more input devices, an input (e.g., 610*f*) (e.g., a touch gesture, a tap gesture, a mouse click, a button press while the first option is designated or in focus) corresponding to selection of the second option (e.g., 618*b*); and in response to detecting the input corresponding to selection of the second option, the computer system enters a home screen reconfiguration mode (e.g., FIG. 6L) in which the computer system provides an ability (e.g., via user input) to reconfigure the home screen (e.g., delete user interface element(s) from the home screen, move user interface element(s) to a different position and/or page of the home screen, and/or rearrange an order of user interface element(s) on the home screen). Entering the home screen reconfiguration mode in response to detecting the input corresponding to selection of the second option enables the user to quickly and easily reconfigure the home screen if the user wants to remove the application widgets or place them in a different position. In some embodiments, an input (e.g., a tap and drag gesture) that moves a user interface element to a different position while in the reconfiguration mode does not move the user interface element when the computer system is not in the reconfiguration mode and, optionally, performs a different function, such as, e.g., navigating between pages of the home screen.

In some embodiments, while displaying the first option (e.g., 618*c*) and the second option (e.g., 618*b*), the computer system displays an animation (e.g., a shaking, jiggling, and/or pulsing animation) of the one or more application widgets (e.g., 608*m*, 608*n*, 608*o*, and/or 608*p*) that were not included in the user-configured home screen (e.g., 606*f*). Displaying an animation of the one or more application widgets that were not included in the user-configured home screen provides an indication to the user that the one or more application widgets were not included in the user-configured home screen, which provides improved visual feedback to the user.

In some embodiments, displaying the home screen includes: in accordance with a determination that the account that was used to set up the computer system does not include data indicating that an application widget has been used with the account, displaying one or more recommended application widgets (e.g., 608*m*, 608*n*, 608*o*, and/or 608*p*) (e.g., application widgets that are not associated with the account) on the home screen; and in accordance with a determination that the account that was used to set up the computer system includes data indicating that an application widget has been used with the account, foregoing display of the one or more recommended application widgets on the home screen. Selectively displaying recommended application widgets based on whether or not an application widget has been used with the account that was used to set up the computer system emphasizes to the user the availability of a feature (e.g., application widgets) that has not been used by the account (e.g., a feature with which the user may not be aware) and that allows the user to access application content without additional inputs for locating and navigating the application, which reduces the number of inputs needed to access the application content.

In some embodiments, displaying the home screen includes: in accordance with a determination that a third set of criteria is met, where the third set of criteria includes a criterion that is met when (e.g., in accordance with a determination that) the account that was used to set up the computer system is associated with a second type of content (e.g., a stored home screen) that is different from the first type of content (and, optionally, is not associated with the first type of content), displaying a third set of user interface elements (e.g., 608*i* and 608*j*) on the home screen, wherein the third set of user interface elements is different from the first set of user interface elements and the second set of user interface elements (e.g., without displaying one or more of the user interface elements in the first set of user interface elements and one or more user interface elements in the second set of user interface elements). Displaying the third set (a different set) of user interface elements on the home screen in accordance with a determination that a third set of criteria is met, where the third set of criteria includes a criterion that is met when the account that was used to set up the computer system is associated with a second type of content that is different from the first type of content provides a customized and more relevant home screen for a user and reduces the need to manually configure the home screen, which configures the home screen when a set of conditions has been met without requiring further user input and reduces the number of inputs needed to configure the home screen and/or access desired content. In some embodiments, the third set of criteria is met in accordance with a determination that the account that was used to set up the computer system is associated with the second type of content (e.g., determining that the account that was used to set up the computer system is associated with the second type of content is sufficient to meet the third set of criteria). In some embodiments, a determination that the account that was used to set up the computer system is associated with the second type of content is required (but not sufficient) to meet the third set of criteria.

Note that details of the processes described above with respect to method 700 (e.g., FIG. 7) are also applicable in an analogous manner to the methods described below. For example, method 900 optionally includes one or more of the characteristics of the various methods described above with reference to method 700. For example, the set of application widgets and/or the set of application icons described in method 900 can be displayed (e.g., suggested) based on whether or not an account that was used to set up the computer system described in method 900 is associated with a first type of content. For brevity, these details are not repeated below.

FIGS. 8A-8J illustrate exemplary techniques and user interfaces for arranging user interface elements (e.g., application widgets and/or application icons) on a user interface (e.g., a home screen) in different orientations (e.g., a portrait orientation and a landscape orientation) and in response to a request to re-position a user interface element on the user interface. The user interfaces in these figures are used to illustrate the processes described below, including the processes in FIGS. 9A-9B.

Figure 8A:
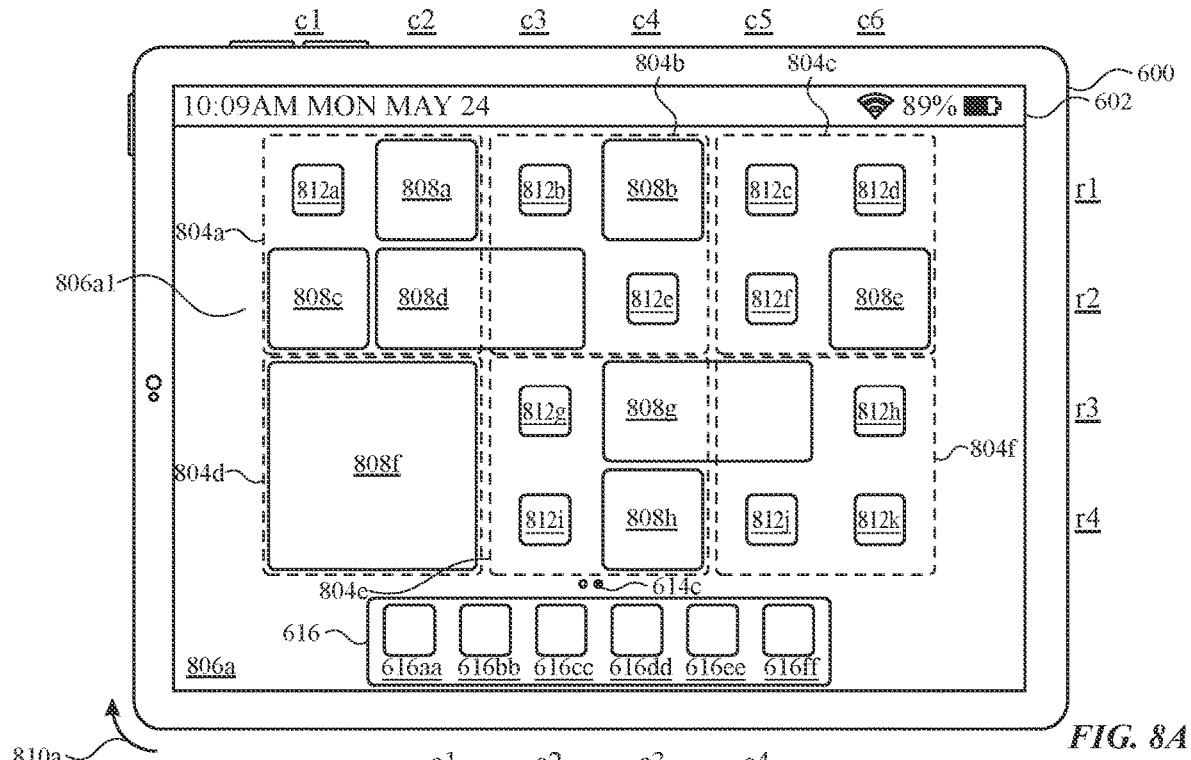
FIGS. 8A-8J illustrate techniques for managing application widgets in accordance with some embodiments.
Figure 8B:
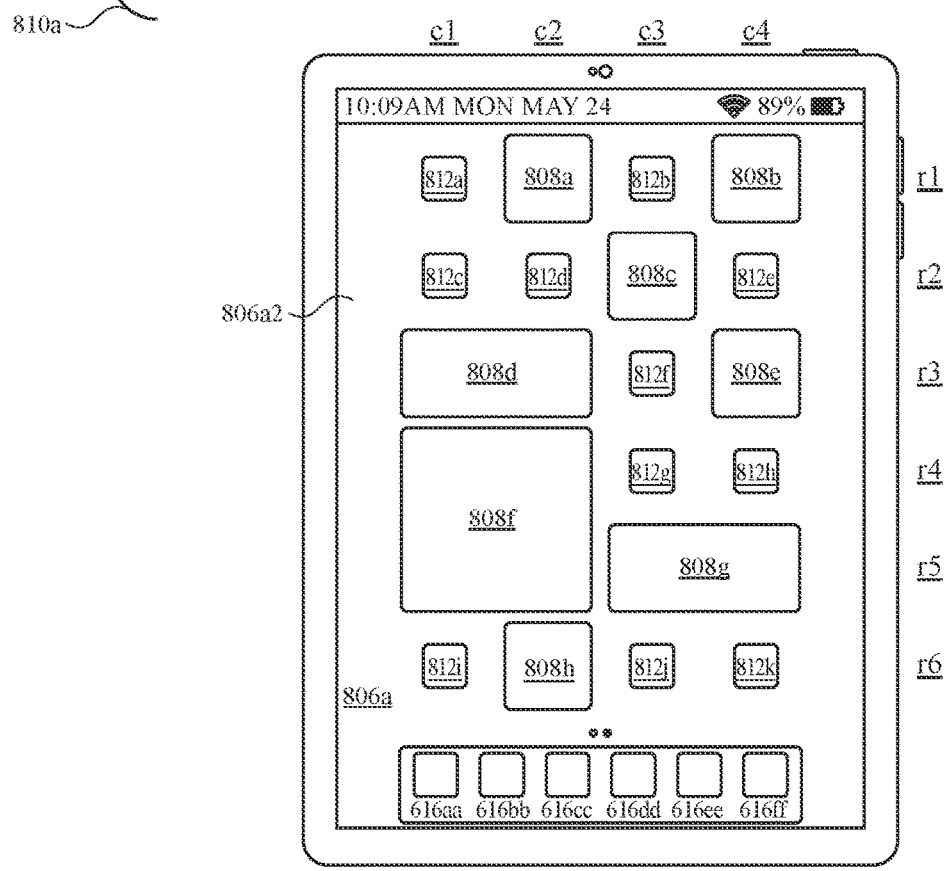

FIG. 8A illustrates device 600 described above with reference to FIGS. 6A-6M. In FIG. 8A, device 600 displays user interface 806*a* (e.g., a home screen) that includes application icons 812*a*-812*k* and application widgets 808*a*-808*h*. The application icons and application widgets (including widget stacks) illustrated in FIGS. 8A-8J are analogous to or include one or more of the application icons and application widgets described with reference to FIGS. 6A-6M. In some embodiments, application icons 812*a*-812*k* include one or more of icons 416-446 on user interface 400.

In some embodiments, one or more of application widgets 808*a*-808*h* corresponds to the same application as one or more of application icons 812*a*-812*k* (e.g., 808*a* is a widget that displays information from a notes application (e.g., notes module 153), and one of application icons 812*a*-812*k* is icon 444 for notes module 153). In some embodiments, application widgets are larger than application icons and include more information (e.g., current weather conditions, subject, time, and/or location of an upcoming event, a photo from a photo library, or a new headline) from a respective application than a respective application icon for the respective application (e.g., the application icon includes an image that is representative of the respective application, but includes limited or no information from the respective application).

User interface 806*a* is displayed in a landscape orientation with a width that is greater than a height. Application icons 812*a*-812*k* and application widgets 808*a*-808*h* are displayed according to arrangement 806*a*1 in a grid pattern that has six columns and four rows, labeled c1-c6 and r1-r4, respectively. The positions of the grid patterns shown in FIGS. 8A-8J are represented by the same convention described for FIGS. 6A-6M. For the purpose of rearranging a user interface as described below, the elements have an order (e.g., sequential order) from left to right and top to bottom. In arrangement 806*a*1, the order is: 812*a*, 808*a*, 812*b*, 808*b*, 812*c*, 812*d*, 808*c*, 808*d*, 812*e*, 812*f*, 808*e*, 808*f*, 812*g*, 808*g*, 812*h*, 812*i*, 808*h*, 812*j*, and 812*k*. The same ordering scheme is applied to the positions of the grid pattern. Thus, the order of the positions of the grid pattern in the landscape orientation of user interface 806*a* is: (c1,r1), (c2,r1), (c3,r1), (c4,r1), (c5,r1), (c6,r1), (c1,r2), (c2,r2), (c3,r2), (c4,r2), (c5,r2), (c6,r2), (c1,r3), (c2,r3), (c3,r3), (c4,r3), (c5,r3), (c6,r3), (c1,r4), (c2,r4), (c3,r4), (c4,r4), (c5,r4), and (c6,r4).

User interface 806*a* is divided (e.g., conceptually, for the purpose of determining arrangement of elements) into blocks 804*a*-804*f*, referred to as "quads," that include four positions. For example, quad 804*a* includes the positions corresponding to: column 1, row 1; column 1, row 2; column 2, row 1; and column 2, row 2, represented as (c1:2,r1:2). Quads 804*b*, 804*c*, 804*d*, 804*e*, and 804*f* include positions (c3:4,r1:2), (c5:6,r1:2), (c1:2,r3:4), (c3:4,r3:4), and (c5:6,r3:4), respectively Accordingly, the grid pattern in FIG. 8A has three columns of quads and two rows of quads. The dashed boxes representing quads 804*a*-804*f* shown in, e.g., FIG. 8A are not displayed on user interface 806*a*.

In FIG. 8A, device 600 detects a request 810*a* to change the orientation of user interface 806*a*. In the embodiment illustrated in FIG. 8A, request 810*a* is a rotation of device 600 (e.g., from a landscape orientation to a portrait orientation), represented by the arrow adjacent to the bottom left corner of device 600. In some embodiments, the request to change the orientation of user interface 806*a* includes selection of a setting that determines the orientation in which device 600 displays a user interface.

In some embodiments, in response to detecting request 810*a*, device 600 changes the orientation of user interface 806*a* to a portrait orientation and displays application icons 812*a*-812*k* and application widgets 808*a*-808*h* in arrangement 806*a*2 shown in FIG. 8B. In the portrait orientation, the elements are arranged in a grid that has four columns and six rows, labeled c1-c4 and r1-r6, respectively. According to the ordering scheme used for element arrangement, the order of the positions of the grid pattern in user interface 806*a* in the portrait orientation is: (c1,r1), (c2,r1), (c3,r1), (c4,r1), (c1,r2), (c2,r2), (c3,r2), (c4,r2), (c1,r3), (c2,r3), (c3,r3), (c4,r3), (c1,r4), (c2,r4), (c3,r4), (c4,r4), (c1,r5), (c2,r5), (c3,5), (c4,r5), (c1,r6), (c2,r6), (c3,r6), and (c4,r6).

To change from arrangement 806*a*1 to arrangement 806*a*2, device 600 rearranges the elements in a manner that maintains (where possible) the sequential order of the elements (e.g., from left to right and top to bottom, as described above). For example, the first four elements (812*a*, 808*a*, 812*b*, and 808*b*) remain in positions (c1,r1), (c2,r1), (c3,r1), and (c4,r1). Since user interface 806*a* does not have a fifth column in the portrait orientation, the fifth element (application icon 812*c*) is displayed in the left most position of the second row in arrangement 806*a*2 (corresponding to the fifth position (c1,r2) of the grid pattern of user interface 806*a* in portrait orientation), followed by the sixth and seventh elements (application icon 812*d* and application widget 808*c*) in the sixth position (c2,r2) and seventh position (c3,r2), respectively of the grid pattern in the portrait orientation.

In some embodiments, if an element does not fit in a position, then the element is placed in the next available position(s) where the element fits. For example, the eighth element in FIG. 8A is application widget 808*d*, and the eighth position in FIG. 8B is (c4,r2). Since application widget 808*d* does not fit in position (c4,r2) (because application widget 808*d* occupies (e.g., requires) two positions along a row, and position (c4,r2) is the last position in row 2), application widget 808*d* is placed in the next available positions that accommodate its size, which are (c1:2,r3) and the next element that fits in the eighth position (e.g., the ninth element (application icon 812*e*)) is placed at (c4,r2) to fill the eighth position.

Figure 8C:
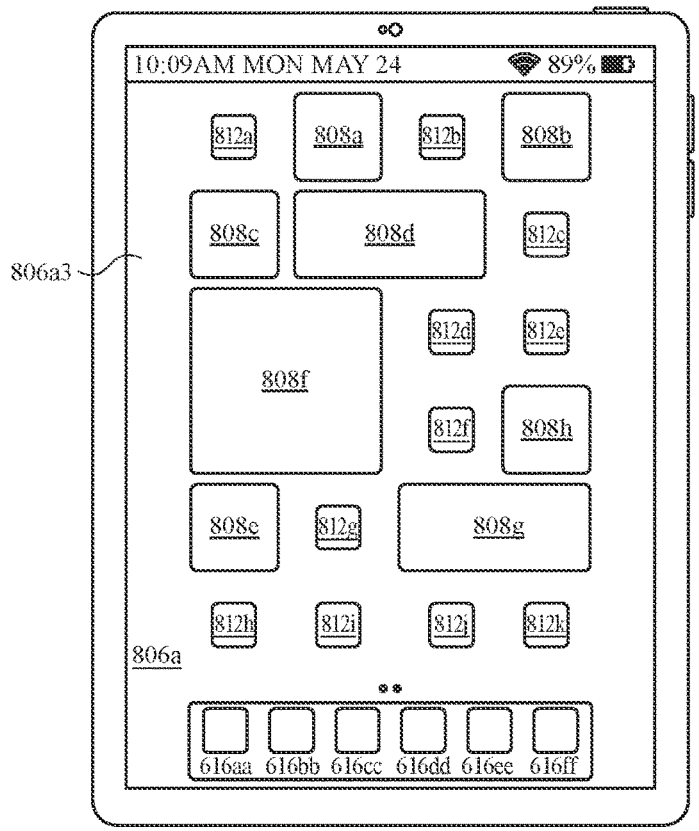
Figure 9A:
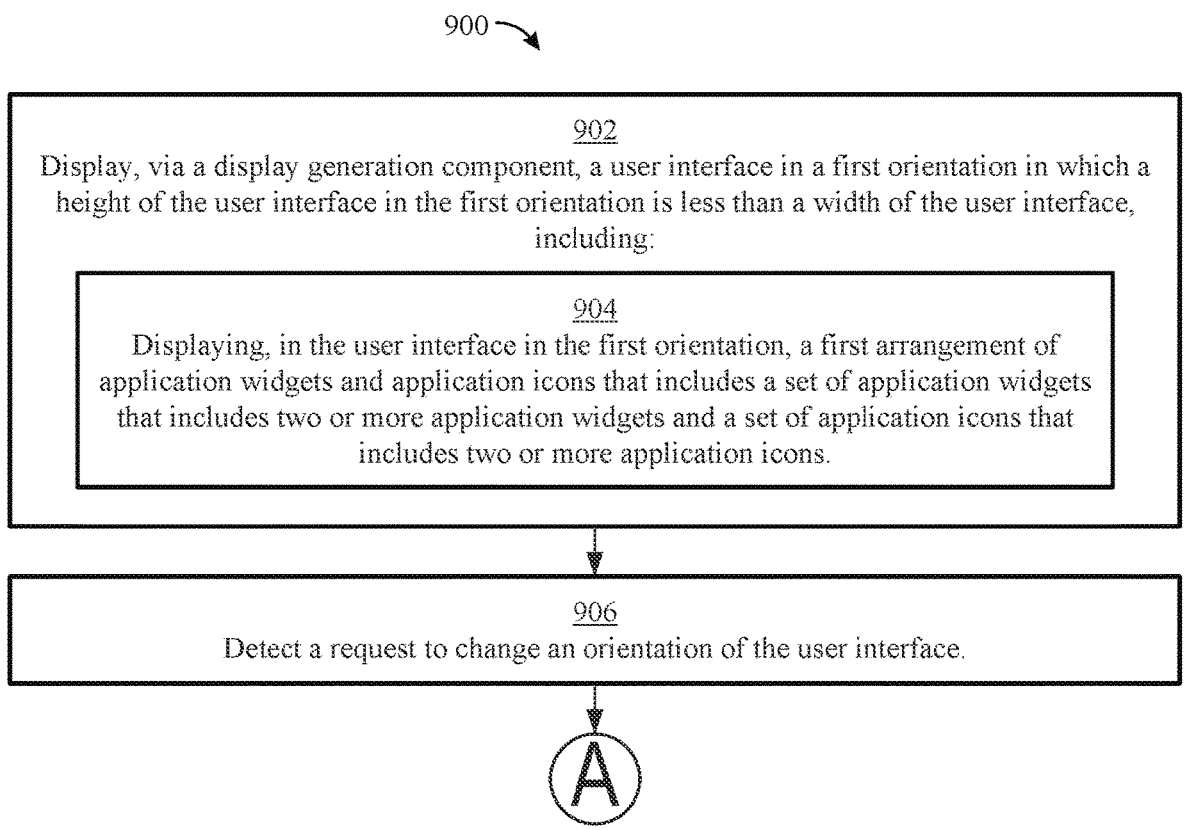

In some embodiment, in response to detecting request 810*a*, device 600 changes the orientation of user interface 806*a* to the portrait orientation and displays application icons 812*a*-812*k* and application widgets 808*a*-808*h* in arrangement 806*a*3 shown in FIG. 8C. To change from arrangement 806*a*1 to arrangement 806*a*3, device 600 rearranges the elements according to a set of rules that includes maintaining the spatial organization of application widgets that are positioned on a side (e.g., left, right, top, or bottom) of user interface 806*a* that has the most widgets.

In some embodiments, the sides of a user interface that are used to determine how to rearrange the elements of a user interface are defined based on the smallest dimension of the orientation to which the user interface is requested to be changed (e.g., the largest portion of the user interface that will fit in the new orientation). For example, in some scenarios, the user interface is requested to be changed from a first orientation (e.g., landscape) to a second orientation (e.g., portrait), where the first orientation has a first size in a first dimension (e.g., horizontal/width) and a second size in a second dimension (e.g., vertical/height), the second orientation has a third size in the first dimension and a fourth size in the second dimension, and where the first size is larger than the second size (e.g., the width is greater than the height in landscape), and the third size is smaller than the fourth size (e.g., the width is less than the height in portrait). In this scenario, according to some embodiments, the user interface in the first orientation is divided into two (potentially overlapping) sides along the first dimension (e.g., horizontal/width), each with a size equal to or less than the third size (e.g., the size of the first dimension (e.g., horizontal/width) in the second orientation (e.g., portrait)). For example, in some embodiments, for a request to change the orientation of a user interface from a landscape orientation that is six columns wide and four columns high to a portrait orientation that is four columns wide and six columns high, the user interface in the first orientation is divided along the horizontal dimension to include a left side with a width of four columns (or less) and a right side with a width of four columns (or less). For a request to change the orientation of a user interface from a portrait orientation that is four columns wide and six columns high to a landscape orientation that is six columns wide and four columns high, the user interface in the first orientation can be divided along the vertical dimension to include a top side with a height of four columns (or less) and a bottom side with a height of four columns (or less).

In the embodiment illustrated in FIG. 8C, for the purpose of rearranging the elements, a left side of user interface 806a is defined as quads 804a, 804b, 804d, and 804e (e.g., the combination of the left (first) column of quads and the center (second) column of quads), and a right side of user interface 806a is defined as quads 804b, 804c, 804e, and 804f (e.g., the combination of the center (second) column of quads and the right (third) column of quads). According to this definition, the left side of arrangement 806a1 has six application widgets (e.g., 808a, 808b, 808c, 808d, 808f, and 808h) and the right side has four application widgets (e.g., 808b, 808e, 808g, and 808h). In some embodiments, an application widget is considered to be in a side only if it is completely within the side (e.g., 808g is not counted as being in the left side and 808d is not counted as being in the right side).

Since the left side of arrangement 808a1 has equal to or greater than the number of application widgets on the right side, device 600 maintains the spatial organization of the application widgets on the left side of arrangement 806a1 when rearranging the elements into arrangement 806a3. In some embodiments, when the left side has equal to or greater than the number of application widgets on the right side, device 600 maintains the positions of the application widgets on the left side of arrangement 806a1 relative to the top of the user interface when rearranging the elements into arrangement 806a3. For example, application widgets 808a, 808b, 808c, 808d, 808f, and 808h are in positions (c2,r1), (c4,r1), (c1,r2), (c2:3,r2), (c1:2,r3:4), and (c4,r4), respectively, in both arrangement 806a1 and 806a3. The remaining application widgets and application icons are arranged according to their sequential order in the remaining positions (e.g., the positions not occupied by application widgets 808a, 808b, 808c, 808d, 808f, and 808h) in accordance with the scheme described above with reference to arrangement 806a2. For example, the remaining positions, in order, are (c1,r1), (c3,r1), (c4,r2), (c3,r3), (c4,r3), (c3,r4), (c1,r5), (c2,r5), (c3,r5), (c4,r5), (c1,r6), (c2,r6), (c3,r6), and (c4,r6), which are occupied in arrangement 806a3 according to the order of the remaining application icons and application widgets from arrangement 806a1 and the rules described with reference to arrangement 806a2.

In some embodiments, while displaying user interface 806 in portrait orientation with arrangement 806a3, device 600 receives a request to change the orientation of user interface 806a to landscape orientation (e.g., back to landscape orientation), and in response, displays (e.g., re-displays) user interface 806a in arrangement 806a1 (e.g., device 600 reverses the change in arrangement that was performed in response to input 810a). In some embodiments, changing the arrangement from arrangement 806a3 back to arrangement 806a1 can be achieved by applying the rearrangement rules described above. For example, in arrangement 806a3, since the top four rows (e.g., a top side of user interface 806a) have more widgets than the bottom four rows (e.g., a bottom side of user interface 806a), the spatial organization and positions with respect to the top of the user interface are maintained for application widgets 808a, 808b, 808c, 808d, 808f, and 808h.

Figure 8D:
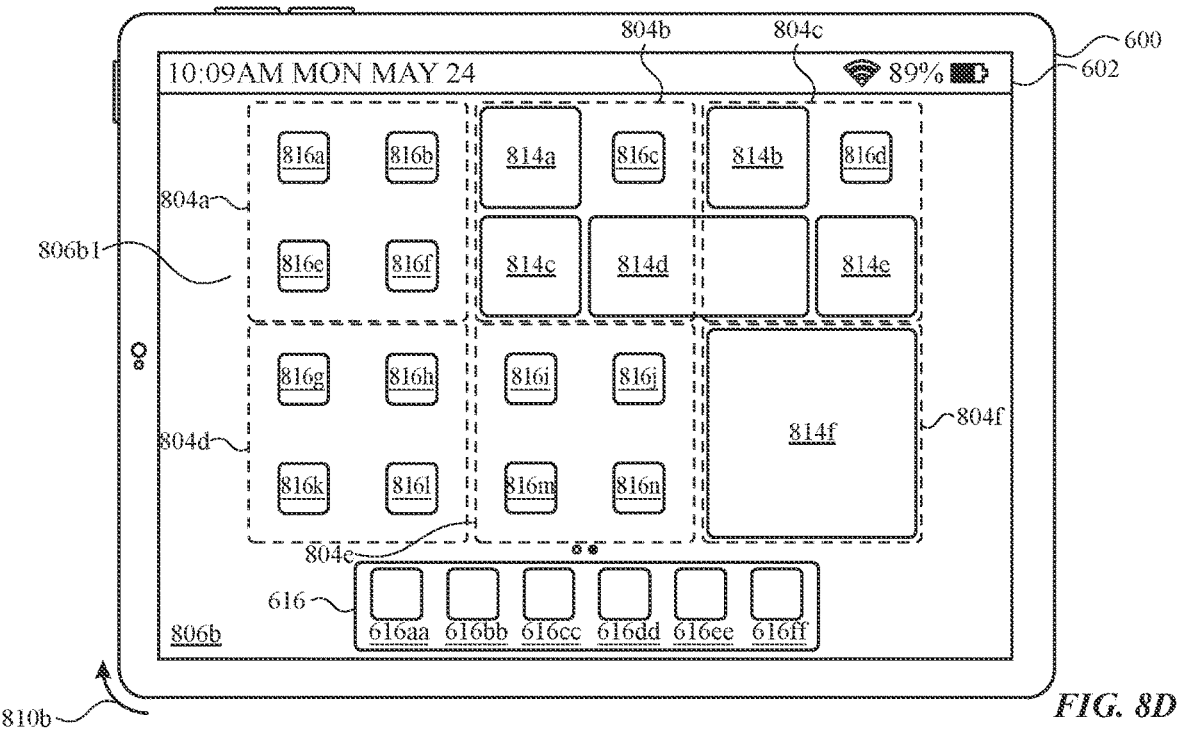

FIG. 8D illustrates an embodiment of device 600 displaying user interface 806b in a landscape orientation with a plurality of user interface elements, including application icons 816a-816n and application widgets 814a-814f, in arrangement 806b1.

Figure 8E:
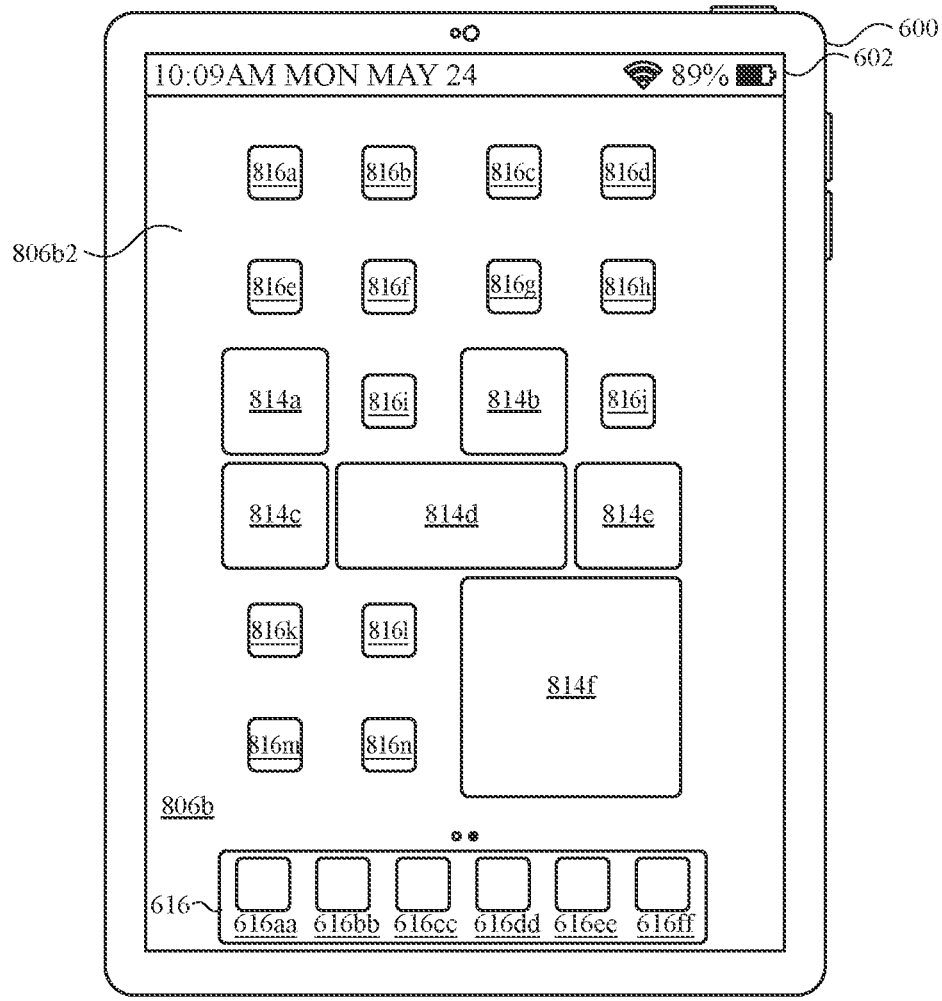

In some embodiments, in response to detecting request 810b (e.g., a rotation of device 600 from a landscape orientation to a portrait orientation), device 600 changes the orientation of user interface 806b to a portrait orientation and displays application icons 816a-816n and application widgets 812a-812F in arrangement 806b2 shown in FIG. 8E. To change from arrangement 806b1 to arrangement 806b2, device 600 rearranges the elements according to the rules described above with reference to FIG. 8C (e.g., maintaining the spatial organization of application widgets that are positioned on a side of the user interface that has the most widgets). For the purpose of rearranging the elements, the left side and right side of user interface 806b in landscape orientation are defined in the same way as in FIG. 8A (the left side is defined as quads 804a, 804b, 804d, and 804e, and the right side is defined as quads 804b, 804c, 804e, and 804f). According to this definition, the right side of user interface 806b in the landscape orientation has six application widgets (e.g., 814a, 814b, 814c, 814d, 814e, and 814f) and the left side has two application widgets (e.g., 814a and 814c). Since the right side of user interface 808b has more application widgets than the left side, device 600 maintains the spatial organization of the application widgets on the right side of user interface 806b in arrangement 806b2. Since the right side has more application widgets, the positions of the application widgets in the right side are maintained relative to the bottom of the user interface. For example, since application widget 814f is in the bottom right corner of arrangement 806b1 (occupying positions (c5:6,r3:4)), it is positioned in the bottom right corner of arrangement 806b2 (occupying positions (c3:4,r5:6)); and since application widgets 814c, 814d, and 814e are in the third row from the bottom of arrangement 806b1 (occupying positions (c3:6,r2)), they are positioned in the third row from the bottom of arrangement 806b2 (occupying positions (c1:4, r4)).

The remaining application widgets and application icons are arranged in the remaining positions (e.g., the positions not occupied by application widgets 814a, 814b, 814c, 814d, 814e, and 814f) according to the order of the remaining elements and the order of the remaining positions, as described above with reference to arrangement 806a2. For example, the first four elements in arrangement 806b1 (excluding the application widgets on the right side of arrangement 806b1) are application icons 816a-816d, which are placed in the first four unoccupied positions of arrangement 806b2 ((c1,r1), (c2,r1), (c3,r1), and (c4,r1)). As another example, since application icon 816i is positioned after 816h in arrangement 806b1, application icon 816i is placed at position (c2,r3) in arrangement 806b2, because (c2,r3) is the next unoccupied position in arrangement 806b2 after application icon 816h at (c4,r2).

In some embodiments, while displaying user interface 806b in portrait orientation with arrangement 806b2, device 600 receives a request to change the orientation of user interface 806b to landscape orientation (e.g., back to landscape orientation), and in response, displays (e.g., re-displays) user interface 806b in arrangement 806b1 (e.g., device 600 reverses the change in arrangement that was performed in response to input 810b). In some embodiments, changing the arrangement from arrangement 806b2 back to arrangement 806b1 can be achieved by applying the rearrangement rules described above. For example, in arrangement 806b2, since the bottom four rows (e.g., a bottom side of user interface 806b) have more widgets than the top four rows (e.g., a top side of user interface 806a), the spatial organization and positions with respect to the bottom of the user interface are maintained for application widgets 808a, 808b, 808c, 808d, 808e, and 808f.

Figure 8F:
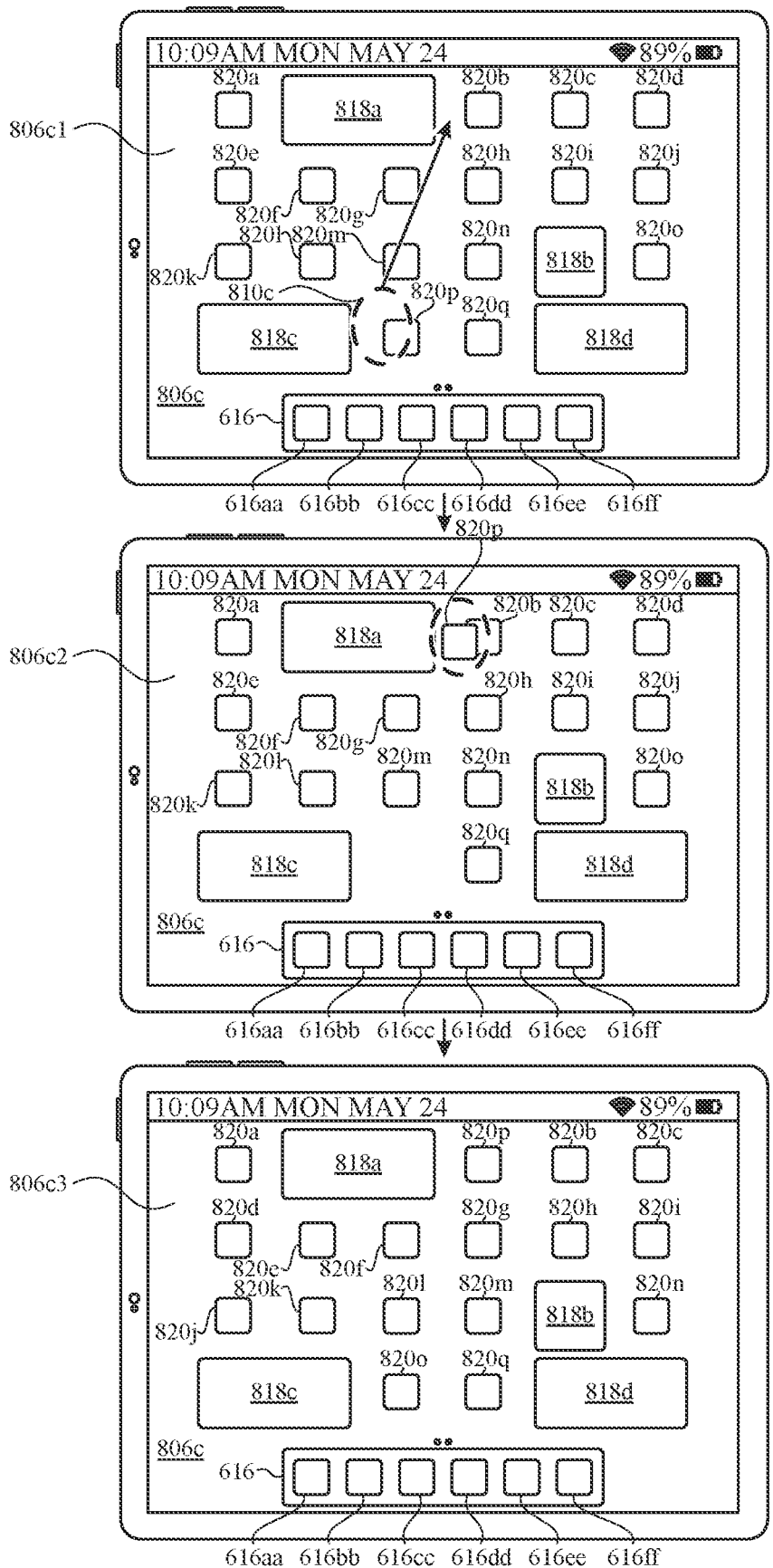

FIG. 8F illustrates a technique for reconfiguring a user interface that includes application icons and application widgets in response to a request to move an application icon, in accordance with some embodiments. In FIG. 8F, device 600 displays user interface 806c, which includes application widgets 818a-818d and application icons 820a-820q, in a landscape orientation. Application widgets 818a-818d and application icons 820a-820q are initially positioned according to arrangement 806c1. Device 600 (and/or user interface 806c) is in a reconfiguration mode in FIG. 8F such that the elements of user interface 806c can be re-positioned in response to user input. While in arrangement 806c1, device 600 receives a request 810c to move application icon 820p to the position occupied by application icon 820b (e.g., from position (c3,r4) to position (c4,r1)). In FIG. 8F, request 810c includes a tap and drag gesture that begins at a location of application icon 820p and moves to a location of application icon 820b. Since request 810c is a request to move application icon 820p to a position occupied by an application icon, device 600 rearranges application icons 820b-820p (e.g., the application icons arranged between (and including) the application icon being moved (e.g., 820p) and the application icon at the destination position (e.g., 820b)) without moving the application widgets (e.g., 818a-818d).

In response to input 810c moving from the location of application icon 820p to the location of application icon 820b, device 600 moves application icon 820p according to input 810c (e.g., to a location that overlaps application icon 820b), as shown in intermediate arrangement 806c2. After input 810c moves to the location of application icon 820b (e.g., when input 810c remains stationary (or within a threshold radius) for a predetermined amount of time; or when input 810c ends (e.g., breaks contact with a touch-sensitive surface)), device 600 moves application icons 820b-820o to the next position in the grid pattern that is not occupied by an application widget (e.g., to the next position that is occupied by an application icon), while maintaining the positions of application widgets 818a-818d. For example, application icon 820n is moved from position (c4,r3) to position (c6,r3), because the immediately adjacent position (c5,r3) is occupied by widget 818b, and application widget 818b remains at position (c5,r3), instead of, e.g., moving application widget 818b to position (c6,r3) and moving application icon 820n to position (c5,r3). Once the rearrangement is complete, device 600 displays user interface 806c in arrangement 806c3. In some embodiments, arrangement 806c3 is achieved (at least in part) by implementing a constraint (e.g., a rule) that application icons cannot move application widgets when user interface 806c is rearranged in response to a request to move an application icon or application widget to a different position.

Figure 8G:
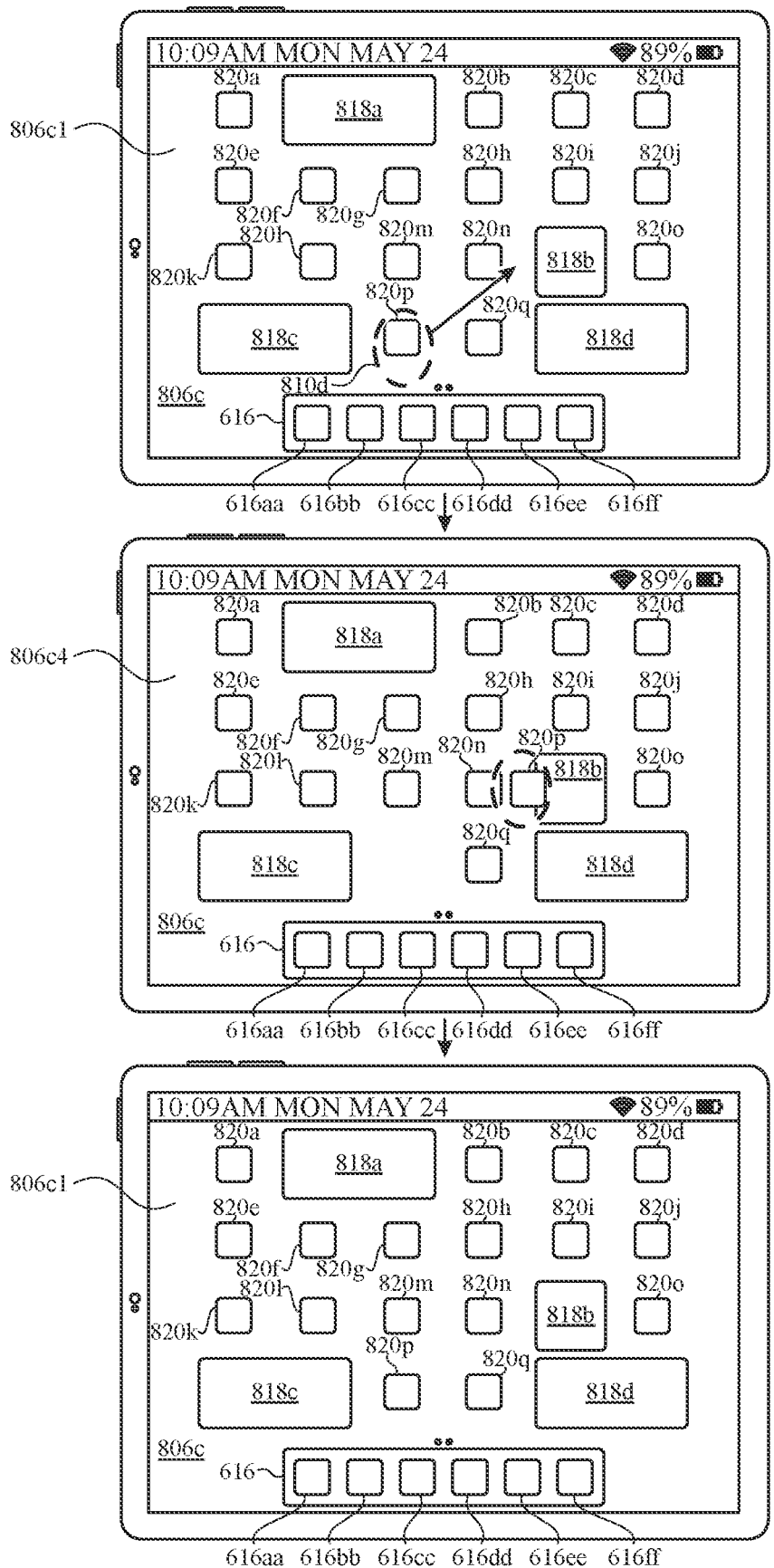

FIG. 8G illustrates a technique for responding to a request to move an application icon to a position occupied by an application widget, in accordance with some embodiments. In FIG. 8G, similar to FIG. 8F, device 600 initially displays user interface 806c in arrangement 806c1. While in arrangement 806c1, device 600 receives request 810d to move application icon 820p to the position occupied by application widget 818b. In FIG. 8G, request 810d includes a tap and drag gesture that begins at a location of application icon 820p and moves to a location of application widget 818b. In response to input 810d moving from the location of application icon 820p to the location of application widget 818b, device 600 moves application icon 820p according to input 810d (e.g., to a location that overlaps application widget 818b), as shown in intermediate arrangement 806c4. Since request 810d is a request to move application icon 820p to a position occupied by an application widget, device 600 forgoes rearranging user interface 806c (e.g., device 600 maintains the positions of the application icons and application widgets) and returns application icon 820p to its initial position (resulting, again, in arrangement 806c1), as shown in the bottom of FIG. 8G.

Figure 8H:
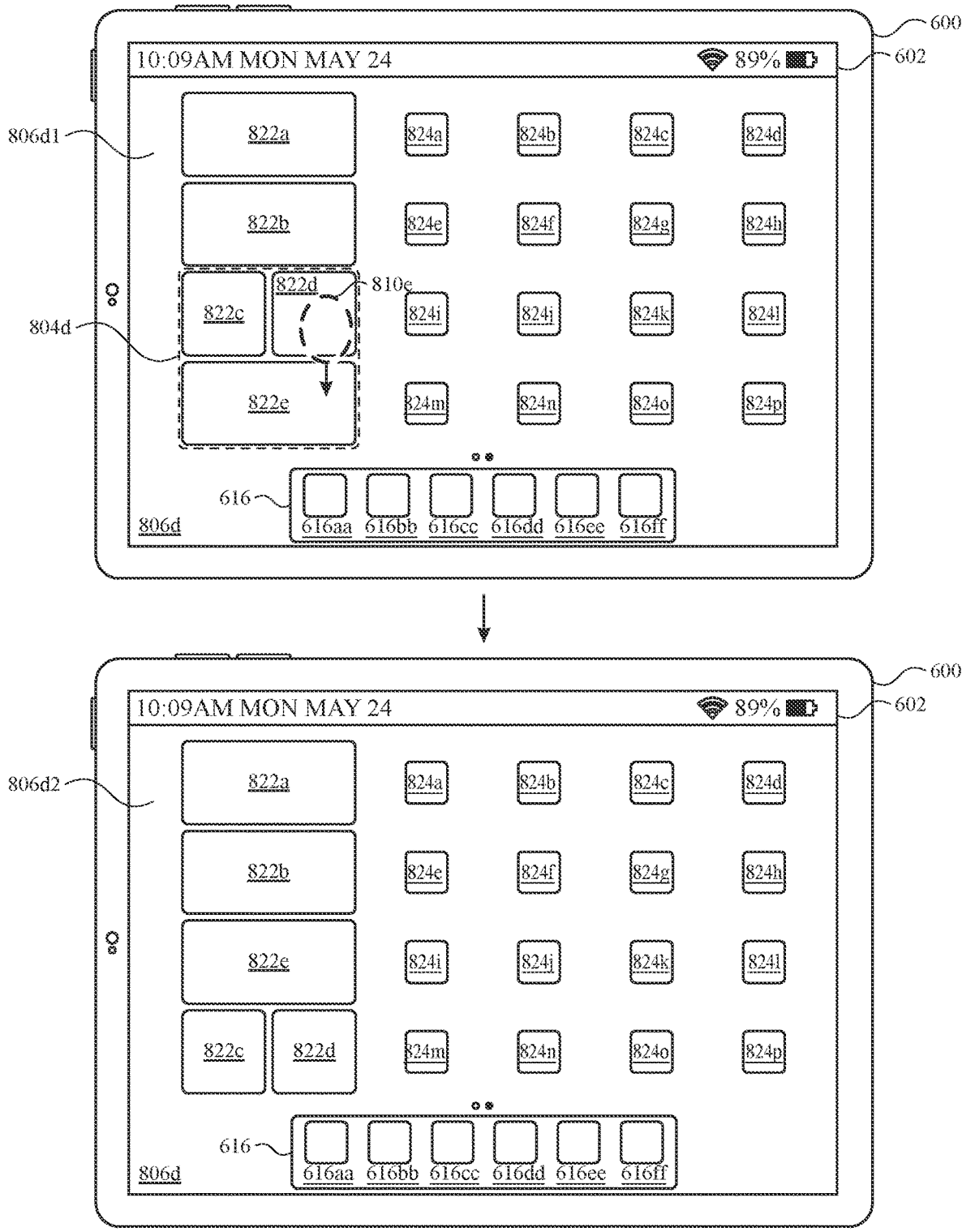

FIG. 8H illustrates a technique for reconfiguring a user interface in response to a request to move an application widget, in accordance with some embodiments. In FIG. 8H, user interface 806d includes user interface elements (application icons 824a-824p and application widgets 822a-822e) in arrangement 806d1. User interface 806d is arranged in a grid pattern with six columns and four rows, and can be divided into quads 804a-804f, in a similar manner as user interface 806a in FIG. 8A. The order of user interface elements and grid positions within a quad follows the same scheme as described above for the entire grid. For example, the order of the application widgets within quad 804d in arrangement 806d1 is: 822c, 822d, and 822e; and the order of the grid positions within quad 804d is: (c1,r3), (c2,r3), (c1,r4), and (c2,r4).

In FIG. 8H, device 600 receives a request 810e (e.g., a touch and drag gesture) to move application widget 822d from position (c2,r3) to position (c2,r4), which is initially occupied in user interface 806d by application widget 822e. In response to request 810e, since element 822d is an application widget and because the position to which application widget 822d is requested to be moved is in the same quad 804d as the initial position of application widget 822d, device 600 rearranges only the elements within quad 804d according to the order of the elements and grid positions in quad 804d, as shown in arrangement 806d2.

In some embodiments, device 600 rearranges the elements within a quad to maintain the order of application widgets within the quad (other than the widget that was requested to be moved and, optionally, subject to size constraints). In some embodiments, device 600 rearranges the elements within a quad to maintain the order of application icons (e.g., relative to other application icons) within the quad, with the condition that an application icon cannot cause a widget to move (e.g., application icons are moved to the closest position that is not occupied by an application widget). In some embodiments, device 600 rearranges the elements within a quad to maintain the order of elements within the quad, regardless of whether they are application icons or application widgets (e.g., application icons are moved to the closest position even if the position is occupied by an application widget).

In the embodiment illustrated in FIG. 8H, application widget 822d is moved to the requested position (c2,r4) and application widget 822e is moved to occupy the immediately adjacent position (c2,r3) within quad 804d. Since application widget 822e has a width of two columns, application widget 822c is moved to the next available position (c1,r4) within quad 804d. Notably, the elements outside of quad 826 (application icons 824a-824p and application widgets 822a-822b) are not moved (e.g., they remain in the same positions and arrangement).

If rearrangement in response to request 810e was not constrained to quad 804d, device 600 could, e.g., move application icons 824i-824k each one position back (e.g., to the left), move application icon 824l one position forward (e.g., to position (c1,r4)), and move application widget 822e to positions (c5:6,r3). This, however, would result in application widget 822e being moved completely across user interface 806e. By constraining rearrangement to within quad 804d, elements remain close to their initial positions, which helps maintain consistency in an interface when a user moves an application widget.

Figure 8I:
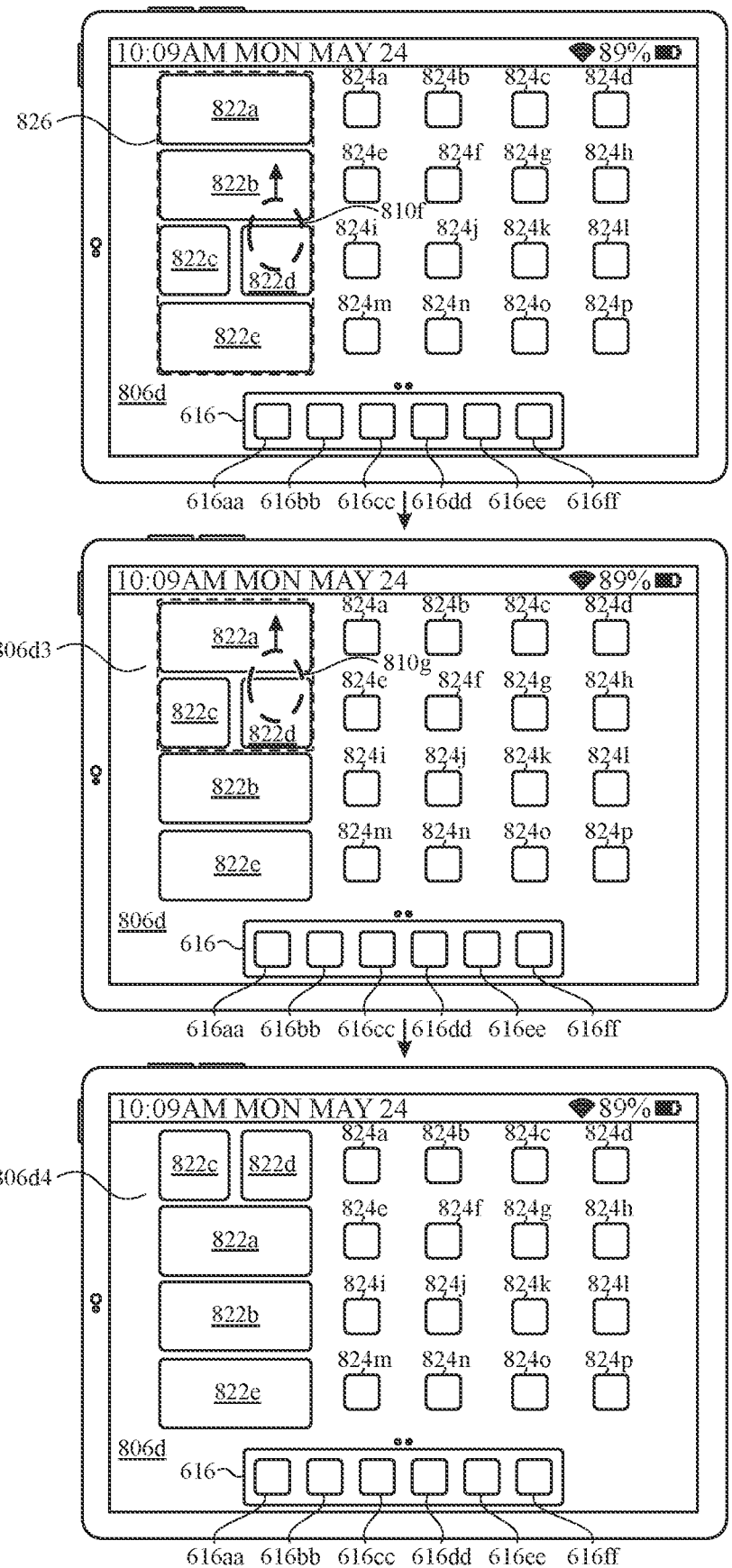

FIG. 8I illustrates a technique for reconfiguring a user interface in response to a request to move an application widget, in accordance with some embodiments. Similar to FIG. 8H, user interface 806d is initially in arrangement 806d1 in the top of FIG. 8I. In contrast to FIG. 8H, however, in FIG. 8I, device 600 receives request 810f to move application widget 822d from position (c2,r3) to position (c2,r2), which is outside of quad 804d (as identified, e.g., in FIGS. 8A and 8H).

In response to receiving request 810f, since element 822d is an application widget and because the position to which application widget 822d is requested to be moved is not in the same quad 804d as the initial position of application widget 822d, device 600 rearranges only the elements within quads 804a and 804d (e.g., in accordance with the order of the elements and grid positions in quads 804a and 804d), as shown in arrangement 806d3. In some embodiments, in response to a request to move an application widget to a position that is in a different quad than the initial position of the application widget, device 600 performs rearrangement only within region 826 defined by the combination of the quad (e.g., quad 804d) that includes the initial position (e.g., (c2:r3)) and the quad (e.g., quad 804a) that includes the requested/destination position (e.g., (c2,r2)) (e.g., device 600 "combines" the quads and rearranges the elements within the region defined by the combined quads). For example, as shown in arrangement 806d3, application widget 822d is moved to the requested position (c2,r2), application widget 822b is moved to occupy the immediately adjacent positions (c1:2,r3) within region 826, and application widget 822c is moved to the open position (c1,r2) left by application widget 822b. Notably, application icons 824a-824p remain in the same positions (e.g., are not moved).

In FIG. 8I, while user interface 806d is in arrangement 806d3, device 600 receives request 810g (e.g., a separate request or a continuation of request 810f) to move (e.g., further move) application widget 822d from position (c2,r2) to position (c2,r1). Since position (c2,r2) and position (c2,r1) are in the same quad 804a, device 600 limits rearrangement to within quad 804a. For example, device 600 moves application widget 822a down to positions (c1:2,r2) and application widgets 822c and 822d to positions (c1,r1) and (c2,r1), respectively.

In some embodiments, if the widget that is selected to be moved satisfies a widget size threshold (e.g., has a width of two or more rows and a height of two or more columns), device 600 moves entire quads in a manner that maintains the order of the quads, while keeping the elements within a quad together (e.g., in the same spatial organization relative to each other). For example, in response to a request to move a widget that satisfies the widget size threshold from quad 804f to quad 804a, device 600 moves: the elements in quad 804a (as a whole) to quad 804b, the elements in quad 804b (as a whole) to quad 804c, the elements in quad 804c (as a whole) to quad 804d, and so on.

Figure 8J:
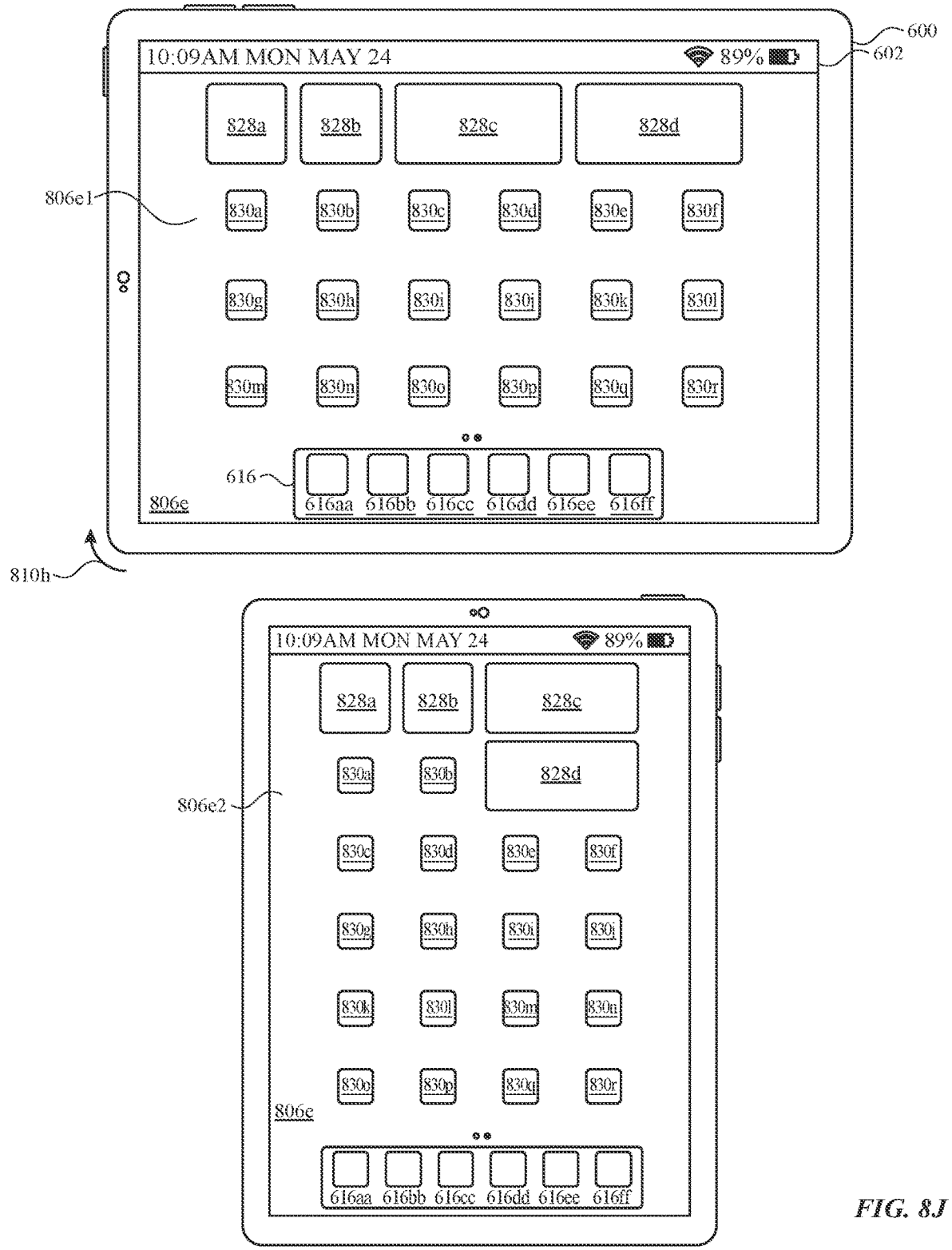

FIG. 8J illustrates a technique for rearranging elements of a user interface in response to a request to change the orientation of the interface. In FIG. 8J, device 600 displays user interface 806e with application widgets 828a-828d and application widgets 830a-830r in arrangement 806e1. Notably, in the landscape orientation, application widgets 828a-828d occupy the entire top row (row 1) of user interface 806e. In response to receiving request 810h to change the orientation of user interface 806e (e.g., from landscape orientation to portrait orientation), device 600 displays user interface 806e with application widgets 828a-828d and application widgets 830a-830r in arrangement 806e2. In the embodiment illustrated in FIG. 8J, since the left side (e.g., columns one through four) of arrangement 806e1 have more application widgets (e.g., three application widgets 828a-828c) than the right side (e.g., columns three through six) of arrangement 806e1 (which includes two application widgets 828c and 828d), the positions of the application widgets on the left side of arrangement 806e1 are maintained relative to the top of user interface 806e. However, in contrast to the rearrangement performed according to arrangement 806a3 in FIG. 8C (which maintains the order of elements other than the application widgets on the left side of the initial arrangement), device 600 moves application widget 828d down to positions (c3:4,r2), rather than to the first available positions that are not occupied by application widgets 828a-828c in arrangement 806e2 (e.g., positions (c1,r2) and (c2,r2). According to this technique, if the top row of a user interface in landscape orientation is completely occupied by application widgets, then in response to a request to change the orientation of the user interface, device 600 displays one or more application widgets that are on the right side of the first row in landscape orientation and that do not fit in the first row in portrait orientation, on the right side of the second row in the portrait orientation (e.g., rather than moving the one or more application widgets to the left side of row two). This technique allows an application widget (or widgets) on the right side of the first row to maintain a more consistent position when the user interface is switched between orientations.

In some embodiments, the techniques described above with reference to FIGS. 6A-6M and 8A-8J are applied to user interfaces that have more or less than six columns in a landscape orientation, more or less than four rows in a landscape orientation, more or less than four columns in a portrait orientation, and/or more or less than six rows in a portrait orientation.

FIGS. 9A-9B are a flow diagram illustrating a method for arranging user interface elements, including application widgets, using a computer system in accordance with some embodiments. Method 900 is performed at a computer system (e.g., 100, 300, 500, 600, 650, a smartphone, and/or a tablet) that is in communication with a display generation component (e.g., 602) (e.g., a display controller or a touch-sensitive display system) and one or more input devices (e.g., 602) (e.g., a touch-sensitive surface). Some operations in method 700 are, optionally, combined, the orders of some operations are, optionally, changed, and some operations are, optionally, omitted.

As described below, method 900 provides an intuitive way for arranging a user interface that includes application widgets. The method reduces the cognitive burden on a user for using application widgets, thereby creating a more efficient human-machine interface. For battery-operated computing devices, enabling a user to access application widgets faster and more efficiently conserves power and increases the time between battery charges.

The computer system displays (902), via the display generation component (and, optionally, while the computer system is in a first physical orientation state (e.g., a physical orientation (or range of physical orientations) of the computer system and/or display generation component), a user interface (e.g., 806a-806e) (e.g., a home screen; an application springboard; or a displayed user interface (e.g., user interface 400) that includes user interface elements corresponding to respective applications, where, when a user interface element is activated, the computer system displays the respective application corresponding to the activated user interface element) in a first orientation (e.g., 806a in FIG. 8A or 806b in FIG. 8D) (e.g., landscape orientation) in which a height of the user interface in the first orientation is less than a width of the user interface. In some embodiments, the display orientation of the user interface is relative to the display generation component. In some embodiments, a physical orientation state of the computer system and/or display generation component corresponds to a particular display orientation (e.g., a range of physical orientations correspond to a particular display orientation). In some embodiments, the display orientation of the user interface is based on a system setting (e.g., the computer system provides a toggle button that a user can select to switch between a portrait orientation and a landscape orientation; and/or the computer system provides a selectable option that allows a user to enable and disable a "portrait lock" mode in which the user interface is displayed in a portrait orientation regardless of the physical orientation of the computer system).

Displaying the user interface in the first orientation includes: displaying (904), in the user interface in the first orientation, a first arrangement (e.g., 806a1 or 806b1) of application widgets (e.g., 808a-808h or 814a-814f) and application icons (e.g., 812a-812k or 816a-816n) that includes a set of application widgets (e.g., 808a, 808b, 808c, 808d, 808f, and 808h in FIG. 8A; or 814a-814f in FIG. 8D) that includes two or more application widgets and a set of application icons (e.g., 812a-812k or 816a-816n) that includes two or more application icons. In some embodiments, a respective application widget for a respective application is larger than a respective application icon for the respective application (e.g., 608a is larger than 612b). In some embodiments, the respective application widget for the respective application includes more information (e.g., current weather conditions, subject, time, and/or location of an upcoming event, a photo from a photo library, or a new headline) from the respective application than the respective application icon for the respective application (e.g., 608e1 includes more information than 612c). Displaying a respective application widget for a respective application larger than a respective application icon for the respective application provides a visual distinction between the application widget and the application icon for the respective application that allows a user to quickly and easily identify and locate application widgets, which enables a user to navigate the user interface more efficiently.

The computer system detects (906) a request (e.g., 810a or 810b) to change an orientation of the user interface (e.g., detecting a change in the computer system from the first physical orientation state to a second physical orientation state that is different from the first physical orientation state (e.g., a physical rotation of the computer system and/or the display generation component; a change from a physical orientation that corresponds to a landscape display state to a physical orientation that corresponds to a portrait display state)).

In response to detecting the request to change the orientation of the user interface, the computer system displays (908) the user interface in a second orientation (e.g., 806a in FIG. 8C or 806b in FIG. 8E) (e.g., relative to the display generation component; a portrait orientation; and/or a display orientation that is oriented at 90 degrees relative to the first orientation) in which the height of the user interface is greater than the width of the user interface. Displaying the user interface in the second orientation includes: displaying (910), in the user interface in the second orientation, a second arrangement (e.g., 806a3 or 806b2) of application widgets and application icons that includes the set of application widgets (e.g., 808a, 808b, 808c, 808d, 808f, and 808h in FIG. 8A; or 814a-814f in FIG. 8D) and the set of application icons (e.g., 812a-812k or 816a-816n), wherein: (912) the set of application widgets in the second arrangement has a same spatial organization as the set of application widgets in the first arrangement; (914) a position of a first application icon (e.g., 812e) in the set of application icons relative to the spatial organization of the set of application widgets in the user interface in the second orientation (e.g., 812e in 806a3) is different from a position of the first application icon relative to the spatial organization of the set of application widgets in the user interface in the first orientation (e.g., 812e in 806a1); and (916) a position of a second application icon (e.g., 812i) in the set of application icons relative to the spatial organization of the set of application widgets in the user interface in the second orientation (e.g., 812i in 806a3) is different from a position of the second application icon relative to the spatial organization of the set of application widgets in the user interface in the first orientation (e.g., 812i in 806a1). Displaying the set of application widgets in the second arrangement with the same spatial organization as the set of application widgets in the first arrangement maintains consistency of the positions of the application widgets and allows a user to more quickly and easily locate application widgets when the orientation of the user interface is changed, which enables a user to navigate the user interface more efficiently.

In some embodiments, displaying the user interface in the first orientation includes displaying, in the user interface in the first orientation (and concurrently with the set of application widgets and the set of application icons), a first application widget (e.g., 808e in 806a1) that is not included in the set of application widgets (e.g., 808a-808d, 808f, and 808h). In some embodiments, displaying the user interface in the second orientation includes displaying, in the user interface in the second orientation (and concurrently with the set of application widgets and the set of application icons), the first application widget (e.g., 808e in 806a3), wherein a position (e.g., (c1,r5)) of the first application widget relative to the spatial organization of the set of application widgets in the user interface in the second orientation is different from a position (e.g., (c6,r2)) of the first application widget relative to the spatial organization of the set of application widgets in the user interface in the first orientation. Displaying the first application widget at a position relative to the spatial organization of the set of application widgets in the user interface in the second orientation that is different from a position of the first application widget relative to the spatial organization of the set of application widgets in the user interface in the first orientation enables the computer system to move some widgets relative to the group of widgets in order to provide a user interface that maintains consistency with respect to certain widgets while moving others to accommodate a different orientation, which provides improved visual feedback to the user when the orientation is changed.

In some embodiments, the set of application widgets is selected based on positions (e.g., column positions) of the set of application widgets in the first arrangement (e.g., 806a1 or 806b1) (e.g., the positions of the set of application widgets in the user interface in the first orientation) and/or the width (or, optionally, the smallest dimension) of the user interface (e.g., 806a or 806b) in the second orientation. Selecting the set of application widgets based on the positions of the set of application widgets in the first arrangement and/or the width of the user interface in the second orientation enables the computer system to maximize consistency in the arrangement of application widgets when the orientation of the user interface is changed based on where the application widgets are located in the first arrangement and/or size constraints of the second orientation.

In some embodiments, the set of application widgets is selected based on which side (e.g., left side or right side) of the user interface in the first orientation includes more application widgets (optionally, with a tie going to the left side). In some embodiments, the set of application widgets includes the widgets (e.g., all of the widgets) on the side of the user interface in the first orientation that has the most application widgets. In some embodiments, the sides of the user interface in the first orientation used to select the set of application widgets overlap (e.g., in an array with six columns, the left side (for the purpose of selecting the set of application widgets, the left side includes (e.g., consists of) the left-most four columns (e.g., columns one through four) and the right side includes (e.g., consists of) the right-most four columns (e.g., columns three through six). In some embodiments, the sides do not overlap (e.g., in user interface 806a, the left side includes columns 1-3 and the right side includes columns 4-6). In some embodiments, the size of the sides used to select the set of application widgets is based on (e.g., is equal to or less than) the smallest dimension of the second orientation.

In some embodiments, in accordance with a determination that the first arrangement of application widgets and application icons includes a first application widgets arrangement of application widgets, the set of application widgets includes a first set of application widgets; and in accordance with a determination that the first arrangement of application widgets and application icons includes a second application widgets arrangement of application widgets, different from the first application widgets arrangement of application widgets, the set of application widgets includes a second set of application widgets that is different from the first set of application widgets.

In some embodiments, in the second arrangement (e.g., 806a3 or 806b2) (e.g., in the user interface in the second orientation), the set of application icons (e.g., 812a-812k or 816a-816n) have a same sequential order (e.g., from left to right and then top to bottom; and/or not including intervening application widgets) as the set of application icons in the first arrangement (e.g., 806a1 or 806b1) (e.g., in the user interface in the first orientation). Displaying the set of application icons in the second arrangement with the same sequential order as the set of application icons in the first arrangement maintains consistency in the positions of the application icons when the user interface is changed and allows a user to more quickly and easily locate application icons, which enables a user to navigate the user interface more efficiently. In some embodiments, the application icons in the set of application icons reflow around the application widgets based on the order of the application icons in the first arrangement.

In some embodiments, the set of application icons includes a third application icon (e.g., 812g) (e.g., the first application icon, the second application icon, or an application icon different from the first application icon and the second application icon), and a position of the third application icon relative to one or more application icons (e.g., 812i and/or 812j) in the set of application icons in the user interface in the second orientation is different from a position of the third application icon relative to the one or more application icons in the set of application icons in the user interface in the first orientation (e.g., an application icon is moved from the end/beginning of a row to the beginning/end of the row below/above and/or from being immediately adjacent to another application icon to being separated by an application widget). Displaying the third application icon in a position relative to one or more application icons in the set of application icons in the user interface in the second orientation that is different from a position of the third application icon relative to the one or more application icons in the set of application icons in the user interface in the first orientation enables the computer system to move application icons while maintaining positions of application widgets in order to maintain consistency in the user interface between the first orientation and the second orientation, which enables a user to navigate the user interface more efficiently. In some embodiments, a spatial organization of the set of application icons in the first arrangement is different from a spatial organization of the set of application icons in the second arrangement.

In some embodiments, the user interface in the first orientation includes: a first portion (e.g., columns 1-4 of 806a) (e.g., a left side) that includes a first set of application widgets (e.g., zero or more application widgets), and a second portion (e.g., columns 3-6 of 806a) (e.g., a right side) that includes a second set of application widgets (e.g., zero or more application widgets). In some embodiments, displaying the second arrangement of application widgets and application icons includes: in accordance with a determination that the first portion includes a same number or more application widgets than the second portion (e.g., 806a1), displaying the first set of application widgets in a same spatial organization in the second arrangement (e.g., 806a3)

as the first set of application widgets in the first arrangement (e.g., 806a1). In some embodiments, all of the application widgets in the first portion (e.g., a left side) in the user interface in the first orientation are displayed in the same position of the user interface in the second orientation as in the first orientation (e.g., relative to the top-left of the user interface). In some embodiments, displaying the second arrangement of application widgets and application icons includes: in accordance with a determination that the first portion includes fewer application widgets than the second portion (e.g., 806b1), displaying the second set of application widgets in a same spatial organization in the second arrangement (e.g., 806b2) as the second set of application widgets in the first arrangement (e.g., 806b1). In some embodiments, all of the application widgets in the second portion (e.g., a right side) in the user interface in the first orientation are displayed in the same position of the user interface in the second orientation as in the first orientation (e.g., relative to the bottom-right of the user interface). Selectively displaying the first set of application widgets or the second set of application widgets in a same spatial organization in the second arrangement as in the first arrangement based on which region includes more application widgets maximizes the number of application widgets that are maintained at the same relative positions when the user interface is changed from the first orientation to the second orientation, which enables a user to navigate the user interface more efficiently.

In some embodiments, the set of application widgets (e.g., 808a, 808b, 808c, 808d, 808f, and 808h) in the second arrangement has a same spatial organization relative to the set of application icons (e.g., 812a-812k) (or relative to the positions occupied by the set of application icons) as the set of application widgets in the first arrangement, and a position of a fourth application icon (e.g., 812c) in the set of application icons relative to the user interface in the second orientation is different from a position of the fourth application icon relative to the user interface in the first orientation. Displaying the set of application widgets in the second arrangement with the same spatial organization relative to the set of application icons as in the first arrangement, and the fourth application icon in the set of application icons at a position relative to the user interface in the second orientation that is different from the user interface in the first orientation enables the computer system to maintain consistency between the relative positions of application widgets and application icons while moving application icons relative to the user interface in order to maintain consistency in the user interface between the first orientation and the second orientation, which enables a user to navigate the user interface more efficiently.

In some embodiments, the spatial organization (e.g., positions; positions relative to a top (e.g., top-left) of the user interface; or positions relative to the bottom (e.g., bottom-right) of the user interface) of the set of application widgets in the second arrangement (e.g., 806a3 or 806b2) (e.g., relative to the user interface; row and column coordinates) is based on a portion (e.g., a side, a left side, a right side, a top side, or a bottom side) of the user interface in the first orientation that is selected to be preserved with respect to application widgets in the portion. Basing the spatial organization of the set of application widgets in the second arrangement on a selected portion of the user interface in the first orientation enables the computer system to select a portion of the user interface in the first orientation that will maximize consistency of the positions of application widgets in the user interface between the first orientation and the second orientation, which enables a user to navigate the user interface more efficiently.

In some embodiments, in accordance with a determination that a first portion (e.g., a left side or a top side) of the user interface in the first orientation is selected, the spatial organization and/or positions of the application widgets in the first portion are maintained (e.g., are the same in the first orientation and the second orientation) relative to the top (e.g., top-left) of the user interface (and, optionally, the spatial organization and/or positions of the application widgets that are not in the first portion are not maintained relative to the top (or top-left) of the user interface); and in accordance with a determination that a second portion (e.g., a right side; a bottom side; or the portion of the user interface not included in the first portion) of the user interface in the first orientation is selected, the spatial organization and/or positions of the application widgets in the second portion are maintained (e.g., are the same in the first orientation and the second orientation) relative to the bottom (or bottom-right) of the user interface (and, optionally, the spatial organization and/or positions of the application widgets that are not in the second portion are not maintained relative to the bottom (e.g., bottom-right) of the user interface).

In some embodiments, while displaying the user interface in the second orientation (e.g., FIG. 8C or FIG. 8E) (and, optionally, while displaying the second arrangement of application widgets and application icons), the computer system detects a second request (e.g., 810a or 810b) to change an orientation of the user interface (e.g., detecting a change in the computer system from the second physical orientation state to the first physical orientation state (e.g., a physical rotation of the computer system and/or the display generation component; a change from a physical orientation that corresponds to a portrait display state to a physical orientation that corresponds to a landscape display state)); and in response to detecting the second request to change the orientation of the user interface, the computer system displays the user interface in the first orientation (e.g., FIG. 8A or FIG. 8D), including: displaying, in the user interface in the first orientation, the first arrangement (e.g., 806a1 or 806b1) of application widgets and application icons. Displaying the first arrangement of application widgets and application icons in response to detecting the second request to change the orientation of the user interface enables the computer system to return the user interface to a previous (e.g., the same) arrangement when the user interface is switched back to the first orientation, which maintains consistency of the user interface as the user interface switches between the first orientation and the second orientation and enables a user to navigate the user interface more efficiently when switching between user interface orientations.

Note that details of the processes described above with respect to method 900 (e.g., FIGS. 9A-9B) are also applicable in an analogous manner to the methods described above. For example, method 700 optionally includes one or more of the characteristics of the various methods described above with reference to method 900. For example, the home screen described in method 700 can be arranged in response to a request to change the orientation of the home screen in accordance with the techniques described in method 900. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to display application widgets. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to display application widgets. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of using application widgets, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, displaying application widgets based on non-personal information data or a bare minimum amount of personal information, such as the content being requested by the device associated with a user, other non-personal information available to the computer system, or publicly available information.

What is claimed is:

1. A computer system configured to communicate with a display generation component and one or more input devices, comprising:
   one or more processors; and
   memory storing one or more programs configured to be executed by the one or more processors, the one or more programs including instructions for:
      displaying, via the display generation component, a user interface in a first orientation in which a height of the user interface in the first orientation is less than a width of the user interface, including:
         displaying, in the user interface in the first orientation, a first arrangement of application widgets and application icons that includes a set of application widgets that includes two or more application widgets and a set of application icons that includes two or more application icons, wherein:

a respective application widget for a respective application is larger than a respective application icon for the respective application; and the respective application widget for the respective application includes more information from the respective application than the respective application icon for the respective application; and detecting a request to change an orientation of the user interface; and in response to detecting the request to change the orientation of the user interface, displaying the user interface in a second orientation in which the height of the user interface is greater than the width of the user interface, including:

displaying, in the user interface in the second orientation, a second arrangement of application widgets and application icons that includes the set of application widgets and the set of application icons, wherein:

the set of application widgets in the second arrangement has a same spatial organization as the set of application widgets in the first arrangement;

a position of a first application icon in the set of application icons relative to the spatial organization of the set of application widgets in the user interface in the second orientation is different from a position of the first application icon relative to the spatial organization of the set of application widgets in the user interface in the first orientation; and a position of a second application icon in the set of application icons relative to the spatial organization of the set of application widgets in the user interface in the second orientation is different from a position of the second application icon relative to the spatial organization of the set of application widgets in the user interface in the first orientation.

2. The computer system of claim 1, wherein:

displaying the user interface in the first orientation includes displaying, in the user interface in the first orientation, a first application widget that is not included in the set of application widgets; and displaying the user interface in the second orientation includes displaying, in the user interface in the second orientation, the first application widget, wherein a position of the first application widget relative to the spatial organization of the set of application widgets in the user interface in the second orientation is different from a position of the first application widget relative to the spatial organization of the set of application widgets in the user interface in the first orientation.

3. The computer system of claim 1, wherein the set of application widgets is selected based on positions of the set of application widgets in the first arrangement and/or the width of the user interface in the second orientation.

4. The computer system of claim 1, wherein, in the second arrangement, the set of application icons has a same sequential order as the set of application icons in the first arrangement.

5. The computer system of claim 1, wherein:

the set of application icons includes a third application icon; and a position of the third application icon relative to one or more application icons in the set of application icons in the user interface in the second orientation is different from a position of the third application icon relative to the one or more application icons in the set of application icons in the user interface in the first orientation.

6. The computer system of claim 1, wherein:

the user interface in the first orientation includes:

a first portion that includes a first set of application widgets, and a second portion that includes a second set of application widgets; and displaying the second arrangement of application widgets and application icons includes:

in accordance with a determination that the first portion includes a same number or more application widgets than the second portion, displaying the first set of application widgets in a same spatial organization in the second arrangement as the first set of application widgets in the first arrangement; and in accordance with a determination that the first portion includes fewer application widgets than the second portion, displaying the second set of application widgets in a same spatial organization in the second arrangement as the second set of application widgets in the first arrangement.

7. The computer system of claim 1, wherein:

the set of application widgets in the second arrangement has a same spatial organization relative to the set of application icons as the set of application widgets in the first arrangement, and a position of a fourth application icon in the set of application icons relative to the user interface in the second orientation is different from a position of the fourth application icon relative to the user interface in the first orientation.

8. The computer system of claim 1, wherein the spatial organization of the set of application widgets in the second arrangement is based on a portion of the user interface in the first orientation that is selected to be preserved with respect to application widgets in the portion.

9. The computer system of claim 1, the one or more programs further including instructions for:

while displaying the user interface in the second orientation, detecting a second request to change an orientation of the user interface; and in response to detecting the second request to change the orientation of the user interface, displaying the user interface in the first orientation, including:

displaying, in the user interface in the first orientation, the first arrangement of application widgets and application icons.

10. A non-transitory computer-readable storage medium storing one or more programs configured to be executed by one or more processors of a computer system that is in communication with a display generation component and one or more input devices, the one or more programs including instructions for:

displaying, via the display generation component, a user interface in a first orientation in which a height of the user interface in the first orientation is less than a width of the user interface, including:

displaying, in the user interface in the first orientation, a first arrangement of application widgets and application icons that includes a set of application widgets that includes two or more application widgets and a set of application icons that includes two or more application icons, wherein:

a respective application widget for a respective application is larger than a respective application icon for the respective application; and the respective application widget for the respective application includes more information from the respective application than the respective application icon for the respective application; and detecting a request to change an orientation of the user interface; and in response to detecting the request to change the orientation of the user interface, displaying the user interface in a second orientation in which the height of the user interface is greater than the width of the user interface, including:

displaying, in the user interface in the second orientation, a second arrangement of application widgets and application icons that includes the set of application widgets and the set of application icons, wherein:

the set of application widgets in the second arrangement has a same spatial organization as the set of application widgets in the first arrangement;

a position of a first application icon in the set of application icons relative to the spatial organization of the set of application widgets in the user interface in the second orientation is different from a position of the first application icon relative to the spatial organization of the set of application widgets in the user interface in the first orientation; and a position of a second application icon in the set of application icons relative to the spatial organization of the set of application widgets in the user interface in the second orientation is different from a position of the second application icon relative to the spatial organization of the set of application widgets in the user interface in the first orientation.

11. The non-transitory computer-readable storage medium of claim 10, wherein:

displaying the user interface in the first orientation includes displaying, in the user interface in the first orientation, a first application widget that is not included in the set of application widgets; and displaying the user interface in the second orientation includes displaying, in the user interface in the second orientation, the first application widget, wherein a position of the first application widget relative to the spatial organization of the set of application widgets in the user interface in the second orientation is different from a position of the first application widget relative to the spatial organization of the set of application widgets in the user interface in the first orientation.

12. The non-transitory computer-readable storage medium of claim 10, wherein the set of application widgets is selected based on positions of the set of application widgets in the first arrangement and/or the width of the user interface in the second orientation.

13. The non-transitory computer-readable storage medium of claim 10, wherein, in the second arrangement, the set of application icons has a same sequential order as the set of application icons in the first arrangement.

14. The non-transitory computer-readable storage medium of claim 10, wherein:

the set of application icons includes a third application icon; and a position of the third application icon relative to one or more application icons in the set of application icons in the user interface in the second orientation is different from a position of the third application icon relative to the one or more application icons in the set of application icons in the user interface in the first orientation.

15. The non-transitory computer-readable storage medium of claim 10, wherein:

the user interface in the first orientation includes:

a first portion that includes a first set of application widgets, and a second portion that includes a second set of application widgets; and displaying the second arrangement of application widgets and application icons includes:

in accordance with a determination that the first portion includes a same number or more application widgets than the second portion, displaying the first set of application widgets in a same spatial organization in the second arrangement as the first set of application widgets in the first arrangement; and in accordance with a determination that the first portion includes fewer application widgets than the second portion, displaying the second set of application widgets in a same spatial organization in the second arrangement as the second set of application widgets in the first arrangement.

16. The non-transitory computer-readable storage medium of claim 10, wherein:

the set of application widgets in the second arrangement has a same spatial organization relative to the set of application icons as the set of application widgets in the first arrangement, and a position of a fourth application icon in the set of application icons relative to the user interface in the second orientation is different from a position of the fourth application icon relative to the user interface in the first orientation.

17. The non-transitory computer-readable storage medium of claim 10, wherein the spatial organization of the set of application widgets in the second arrangement is based on a portion of the user interface in the first orientation that is selected to be preserved with respect to application widgets in the portion.

18. The non-transitory computer-readable storage medium of claim 10, the one or more programs further including instructions for:

while displaying the user interface in the second orientation, detecting a second request to change an orientation of the user interface; and in response to detecting the second request to change the orientation of the user interface, displaying the user interface in the first orientation, including:

displaying, in the user interface in the first orientation, the first arrangement of application widgets and application icons.

19. A method, comprising:

at a computer system that is in communication with a display generation component and one or more input devices:

displaying, via the display generation component, a user interface in a first orientation in which a height of the user interface in the first orientation is less than a width of the user interface, including:

displaying, in the user interface in the first orientation, a first arrangement of application widgets and application icons that includes a set of application widgets that includes two or more application widgets and a set of application icons that includes two or more application icons, wherein:
   a respective application widget for a respective application is larger than a respective application icon for the respective application; and
   the respective application widget for the respective application includes more information from the respective application than the respective application icon for the respective application; and
detecting a request to change an orientation of the user interface; and
in response to detecting the request to change the orientation of the user interface, displaying the user interface in a second orientation in which the height of the user interface is greater than the width of the user interface, including:
   displaying, in the user interface in the second orientation, a second arrangement of application widgets and application icons that includes the set of application widgets and the set of application icons, wherein:
      the set of application widgets in the second arrangement have a same spatial organization as the set of application widgets in the first arrangement;
      a position of a first application icon in the set of application icons relative to the spatial organization of the set of application widgets in the user interface in the second orientation is different from a position of the first application icon relative to the spatial organization of the set of application widgets in the user interface in the first orientation; and
      a position of a second application icon in the set of application icons relative to the spatial organization of the set of application widgets in the user interface in the second orientation is different from a position of the second application icon relative to the spatial organization of the set of application widgets in the user interface in the first orientation.

20. The method of claim 19, wherein:
displaying the user interface in the first orientation includes displaying, in the user interface in the first orientation, a first application widget that is not included in the set of application widgets; and
displaying the user interface in the second orientation includes displaying, in the user interface in the second orientation, the first application widget, wherein a position of the first application widget relative to the spatial organization of the set of application widgets in the user interface in the second orientation is different from a position of the first application widget relative to the spatial organization of the set of application widgets in the user interface in the first orientation.

21. The method of claim 19, wherein the set of application widgets is selected based on positions of the set of application widgets in the first arrangement and/or the width of the user interface in the second orientation.

22. The method of claim 19, wherein, in the second arrangement, the set of application icons has a same sequential order as the set of application icons in the first arrangement.

23. The method of claim 19, wherein:
the set of application icons includes a third application icon; and
a position of the third application icon relative to one or more application icons in the set of application icons in the user interface in the second orientation is different from a position of the third application icon relative to the one or more application icons in the set of application icons in the user interface in the first orientation.

24. The method of claim 19, wherein:
the user interface in the first orientation includes:
   a first portion that includes a first set of application widgets, and
   a second portion that includes a second set of application widgets; and
displaying the second arrangement of application widgets and application icons includes:
   in accordance with a determination that the first portion includes a same number or more application widgets than the second portion, displaying the first set of application widgets in a same spatial organization in the second arrangement as the first set of application widgets in the first arrangement; and
   in accordance with a determination that the first portion includes fewer application widgets than the second portion, displaying the second set of application widgets in a same spatial organization in the second arrangement as the second set of application widgets in the first arrangement.

25. The method of claim 19, wherein:
the set of application widgets in the second arrangement has a same spatial organization relative to the set of application icons as the set of application widgets in the first arrangement, and
a position of a fourth application icon in the set of application icons relative to the user interface in the second orientation is different from a position of the fourth application icon relative to the user interface in the first orientation.

26. The method of claim 19, wherein the spatial organization of the set of application widgets in the second arrangement is based on a portion of the user interface in the first orientation that is selected to be preserved with respect to application widgets in the portion.

27. The method of claim 19, further comprising:
while displaying the user interface in the second orientation, detecting a second request to change an orientation of the user interface; and
in response to detecting the second request to change the orientation of the user interface, displaying the user interface in the first orientation, including:
   displaying, in the user interface in the first orientation, the first arrangement of application widgets and application icons.

* * * * *